United States Patent [19]

Edwards et al.

[11] Patent Number: 5,410,551
[45] Date of Patent: Apr. 25, 1995

[54] NET VERIFICATION METHOD AND APPARATUS

[75] Inventors: Robert Edwards, San Jose; Michael G. Fisher, Mountain View; John Merrill, Saratoga, all of Calif.; Gary Woffinden, Rexburg, Id.

[73] Assignee: AMDAHL Corporation, Sunnyvale, Calif.

[21] Appl. No.: 816,117

[22] Filed: Jan. 2, 1992

[51] Int. Cl.⁶ ............................................. G06F 11/00
[52] U.S. Cl. .................................. 371/25.1; 371/22.3
[58] Field of Search ...................... 371/25.1, 15.1, 22.3, 371/22.1, 22.6, 22.4, 29.5; 324/73.1, 158 R; 455/226

[56] References Cited

U.S. PATENT DOCUMENTS

| | | | |
|---|---|---|---|
| 4,125,763 | 11/1978 | Drabing et al. | 235/302 |
| 4,752,907 | 6/1988 | Si et al. | 364/900 |
| 4,819,166 | 4/1989 | Si et al. | 364/200 |
| 4,872,169 | 10/1989 | Whetsel, Jr. | 371/22.3 |
| 4,875,003 | 10/1989 | Burke | 324/73 R |
| 4,879,717 | 11/1989 | Sauerwald et al. | 371/22.3 |
| 4,912,709 | 3/1990 | Teske et al. | 371/22.1 |
| 4,945,536 | 7/1990 | Hancu | 371/22.3 |
| 4,947,395 | 8/1990 | Bullinger et al. | 371/22.3 |
| 4,963,824 | 10/1990 | Hsieh et al. | 324/158 R |
| 4,967,142 | 10/1990 | Sauerwald et al. | 324/73.1 |
| 4,972,511 | 11/1990 | Singer et al. | 455/226 |
| 4,975,640 | 12/1990 | Lipp | 324/158 R |
| 4,980,889 | 12/1990 | DeGuise et al. | 371/22.3 |
| 5,001,713 | 3/1991 | Whetsel | 371/22.3 |
| 5,271,019 | 12/1993 | Edwards et al. | 371/22.3 |

OTHER PUBLICATIONS

1987 International Test Conference, paper 30.1, "Boundary Scan, a framework for structured design-for-test", Maunder et al.
1987 International Conference, paper 30.2, "Testing a Board With Boundary scan" Van de Lagemaat et al.

*Primary Examiner*—Robert W. Beausoliel, Jr.
*Assistant Examiner*—Phung Chung

[57] ABSTRACT

To verify proper interconnection of an interconnect network, a transitory test signal is introduced at a first node of a network within a system under test. A search is made of all other system nodes for responsive transitions. A comparison is made between the addresses of nodes where transitions are observed within a predetermined time span and the addresses of nodes where transitions are expected. The predetermined time span is adjusted to detect missing or miswired line-conditioning components.

29 Claims, 12 Drawing Sheets

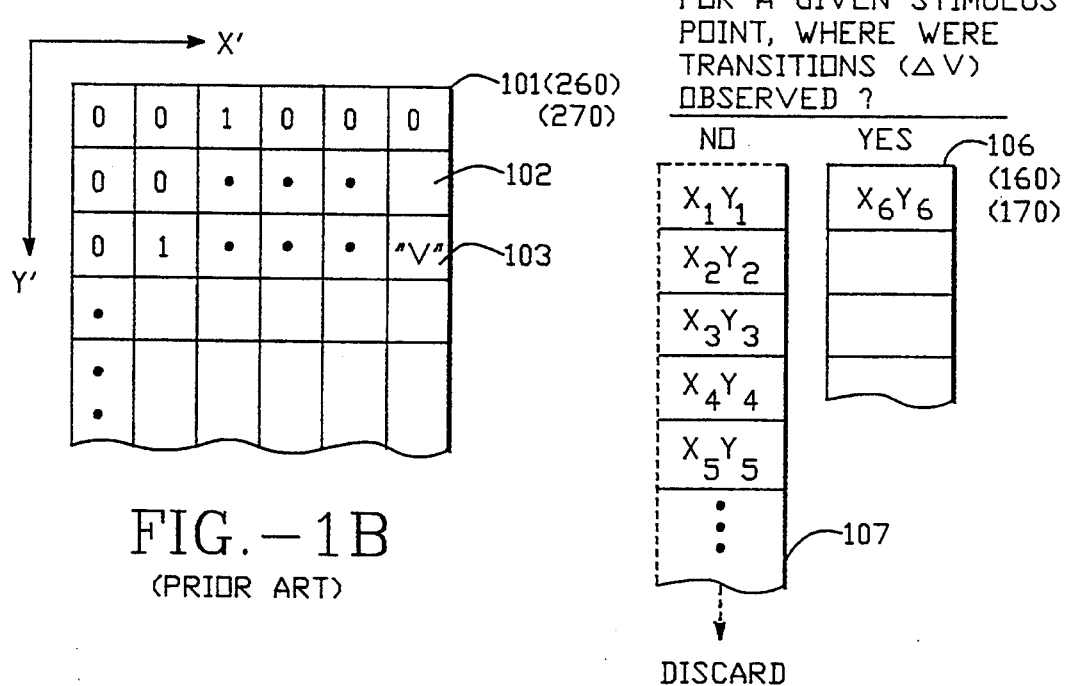
FIG.-1B
(PRIOR ART)
FIG.-1C
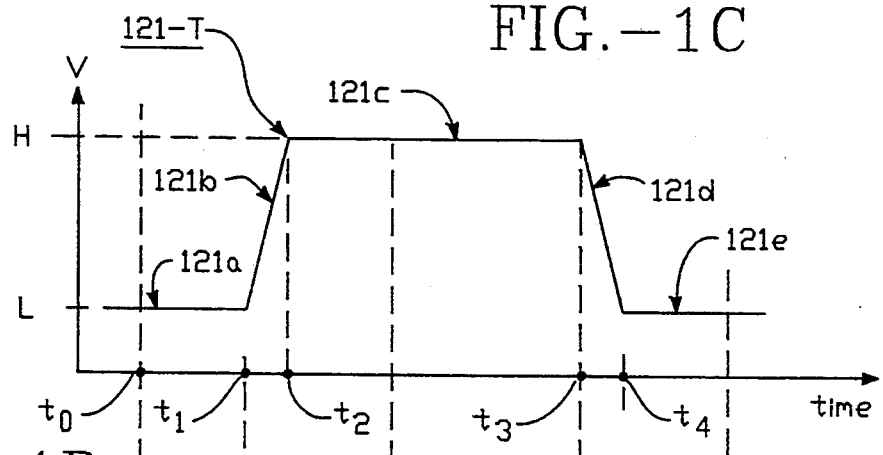
FIG.-1D
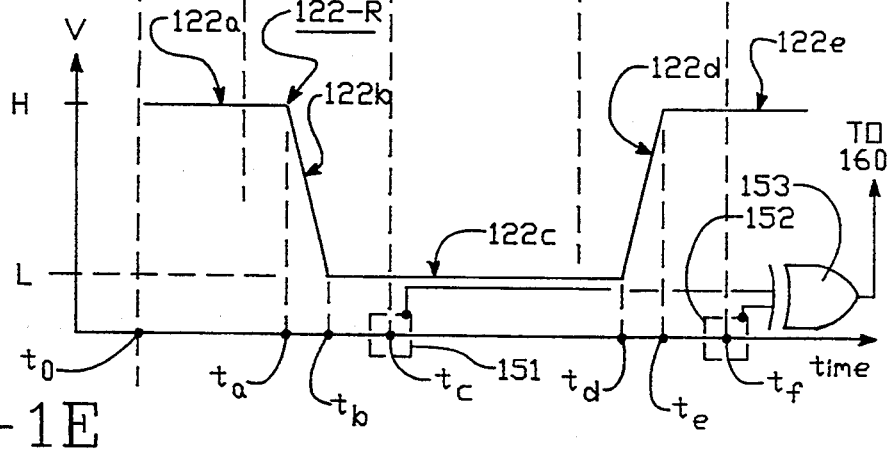
FIG.-1E

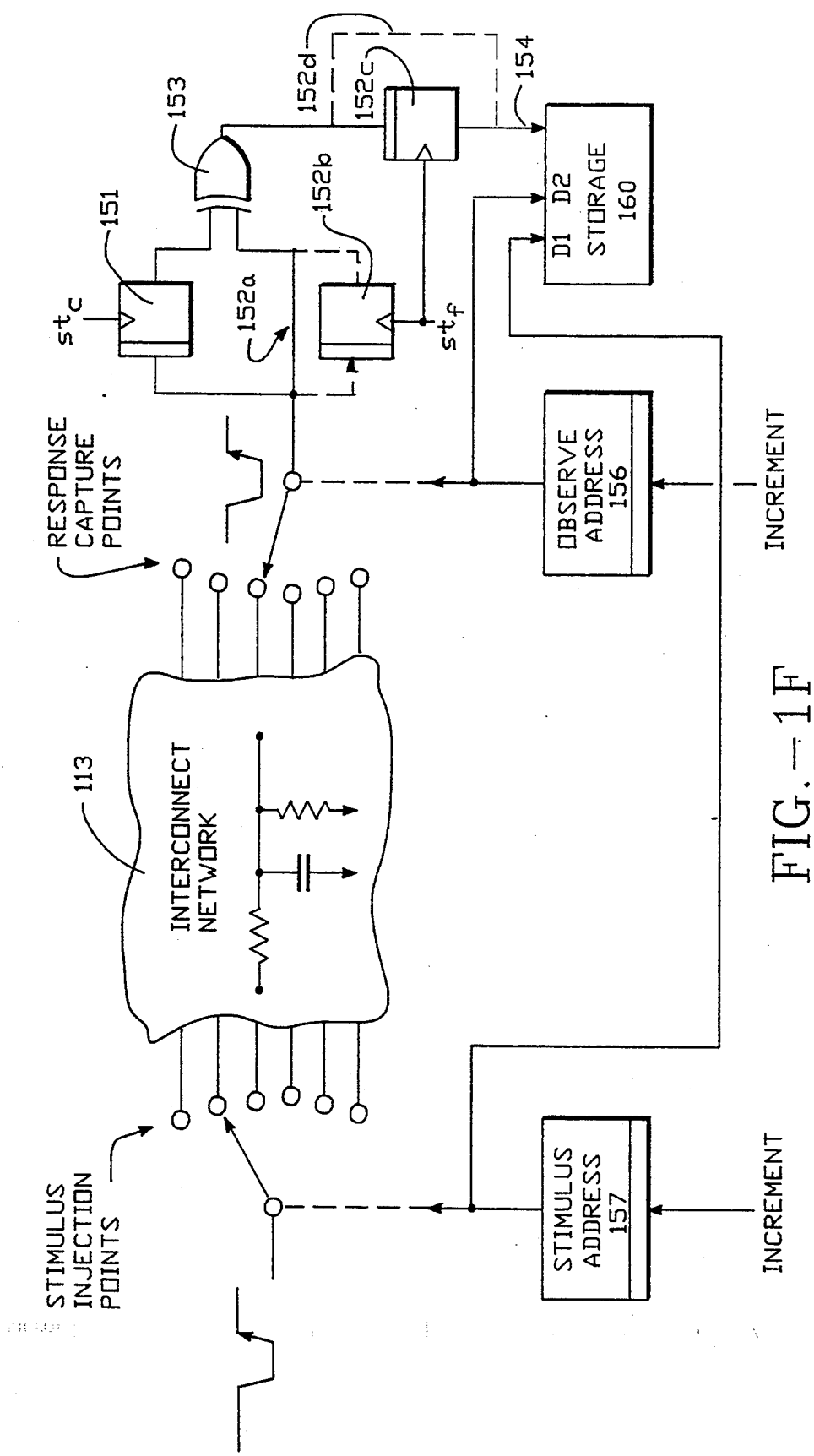
FIG.—1F

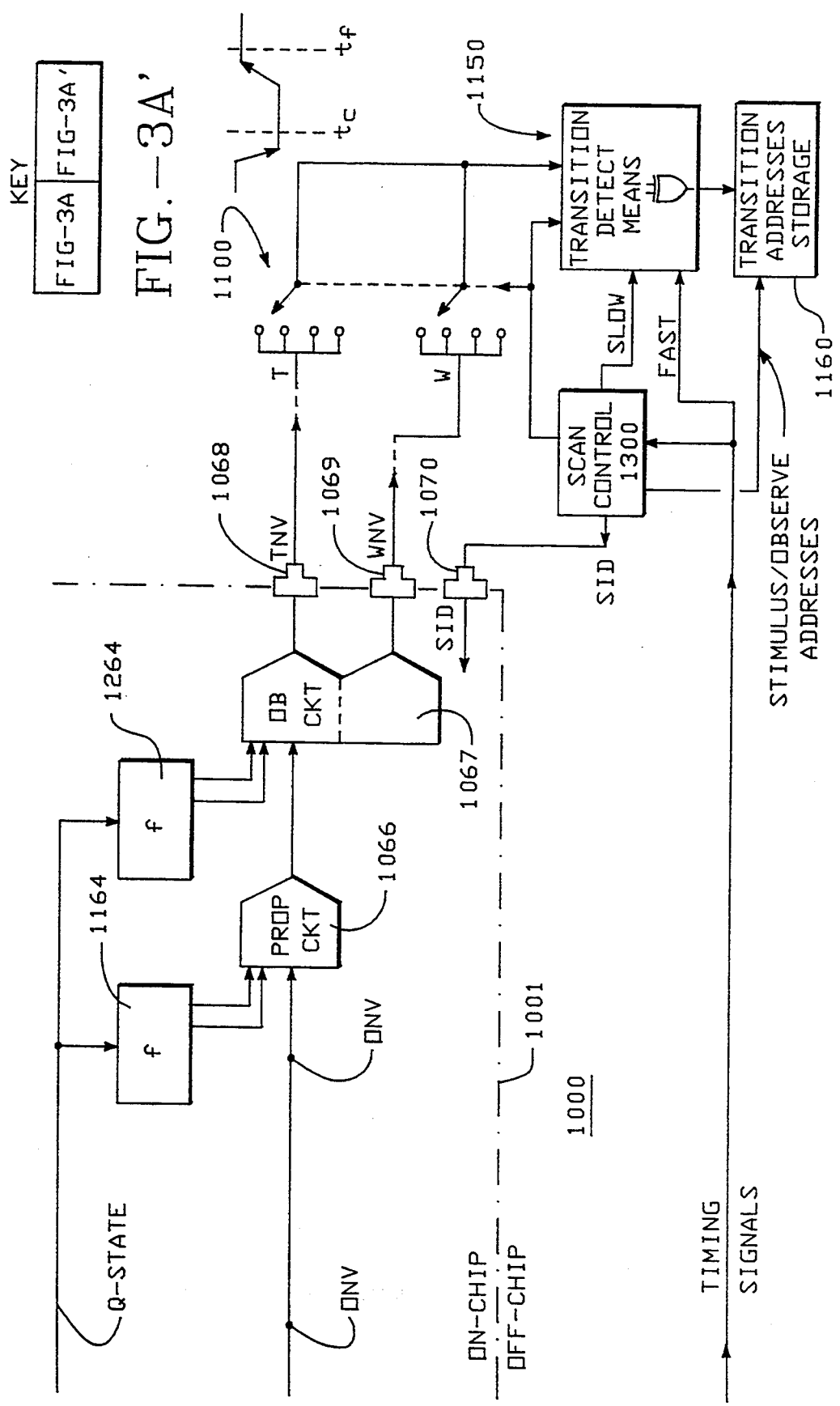

LEGEND:
f = FUNCTION LEVEL
tl = TEST LEVEL
X = DON'T CARE
S = SELECTING SIGNALS
- = INVERTED

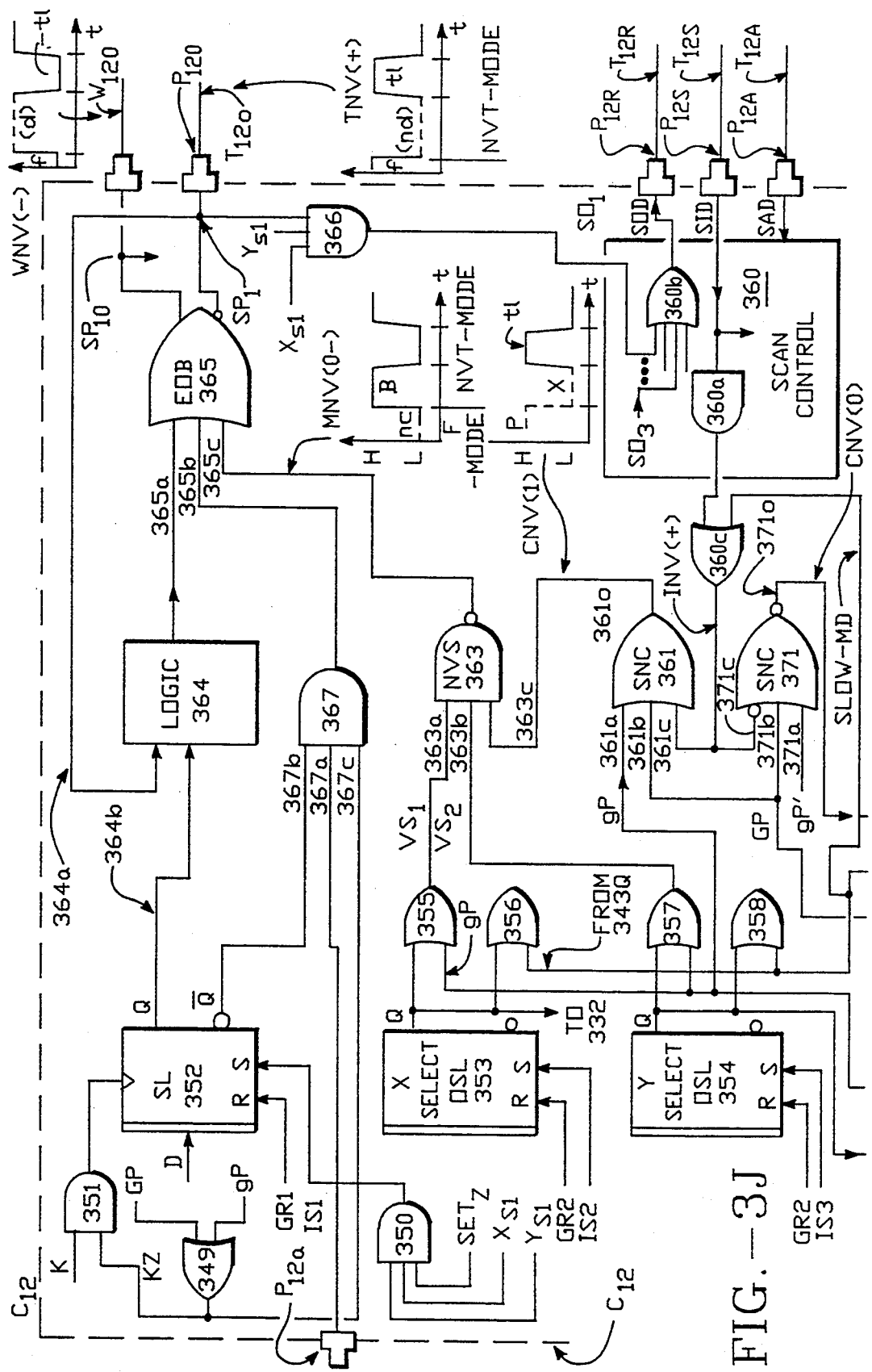
FIG.—3J

NET VERIFICATION METHOD AND APPARATUS

BACKGROUND OF THE INVENTION

1. Field Of the Invention

The invention is directed to a method and apparatus for determining whether proper interconnections are made between the components of an electronic system.

The invention is more specifically directed to a scan-based interrogating system which is used in conjunction with a scannable system-under-test (SUT) to verify that proper interconnections have been made, at a board level, between integrated circuit (IC) chips mounted on one or more printed circuit boards, and at a frame or system level, between interconnected boards or frames.

2. Cross Reference to Related Copending Applications

The present application is related to copending U.S. patent application Ser. No. 07/670,289 entitled "SCANNABLE SYSTEM WITH ADDRESSABLE SCAN RESET GROUPS", by Robert Edwards et al, which was filed Mar. 15, 1991 [Atty. Docket No. 7954] and copending U.S. patent application Ser. No. 07/672,951 entitled "SCANNABLE SYSTEM WITH ADDRESSABLE CLOCK SUPPRESS ELEMENTS" by Robert Edwards, which was filed Mar. 21, 1991 [Atty. Docket No. 8037]. Said copending applications are assigned to the assignee of the present application and their disclosures are incorporated herein by reference.

3. Cross Reference to Related Patents

The following U.S. patents are assigned to the assignee of the present application and are further incorporated herein by reference: (A) 4,244,019, DATA PROCESSING SYSTEM INCLUDING A PROGRAM-EXECUTING SECONDARY SYSTEM CONTROLLING A PROGRAM-EXECUTING PRIMARY SYSTEM, issued to Anderson et al, Jan. 6, 1981; (B) 4,752,907, INTEGRATED CIRCUIT SCANNING APPARATUS HAVING SCANNING DATA LINES FOR CONNECTING SELECTED DATA LOCATIONS TO AN I/O TERMINAL, issued to Si, et al. Jun. 21, 1988; (C) 4,819,166, MULTI-MODE SCAN APPARATUS, issued to Si et al Apr. 4, 1989; and (D) 4,661,953, ERROR TRACKING APPARATUS IN A DATA PROCESSING SYSTEM, issued to Venkatesh et al, Apr. 28, 1987.

4. Background

Modern electronic systems are often manufactured in modular form as a plurality of electronic modules connected one to the next by an interconnect network.

When large numbers of modules are involved and/or each module has a relatively large number of interface terminals, the interconnect network tends to be relatively complex and is likely to have manufacturing faults. As system size and/or complexity grows, it becomes more and more important to be able to quickly detect and isolate faults within the interconnect network.

A state-of-the-art mainframe computer system is an example of a system having a large and complex interconnect network. Such a system is typically constructed according to a hierarchy of two, three, or more modular levels. The modular levels can be defined in a bottom to top order as: (1) the packaged integrated circuit level, (2) the board level, (3) the frame level and (4) the system level. Each level is characterized by a unique set of interconnect test requirements.

Looking first at the packaged IC level, each integrated circuit (IC) module encapsulates one or more high-density integrated circuit (IC) chips. As many as 100 or more module interface terminals may be provided on each IC packaging module for connecting each of the encapsulated IC chips to points outside their respective modules. Connections to external parts of the module terminals are typically made with solder and/or pin sockets. These connections are prone to develop faults such as short-circuits, opens or excessive series resistance.

Looking next at the board level, each board can have as many as 100 or more IC packaging modules mounted to it. Other components such as line-terminating resistors and filtering capacitors are also often found on each board. The boards are usually multi-layered and the on-board interconnect network typically comprises thousands of printed circuit traces plus a number of discrete wires and/or multi-wire cables which are used for interconnecting on-board components. As many as 500 to 1,000 or more board interface terminals may be provided on the edge of each board for connecting to off-board points. On-board parts of the interconnect network are prone to develop faults such as short-circuits, opens, incorrect wire-routing, excessive series resistance or excessive line capacitance and/or excessive inductance. (Voltage-based signalling systems are primarily sensitive to excessive capacitance while current-based signalling systems are primarily sensitive to excessive inductance.) Also the interconnect network at this level is susceptible to noise problems such as cross-talk between closely-spaced parallel-running lines.

At the frame level, each frame of the computer system may support as many as 10 to 100, or even more boards. Connections between boards are usually made by way of multi-wire cables or motherboard connectors and buses. Cable and/or motherboard connectors mate with the board interface terminals of each board. Interboard connections can also be made with discrete, hand-routed wires. The inter-board interconnect structure is prone to the same types of faults as the on-board interconnect structure.

At the system level, the computer system itself may be composed of a plurality of frames or boxes. Interframe connections are typically made with relatively long plug-in cables. The most common problems with such cables are simple opens, shorts, and incorrectly routed (e.g., swapped) cables, but these are difficult to locate because of the large numbers of wires involved.

From the above, it is seen that the overall interconnect structure of a mainframe computer system includes many different kinds of electrically conductive linkages and that some of these linkages are numbered in the thousands if not millions. Each linkage presents itself in either an accessible form where it may be probed by direct contact or in a non-accessible form. Examples of non-accessible linkages include fine wires contained inside shielded multi-wire cables, traces buried inside multilayer printed circuit boards, and solder connections made to the bottom of a surface-mounted IC chip package. Signals have to flow successfully and correctly through all the different kinds of interconnect linkages (accessible or non-accessible) to enable proper operation of the computer system. All linkages have to be tested to assure system operability, regardless of whether they are directly accessible or not.

Testing the interconnect structure of a mainframe computer system is a problem because of its size, complexity and the inaccessibility of many of its linkages. The interconnect structure can appear to be a monstrously complex and unmanageable maze of inaccessible linkages, even when viewed only at the board level. The problem becomes compounded at the frame and system levels.

Irrespective of size and complexity, it is necessary to verify that each interface terminal of each module (at the board, frame and system levels) is appropriately connected to other parts of the system and/or isolated from yet other parts of the system in accordance with the system design. Preferably, an automated test means is provided to enable technicians to quickly detect, locate and correct all unintended shorts, opens or miswirings at each of the board, frame and system levels.

The testing of an interconnect structure to detect and/or isolate faults is referred to here as network verification.

As already mentioned, one problem in network verification is that it is often difficult, if not impossible, to make direct contact with the ends of each linkage in a complex interconnect structure. To overcome this problem, the JTAG industry standards group (Joint Test Action Group) has proposed a so-called "boundary scan" architecture for each module and techniques for performing contactless network verification and other types of testing functions using this architecture. A modified version of this has been endorsed by the Institute of Electrical and Electronic Engineers as IEEE standard 1149.1.

Under the JTAG approach, and more currently under the IEEE 1149.1 approach, when a multi-module system is constructed, a module-partitioning ring is distributed around the periphery of each module. Each ring is composed of a relatively large number (e.g., 100 or more) of electronic switches (multiplexers) and scan latches. These components are interposed between the interconnect terminals of their respective module and internal circuits of the module so that, in a test mode, the module-partitioning ring of each module can decouple that module's interconnect terminals from their associated internal circuits. The switches and scan latches of each module-partitioning ring are arranged such that they can selectively drive each decoupled terminal toward a desired voltage level during the test mode and/or such that they can detect a voltage level present at each terminal and relay the detected level to a network analyzing unit.

Numerous publications are available describing details of the JTAG boundary scan technique and variations thereof such as the IEEE 1149.1 standard. By way of example, U.S. Pat. No. 4,875,003 issued Oct. 17, 1989 to Burke, "NON-CONTACT I/O SIGNAL PAD SCAN TESTING OF VLSI CIRCUITS", discloses a use of the boundary scan method for testing the I/O cells of an IC chip. U.S. Pat. No. 4,879,717 issued Nov. 7, 1989 to Sauerwald et al., "TESTABLE CARRIERS FOR INTEGRATED CIRCUITS" discloses a method for testing interconnections between IC circuits mounted on a multi-chip carrier. U.S. Pat. No. 4,980,889 issued Dec. 25, 1990 to DeGuise et al., "MULTI-MODE TESTING SYSTEMS" discloses a CMOS based selector circuit which may be used for boundary scan testing. Two papers respectively entitled "Boundary Scan: A Framework for Structured Design-for-Testing", by Maunder and Beenker; and "Testing a Board with Boundary Scan", by van de Lagemaat and Bleeker also describe the JTAG boundary scan technique, these papers being presented in Proceedings of the 1987 International Test Conference, September 1987, pp. 714–723 and pp. 724–729, respectively.

In brief, network verification in accordance with the JTAG technique comprises the ordered steps of:

(1) Selecting a first interconnect wire (or "net") within a system under test (SUT).

(2) Tracing through the selected net to identify one or more observation points (module interface terminals) which belong to the net and, at the same time, to distinguish them from other observation points of the system (SUT) which do not belong to the selected net.

(3) Tracing through the selected net to identify a net driving point.

(4) Applying a preselected voltage level to the net driving point.

(5) Waiting a sufficient length of time for the applied voltage level to propagate out across the system and settle.

(6) Scanning all observation points of the system to detect what voltage level is present at each of the observation points.

(7) Storing data representing the detected levels in a plurality of distinct memory cells such that there is one data item stored in each memory cell and such that each memory cell corresponds to one of the system observation points.

(8) Comparing the voltage level data stored at step (7) against a list containing the levels expected for each and every observation point of the SUT to thereby determine if the applied voltage level of step (4) has propagated to all expected observation points but not to other observation points.

(9) Flagging out discrepancies between the stored data and the list of expected levels.

(10) Selecting a new driving point and/or a new net and repeating steps (2)–(9).

(11) Repeating step (10) until all nets of the interconnect network have been exhausted.

In one variation of the above JTAG method, the system under test is always initialized at step (1) or (2) so that all or most drive points which can be so latched, are latched to a first voltage level representing logic zero ("0"). A second voltage level representing a logic one ("1") is applied at step (4) to the drive point of the net-under-test. At the comparing step (8), a search is made through all the memory cells of step (7) to find those cells having data items representing the logic one ("1") level. Each and only each of the observation points belonging to the net-under-test should be at logic one ("1").

In cases where on contention, the signal level representing logic one ("1") is dominant over the signal level representing logic zero ("0"), the lack of a logic one ("1") at a singular observation point which is supposed to belong to the net-under-test indicates an open circuit. The presence of a logic zero ("0") at all the observation points of the net-under-test or the presence of a logic one ("1") at unexpected observation points indicates a short, a nonfunctioning line driver, or some other fault.

The above variation of the JTAG test is sometimes referred to as a "walking ones" test because of the migrating pattern of logic ones it generates across the system as the test proceeds. A second variation of the JTAG test is a complimentary "walking zeroes" test which is performed separately and used to check the ability of each net to be individually driven to a second voltage level representing logic zero ("0").

Several problems can be associated with the JTAG network verification method. A number of these are described below as items (a) through (f).

(a) One problem is that large amounts of test data may have to be disadvantageously stored at step (7) and individually addressed for analysis at step (8). A typical system under test (SUT) can have thousands or even millions of observation points. According to step (6), the voltage levels of all these numerous observation points are stored and analyzed in each pass through steps (1)–(8). This is done blindly even though many of the observation points are not associated in any way with the net-under-test. Time and memory space are wasted processing irrelevant data.

(b) A second problem is that the walking ones and zeroes tests are performed separately. The same drive and observation points are addressed twice. This disadvantageously consumes test time.

(c) A third problem is that test management is complicated by having to keep track of which node is supposed to be at logic one or logic zero. This is particularly a problem in systems which have complimentary inverted and noninverted signals in adjacent lines.

(d) A further problem of the JTAG approach is that it only tests for steady-state (D.C.) conditions. It does not concern itself with dynamic attributes of the interconnect network such as the signal propagation times of its linkages or the noise sensitivity of the network.

High-speed digital circuits, such as found in state-of-the-art mainframe computers, typically include line-terminators or other line-conditioning components. These line-conditioning components need to be correctly coupled to system nets (lines) for conditioning the nets to carry high frequency signals and/or to minimize noise. The JTAG network verification method is not structured to either detect the presence of various types of line-conditioning components or determine whether such line-conditioning components are appropriately coupled to desired ones of the nets.

(e) A yet further problem of the JTAG approach becomes apparent after a system (SUT) is switched from a net-verification test mode to a normal-function mode. The electronic switches (multiplexers) which are interposed between, and used for decoupling, module interface terminals from interior circuits of the module add undesirable delays to the circuit paths that otherwise carry normal-mode signals between modules.

The delay problem is compounded in systems where one or more signals propagate through a series of boundary-scanned modules. As these signals cross through the module-partitioning rings which surround the modules, they are undesirably delayed by the electronic switches (multiplexers) in each of the multiple partitioning rings.

(f) Yet another problem of the JTAG approach is that its module-partitioning rings tend to consume relatively large amounts of circuit area and/or power. In a LSSD (Level Sensitive Scan Design) implementation of the JTAG architecture (or the IEEE 1149.1 architecture), a first clocked scan latch is provided at each terminal that carries a functional signal across the boundary of each module for detecting the voltage level present at that terminal. (As an aside, it is noted that both JTAG and IEEE 1149.1 require latches for sampling all input, output and bidirectional module pins during a nontest functional mode of a testable system.)

A second clocked scan latch plus a multiplexer are provided at each bidirectional or signal outputting terminal (and optionally for signal inputting terminals) of each module for isolating that terminal from its normal-mode drive circuit and for applying a desired voltage level to that terminal during testing. The combination of scan latches and multiplexers disadvantageously consumes circuit space which might be otherwise used to support normal mode functions. The relatively large number of active components in the module-partitioning rings disadvantageously consume power.

A network verification method and apparatus which overcomes these and other problems is disclosed below.

OVERVIEW OF THE INVENTION

The invention can be most easily appreciated by first considering an overview of its features and then focusing on its highlights. In accordance with but one of many aspects of the below disclosed invention, a common hardware architecture is integrally incorporated into a modularly-interconnected system to support a variety of different network verification methods. The architecture provides the ability to test the system interconnect network using any or all of the supported methods at each level of modularity (e.g., board level, frame level or full system level).

The supported methods, some of which constitute part of the disclosed invention, will be described in detail below. For now, they may be generally characterized as having one or more of the following attributes:

(a) One or more than one net-driving sources are selected to drive a corresponding one or more nets either simultaneously or at different times to at least one of first and second signal levels;

(b) A fast-toggled or slow-toggled transitory signal is injected into at least one of the driven nets and sometimes simultaneously into plural nets; and (c) Each net is selectively driven towards a dominant or nondominant signal level depending on the type of net involved, while non-selected nets of the same type are driven respectively towards an opposite nondominant or dominant signal level. (The term "dominant" is applicable only to technologies where, in the case of driver contention, one signal level dominates over an opposing signal level. Obviously, attribute (c) is not applicable to technologies where one signal level does not override an opposing level when contention occurs.)

The supported testing methods have advantages and disadvantages depending on what level of modules is being tested (e.g., board level, frame level or system level), what degree of fault isolation is desired (e.g., locating the cause of fault down to a point, a line, a cable or a box) and what speed of fault detection/isolation is desired.

The common hardware architecture of the invention is preferably provided at the IC chip level so as to support all the network verification methods individually or in combination at the single board level, at the multi-board level, at the frame level or at a higher system level.

A circuit partitioning function is preferably further incorporated into the architecture to enable network verification to take place in one part of a system under test while other parts of the system are concurrently operating in a functional mode.

At a relatively low modular-level such as at the board-level, the total number of module-interface terminals in the system-under-test (SUT) is relatively small (e.g., less than 100,000) but a high degree of fault isolation is desired (e.g., locating the exact point of fault and detecting missing line-terminators).

In such a case, network verification is carried out in accordance with the invention on an SUT having plural nets (where each net has plural nodes), by the steps of:

(a) selecting a net to be tested within the SUT;

(b) driving most or all non-selected nets of the SUT toward a first signal level (preferably a nondominant voltage or current level);

(c) injecting into a first node of the selected net, a transitory stimulus signal having a waveform which includes the first signal level, and a different, second signal level (preferably dominant over the first signal level) and at least one transition from one to the other of the first and second levels;

(d) detecting the occurrence of responsive transitions at other nodes of the SUT by looking for the occurrence of both the first and second signal levels at those other nodes;

(e) generating a list of addresses identifying the nodes where the responsive transitions are detected;

(f) comparing the generated list of addresses with a list of expected addresses;

(g) flagging out missing or extra addresses in the generated list; and (h) choosing in step (c) another driving node, if any, other than the first chosen node of the selected net, and repeating steps (c) through (h); and (i) choosing a net other than the one chosen in step (a), and repeating steps (b) through (i) until all nets to be tested in the interconnect network have been chosen.

Unless otherwise specified, the term "transition", as used herein refers to all transitions, fast or slow.

In the above step (d), it is preferable to utilize a fast transition and to check for the occurrence of a responsive one of the first and second signal levels at the other nodes within a predetermined time span after the at least one transition (from one to the other of the first and second signal levels) occurs at the first node. The fast stimulus transitions should be relatively rapid in relation to a time constant associated with a line conditioner that is supposed to be coupled to a net under test and the predetermined time span window for detecting the occurrence of responsive transitions should be selected such that it will be possible to distinguish between the presence or absence of line conditioners. The predetermined time span is preferably set short enough to detect mis-wired or missing line-conditioners, but long enough to detect shorts to other nets.

It is more preferable to include two transitions of opposing directions in the transitory stimulus signal and to check for the timely responsive occurrence of both the first and second signal levels at the other nodes. The occurrence of each of the responsive first and second signal levels in this more preferable method should be checked for at the other nodes within a predetermined time span after its corresponding one of the first and second stimulus transitions occur at the first node.

It is yet more preferable to observe the occurrence of both of the responsive first and second signal levels at each of the other nodes through an address-defined observation path without changing the observation address as the responsive first and second signal levels develop one after the next at each checked one of the other nodes. This saves time and thus reduces total network verification time.

If further possible, it is preferable to relay the developed response level from each checked net node, through a local IC chip to a chip-external point where response level becomes observable, the relaying occurring through the local chip without having to shift-out (or otherwise scan-out) for observation, one of the developed first and second signal levels from a significant number (e.g. more than half) of the checked nodes in the network before shifting out (or otherwise scanning-out) the presumably-opposing other of the first and second signal levels from the same checked nodes and comparing the relayed-out levels. The first relayed-out signal level of each checked node is saved in a temporary storage means. When the second relayed-out signal level of each checked node is afterwards relayed out and observed, it is compared against the first relayed-out level of the same node in order to determine whether or not a transition occurred at the checked node. A result is saved in final storage only if it is determined that a transition did occur. This latter step minimizes the amount of final storage needed for saving test results. The amount of temporary storage needed for saving the first relayed-out signal level of each checked node depends on how many checked nodes are referenced for their first levels before the second relayed-out levels of the same nodes are relayed out and compared against the corresponding first relayed-out levels. The amount of temporary storage needed for saving the first relayed-out signal levels is preferably minimized by relaying out as few as possible of the first levels before relaying out the presumably-opposing second levels of the same checked nodes for comparison.

The term "Single-point Toggle with Multi-point Observation" (STMO) is used here as a convenient descriptor for the above-disclosed method of injecting a transitory stimulus signal into a selected net and looking for responsive transitions at multiple observable points of the network under test (NUT). (Incidentally, this covers the case where a single point is toggled many times while observations of levels present at the same and/or other nodes of the network are spread over time.)

As already noted, other network verification test methods might be advantageously employed in combination with the first method (STMO) or in place of it. For example, it is sometimes advantageous to simultaneously toggle multiple points and to check for responsive transitions at corresponding or noncorresponding other points of the NUT. This alternate method will be referred to herein as Multi-point Toggle with Multi-point Observation or MTMO for short.

As an example of situations where MTMO might be useful, it is to be noted that there is a tradeoff between the degree of isolation required and the speed at which fault detection is achieved. "Detection" as used here refers to knowing that there is some kind of fault associated with one or more nets but not knowing what the fault is; and where plural faults are detected, not knowing how a fault on one net relates to a fault on another net (e.g., are they shorted together?). "Isolation" as used here refers to knowing more specifically how one fault on one net relates or does not relate to a fault detected on another net (e.g., is net no. 1 shorted to no. 2 or to no. 3?).

Requirements for detection speed and degree of isolation can vary depending on circumstances. Consider for example, what happens as testing moves upwardly from the board level to an intermediate level of modularity. At a multi-board or frame level the number of module-to-module interface terminals in the system-under-test (SUT) can become relatively large (e.g., more than 100,000) but the degree of fault isolation needed at that level might be less rigorous. (A lesser degree of fault isolation may be acceptable because the interconnect structures within lower modular levels (e.g., the board level) are presumed to have already been verified.) Speed in detecting the existence of faults (as opposed to pinpointing their location) becomes more important because of the large number of nets involved.

In such a case, network verification may be carried out in accordance with the invention by the steps of:

(a') selecting two or more nets within the SUT (preferably selecting half the nets of the SUT at a time) for simultaneously receiving a pulse-shaped test signal whose waveform includes both the first level of signal magnitude and the second level of signal magnitude;

(b') driving most or all non-selected nets of the SUT toward the second level of signal magnitude (which is preferably non-dominant relative to the first signal magnitude level) and holding them weakly at this second level such that an unexpected application of a dominant signal to any of the nonselected nets from an independent source (e.g., a short from a net at a dominant level) will override the second signal level to which they are weakly held;

(c') injecting the pulse-shaped test signal simultaneously into all the selected nets through further selected drive points of the selected nets;

(d') capturing the level present on at least one selected node, and preferably all nodes of each selected net to detect, preferably within a predetermined time span after one or more transitions occur in the injected test signal, the occurrence of responsive transitions at those other nodes of the selected nets;

(e') capturing the levels present on the nodes of the non-selected nets which were driven toward the second (preferably non-dominant) signal magnitude level in step (b') to assure that these non-selected nets have not switched to the first level of signal magnitude (as a result of, for example, a short);

(f') generating a list of addresses identifying all nodes where responsive transitions are detected;

(g') comparing the generated list with a list of expected addresses;

(h') flagging out missing or extra locations in the generated list;

(i') changing the set of selected and non-selected nets; and (j') repeating steps (a') through (i') until every "relevant" pair of nets, has been tested with each net in the pair having served once as the toggled (selected) net and the other time as the non-toggled (nonselected) net. (A net pair is deemed "relevant" when there is a reasonable chance that one member of the pair might short to the other member of the pair. When two nets respectively extend exclusively at opposed left and right sides of a wide board, it is unlikely that a short will develop between the two nets. In such a case the pair is not relevant.)

A binary bisection technique is preferably used at step (i') to minimize the number of passes needed in changing the sets of selected and non-selected nets.

The STMO and MTMO methods are not mutually exclusive. MTMO may be used to quickly determine if a fault exists, and if the answer is yes, then STMO may be used to further isolate the fault.

Note that in cases where it is desirable or only possible to merely detect the presence of a short between two nets, without precisely isolating the location of the fault within the module under test, it is sufficient to toggle one of the nets to the H level and to simultaneously toggle the other net to the L level at a first time point, then to switch the levels at a second time point and to verify that both levels are observed for each of the nets. This operation is useful for example in cases where a network-driving gate has two outputs of opposed polarities driving respective first and second nets. The gate cannot drive both nets simultaneously to the same level.

STMO and MTMO are not the only methods to be supported by the common architecture. There is an additional test method supported by the disclosed on-chip architecture. The additional method may be referred to as the "Walking NonDominant Level" (WNDL) test.

At levels of modularity above the board level, such as at a frame or multi-frame or system-level, the number of module-interface terminals in the system-under-test (SUT) can become very large (e.g., more than 1,000,000). Typically, faster fault detection is desirable even at the expense of not being able to isolate a fault beyond being able to say that it relates to a specific board or cable. A likely fault is an improperly routed cable end. Once a fault is localized to a particular cable, the cable is inspected to see if it is properly routed. If not, it is re-routed. If yes, it is unplugged and replaced with a factory-fresh cable. The WNDL test is preferably used in such situations to localize faults to a specific cable. It is not necessary to isolate faults down to individual wires.

The WNDL test may be useful in other situations where a degree of fault isolation less than that offered by STMO or MTMO is acceptable. This occurs for example at the higher levels of modularity where it is known that the interconnect structures within lower levels of modularity have already been verified.

The Walking Nondominant Level (WNDL) test is similar to either the walking ones or walking zeroes test depending on which logic level, one or zero, is represented by the dominant level in the system under test (SUT). Initially, all nets which extend across the module boundary (e.g., those which extend off-board in the case where a board is considered a FRU) are driven to the dominant signal level using, for each boundary-crossing net, a single net driver at one end (first node) of that boundary-crossing net to generate the dominant level. As an optional next step, the level present at a second end (second node) of every boundary-crossing net in the SUT is observed to verify that the second end is being driven to the dominant level. Preferably, for each given net, the second node is chosen such that the signal-travel distance between the driving first node and the observed second node is the longest possible for that net. (Optionally, nodes other than those most distanced from the driving first node may also be observed for each net.) If a dominant level is not observed to have developed on one of the nets, this indicates the presence of a fault; a dysfunctional line driver or an open circuit, for example.

Next, one of the boundary-crossing nets is chosen and driven to a nondominant level from its first node while all other boundary-crossing nets continue to be driven to the dominant level. The chosen net is then essentially surrounded by a sea of dominant nets. A short from any one of the surrounding nets will overpower the driver of the chosen net and produce a dominant signal level on that net. Preferably, an observation is made of the level developed at the second node of the chosen net, where again the driving node to observed node signal-travel distance is maximum. This is done to verify that all portions or at least a major portion of the chosen net is at the nondominant level. (Optionally, levels developed at nodes other than those most distanced from the driving node may also be observed for each net.) If a dominant level is observed to have developed at the second or other node of the chosen net, this indicates the presence of a fault, for example, a dysfunctional line driver or a short circuit.

The chosen net is next driven back to the dominant level, and if not done before, its second end is observed to verify that a dominant level is present there. A different net is chosen thereafter and the process is repeated until all boundary-crossing nets have been chosen.

From the above-described test methods (STMO, MTMO, WNDL), it is seen that either one, some or a majority or all nets of a system under test (SUT) have to be selectively driven either toward a dominant signal level or non-dominant signal level. In some tests, a rapidly-switching transitory test signal has to be introduced into signal paths which carry normal-mode (functional) signals. The responses to this rapidly-switching test signal have to be detected within a predetermined time span. In other tests, groups of nets have to be simultaneously held at one level or the other.

An on-chip architecture which implements the above mentioned tests should provide on-chip means for carrying an externally generated stimulus signal from an input pin, through the chip selectively to one or more net-driving pins on the same chip or it should have an on-chip stimulus generating means so coupled to the one or more net-driving pins. It should further provide (where the signalling technology encompasses concepts such as dominant and nondominant) means for selectively establishing either a dominant or nondominant signal level at each net-driving pin. It should moreover provide means for detecting the response or non-response developed at each net-driven pin (and/or each net-driving pin) of the chip, when one or more stimulus signals are applied to the interconnect-network. It should provide means for relaying the level developed at each net-driven/driving pin through the chip to a chip-external point where the level can then be observed and used for analysis.

Where the timing of detection is important, the on-chip architecture should further provide means for capturing a responsive or nonresponsive signal level developed at each network driven/driving pin within a predefined time span after a stimulus is applied to the network under test (NUT). And most importantly, because the network-under test is intended for use with functional circuitry, the on-chip architecture should provide means for switching each chip between a test mode and a nontest mode (functional mode) so that during test mode, network verification tests can be carried out without interference from on-chip functional circuits and conversely, during nontest mode, functional circuits can operate substantially without interference from test-supporting circuitry.

With regard to the operation of carrying an externally generated stimulus signal from a chip-external point, through the chip selectively to one or more net-driving pins, there are two basic approaches. The first is termed here as the "shift-to-inject" approach. It encompasses already-known on-chip scan structures such as boundary-scan LSSD. In such structures, an on-chip serial shift register is provided and respective outputs of the shift register are coupled either directly or indirectly to corresponding output pins of an IC chip in order to deliver test signals from a chip external point to selected ones of the chip output pins. Stimulus levels are applied at one end of the shift register, and shifted synchronously through the register until appropriate bits align with appropriate output pins of the chip.

The JTAG and IEEE 1149.1 boundary-scan architectures are included in the shift-to-inject class. A parallel-load register is interposed between the outputs of the serial shift register and the chip output pins. After stimulus levels are applied at one end of the shift register, and shifted through for proper alignment with the chip's output pins, the signals are transferred in parallel from the shift register to the parallel-load register. Once loaded into the parallel-load register, they appear simultaneously or substantially at the same time on the chip's output pins and are thus injected into interconnect network under-test (NUT).

The second approach for carrying an externally generated stimulus signal from a chip-external point, through a chip selectively to one or more net-driving pins, is termed here as the "asynchronous propagate-to-inject" approach. Test levels are asynchronously delivered through each stimulus injecting chip to its respective injection pin/pins. A detailed description of how this is done is provided later on.

With regard to the operation of relaying the responsive or nonresponsive level developed at each net-driven/driving pin through the chip to a chip-external point for observation at the chip-external point, there are, again, two basic approaches. The first is termed here as "shift-to-observe" and it again encompasses architectures such as LSSD, JTAG or IEEE 1149.1. Signals are moved from each response-developing or non-developing pin of the chip into the serial shift register (by latching them into the stages of the shift register) and then they are synchronously shifted out to a chip-external point for observation and analysis.

The second approach for relaying the level developed at each net-driven/driving pin through the chip to a chip-external point is termed here as the "asynchronous propagate-to-observe" approach. Response or non-responsive levels are asynchronously returned from the response-developing/non-developing pins of each chip, through the chip, to an external point for observation and analysis. A detailed description of how this is done is provided later on.

In accordance with the invention, it is preferable to implement both the "asynchronous propagate-to-inject" approach and the "asynchronous propagate-to-observe" approach in one on-chip architecture.

The preferred on-chip architecture comprises: (1) means for selecting one or more nodes to be driven either toward a dominant signal level or non-dominant signal level; (2) means for functionally mixing a rapidly-switching transitory test signal into signal paths which carry normal-mode (functional) signals; and (3) means for detecting responses and non-responses to this test signal within a predetermined time span.

More specifically, an apparatus in accordance with the invention comprises:

(a″) mode control means for switching a system under test (SUT) between a nontest functional mode (F-mode) and a network-verification test mode (NVT-mode);

(b″) a plurality of- mix-in circuits, each for functionally mixing an externally or internally generated test signal into the path of a functional output circuit, each mix-in circuit having an output-and plural inputs, the input signals of each mix-in circuit being characterized as being either controlling of the output signal of the mix-in circuit or noncontrolling;

(c″) Q-state enforcing means for forcing functional signals entering inputs of each mix-in circuit to noncontrolling levels independently of levels present on the chip's input pins when the system is in the test mode (NVT-mode), and also for blocking transitions which may appear on functional paths which flow through the chip from being passed on to net nodes under observation when the system is in the test mode (NVT-mode);

(d″) steering means for steering an externally generated test signal, or an internally-defined test level, to the test-signal receiving inputs of one or more of the mix-in circuits;

(e″) background level-maintaining means for maintaining a background level (e.g., dominant or nondominant) at net-driving points which are not selected to receive the steered test signal of the steering means;

(f″) function-mode protecting means for maintaining a noncontrolling level at the test signal receiving input of each mix-in circuit when the system is in the functional operating mode (F-mode);

(g″) coupling means for coupling the output of each mix-in circuit to a corresponding node of an interconnect net within the SUT;

(h″) response/nonresponse-detect means for interrogating relevant ones of the interconnect nodes of the system under test during the test mode (NVT-mode) to detect the occurrence or non-occurrence of responsive signal levels at the interrogated nodes (sometimes within a predetermined time span) after a test signal, having at least one level transition, is delivered to the mix-in circuit;

(i″) identifying means for identifying the nodes at which responsive signal transitions were detected; and (j″) comparing means for comparing the identified nodes against a list of expected nodes.

SUMMARY OF THE INVENTION

Among the numerous facets or features and subfeatures of the invention, the invention may be summarized as having the following highlight-worthy aspects:

First, an on-chip (or other in-module) architecture is provided for supporting a variety of network verification tests at the local and higher levels of modularity.

Second, when a transitional stimulus is applied, network verification is preferably based on recording the locations of response-developing points (RDP's) where transitions occur rather than recording the static (steady state) levels present at all points which, without knowing anything specific about the network and the circuitry it interconnects, "potentially" could be response-developing points (the latter are referred to as PRDP's or "potential response-developing points").

This second concept needs some further explanation. Although most nodes in a digital system under test will exhibit static levels in the long run, only those which are coupled (correctly or erroneously) to the node receiving the transitory test signal will exhibit responsive transitions after the test signal is introduced. The number of transiently responding nodes is usually much less than the total number of nodes within the interconnect network under-test (NUT). An exclusive-OR means (XOR) or the like is utilized during test execution to discriminate between nodes which exhibit responsive transitions and those that do not. Signals representing information about non-responsive nodes are ignored or filtered out. Test result information is recorded only for interrogated nodes which exhibit responsive transitions. The test method filters out information about nodes where no responsive transitions are observed before result recordation is undertaken. A smaller amount of test result data is recorded and/or analyzed by the network verification method of the invention. Recordation and analysis therefore take less time and/or memory space.

A third highlight-worthy point of the invention is seen in its asynchronous propagate-to-inject embodiments. A test signal mixing means delivers the test signal to the selected injection node through a clock-independent path (a so-called asynchronous or combinatorial logic path). No functional clock signals of the SUT are required for delivering the transitory test signal to the injection node. Functional clock lines of the SUT may be verified in the same manner as any other net within the system under test. Also, the timings of features in the waveform of the transitory test signal can be varied as desired because their timings are not dependent on the frequency of the SUT functional clock.

A fourth highlight-worthy point of the invention is further seen in its so-called "functional mix-in" embodiments. Little or no delay is introduced to the flow of normal-mode (functional mode) signals by the addition of net verification circuitry. The test signal is functionally mixed into an appropriately selected input point along the normal-mode signal paths of the system under test. Typically, this is done by expanding the number of inputs on an OR or AND gate already present in the functional circuitry or by using a spare input of such a gate for functionally mixing the test signal into the output path of functional circuitry. Where circuit design allows, the test signal can be functionally mixed in by way of a wired-OR or a wired-AND connection.

Since the test signal is functionally mixed-in rather than being switching-wise forced in, by means of a series-added switch, into the normal-mode signal carrying paths, the signal delay of a series-added switch is not added to the normal-mode signal carrying paths of the functional mix-in embodiments of the invention. Injecting the test signal into the normal-mode signal paths by way of functional mixing-in does not add any substantial delay either to the normal-mode signal paths; or to the delivery path of the test signal itself in cases where it is relayed from a chip-external point, through an IC chip, to a stimulus injecting pin of the chip. (A stimulus level can also be defined from within the net-driving IC rather than being routed through from a chip-external point.)

The functional mix-in aspect of the invention can be better understood by considering the following example.

A set of output buffers (e.g., amplifiers or level translators) is normally provided around the periphery of an integrated circuit for driving each IC output terminal to prespecified off-chip system levels (e.g., 0 and +5 volts in TTL systems). Such output buffers are included in series with the normal signal paths regardless of whether there is a built-in network verification circuit or not.

In one embodiment exhibiting the functional mix-in feature of the invention, an expanded output buffer (e.g., amplifier or level translator) which has at least two input terminals, and which performs a logic OR operation or logic AND operation on signals presented to its input terminals, is substituted into the design of a predefined functional circuit at a point where the functional design has an output buffer with only one input. (Alternatively, if such a multi-input buffer is already designed into the normal-mode circuitry and it does not have a spare input, it is expanded to include an additional input for receiving network verifying test signals. If it does have a spare input, the spare input receives mixed-in test signals.) For convenience sake, any such multi-input, net driving buffer is referred to as an "EOB" (Expanded Output Buffer).

The input terminal or terminals of the expanded output buffer (EOB) which receive functional signals during normal-mode (also referred to as "F-mode") are referred to here as the primary or functional input terminals of the EOB. The input terminal which receives the test signals during net verification test-mode (NVT-mode) is referred to as the secondary or test input of the EOB.

Signal propagation delay from the primary input terminal(s) to the output of the EOB is substantially the same as the input-to-output delay of the original (non-expanded) buffer in the functional circuit design. The inclusion of the secondary input in the EOB does not add any substantial delay to the normal-mode signal paths.

Since output buffers are normally included in digital circuits for driving each module output terminal regardless of whether there is a built-in net verification circuit or not, little or substantially no delay is introduced into the path of the normal mode signals by substituting expanded output buffers (EOB's) into each module in place of the original (non-expanded) output buffers within the functional (nontest) design. The extra secondary-input of each expanded buffer does not cause it to consume a significantly larger amount of circuit space than did the original buffer.

If an EOB performs a logic OR or NOR operation on its inputs, it is referred to as an OR-type EOB.

Given an OR-type EOB, when the nontest functional mode (F-mode) is active, a logic zero ("0") is consistently maintained to the secondary (test) input terminal of the expanded output buffer (EOB), while a normal-mode signal is applied to each of the primary input terminals. The constant logic zero ("0") at the secondary input is considered a non-controlling signal level. When a logic one ("1") is presented at any primary input terminal, this logic one ("1") determines the output level of the expanded output buffer (OR-type) and it is thus considered the controlling signal level. As long as the non-controlling signal level ("0") is maintained at the secondary input terminal, normal mode signals flow from the primary input terminals of the OR-type EOB to the output terminal of the module without being affected by the signal on the secondary input terminal.

During net verification operations (NVT-mode), the normal-mode circuits of the system under test are put into a Quiescent-state (Q-state). When the Q-state is enforced, non-controlling signal levels appear on all primary input terminals of every EOB that is participating in network verification. The Q-state can be invoked by scanning appropriate logic levels into memory elements (e.g., latches, flip flops, RAM cells) that control the normal-mode circuits.

For the case of each OR-type EOB, the Q-state is arranged such that a logic zero ("0") is consistently applied to all primary input terminals of the OR-expanded output buffer while either a transitory test signal or a static level is applied to the secondary input terminal of the OR-expanded output buffer. In the case where a transitory test signal is applied to the secondary EOB input, the same test signal is reproduced in buffered form at the output terminal of the expanded output buffer for injection into the associated net.

The functional mix-in feature of the invention is not limited in applicability to the output buffer of each module. The test-signal mix-in point can be positioned anywhere along the normal signal path where convenient, it does not have to be at the input side of an output buffer. Mix-in can occur after the output buffer, for example by wire-ORring together the outputs of two output buffers (where one buffer generates a functional signal during F-mode and the other buffer generates test levels during NVT-mode). Alternatively, mix-in can occur in the functional signal carrying paths well before they reach the module output buffer. In a case where the test signal is functionally mixed-in before the output buffer, all normal-mode signals which functionally mix into the path of the test signal have to be placed in non-controlling states (Q-states) during the NVT-mode.

Preferably, mix-in points are defined as points near or at the output terminal of the module where (a) an unused gate input exists or where (b) a gate can be expanded to have an additional input without causing excessive delay or where (c) a wired-AND or wired-OR mix-in function can be performed without adding excessive delay.

The above-described functional mix-in feature of the invention is not limited to mixing means which perform only the OR function. If the mixing means instead performs an AND function, a logic zero ("0") would be considered the output controlling level and a logic one ("1") would be considered the non-controlling level.

The functional mix-in feature of the invention can be described in yet more general terms as providing a signal mix-in means with at least two input terminals where the output of the mix-in means is fully determined by applying a controlling input signal to at least one of the input terminals and where the output of the mix-in means is not affected by the simultaneous application of a non-controlling input signal to any one or more others of its input terminals.

Primary ones of the input terminals belonging to the mix-in means receive normal-mode (functional) signals. A secondary one of the mix-in input terminals receives test signals. Each of the normal-mode (functional) signals and test signals is selectively placed into either a non-controlling state or a controlling state depending on whether the system is in a normal-mode (F-mode) or a net verification test mode (NVT-mode).

The path from a primary input terminal of the mixing means to the output of the mixing means should not delay normal-mode signals substantially more than they would be delayed if the test signal were not mixed in. The mixing function of the mix-in means can be linear (e.g., addition) or non-linear (e.g., multiplication). If the mixing means performs a linear additive operation or a subtractive operation, then zero (0) would be considered a non-controlling input level. If the mixing means performs a non-linear, multiplicative operation or a divisive operation, then unity (1) would be considered a non-controlling input level.

Another highlight (fifth feature) of the invention deals with technologies wherein one or the other of the logic one ("1") and logic zero ("0") signal levels developed in the nets under test is dominant over the other when a contention condition occurs.

In the case where a static level is applied to the secondary (test) input terminal of an EOB, the output voltage or current signal which emerges at the module output terminal may be controlled to be either a nondominant signal (which can be overpowered by a dominant signal injected elsewhere into the associated net) or a dominant signal which may be used to overpower nondominant signals. The production of dominant and nondominant signals is useful in cases where undesirable contention conditions such as shorts are being tested for. It will be seen that in the case of a later described embodiment, the mix-in circuitry is designed such that dominant background levels ("d") automatically develop at non-selected off-board net sections (so-called E and W conductors) and such that nondominant ("nd") background levels automatically develop at non-selected on-board nets (so-called T conductors).

Yet another highlight (sixth feature) of the invention is that relatively little circuit space or power is consumed by the inclusion of the net verification circuitry in conjunction with other test circuitry. When selection latches are already designed into the circuitry for performing other mutually-exclusive tests, such as a delay test (DT), the same selection latches can also be used for selectively steering test signals to desired stimulus injection points during a network verification test.

As will be seen in the below detailed description, a set of relatively small net-verify steering gates (NVS) are used in conjunction with the shared latches to select one or more of plural mix-in means and to deliver either a one-flavored or a zero-flavored test control signal (CNV[1] or CNV[0]) to the secondary input terminals of the selected mixing means.

A seventh highlight of the invention is found in asynchronous propagate-to-observe embodiments. A built-in scan subsystem having a clock-independent return path is used in each module for interrogating all module-internal points that are coupled to interconnect network nodes and for returning the signals present on those module-internal points either to an external test fixture or to an on-board net-verify control unit (NVU). Signal return time to the tester/NVU is independent of the clock period of the system under test. The test-fixture/NVU can therefore determine whether transitions responsive to the injected test signal have occurred within a predetermined time span at various nodes of the interconnect network, where the predetermined time span is selected independently of the system clock frequency. The "predetermined" time span for detecting responsive transitions can be freely adjusted therefore to any value which best detects the absence/presence of line-conditioners (e.g., terminating resistors) on nets which should/should-not have such conditioners.

An eighth highlight of the invention is that a fault-tolerant structure is used for mixing the test signal into the normal-mode signal paths during NVT-mode and for preventing the mix-in of controlling test signal levels into functional circuit paths during nontest F-mode. At least two latches (a global-protect latch which generates a "GP" signal and a group-protect latch which generates a "gP" signal) must be switched out of test-disabling states (protective states) before the test-signal mix-in operation can occur. If one of the test disabling latches is unintentionally flipped by noise during a non-test mode, controlling test levels are still blocked from mixing into the functional signal paths. At the same time, an error detecting system automatically detects the error and sends an error-condition report to a service processor (SVP). The service processor then uses the scan network to flip the erroneously toggled latch back to its protective state.

An additional highlight of the invention is that the output wire which carries the error signal to the SVP is itself verifiable by way of the disclosed invention. Briefly, an OR gate which drives the error signal wire is, itself, considered a test signal mix-in point and appropriate test signal levels are functionally mixed into it as will become apparent in due course.

The fault-tolerant structure may, as an option, be additionally used for over-riding the normal-mode signals during NVT-mode to place the normal-mode signals in non-controlling (Q) states. When the test-disabling latches are so used for creating the Q-state in the normal-mode signal paths, the same safety provision applies to the Q-state, namely, that at least two test disabling latches must be switched into test-enabling states (GP and gP both have to go low) before the Q-state is enforced in the normal-mode signal paths. A noise-induced flip of one the F-mode protecting latches (the global-protect latch and a group-protect latch) is not enough to enforce the Q-state.

These and other features of the invention will be more readily understood from the below detailed description.

BRIEF DESCRIPTION OF THE DRAWINGS

FIGS. 3J and 3K combine to show the circuitry of an IC chip in accordance with FIGS. 3A–3I in more detail.

DETAILED DESCRIPTION

Figure 1A:
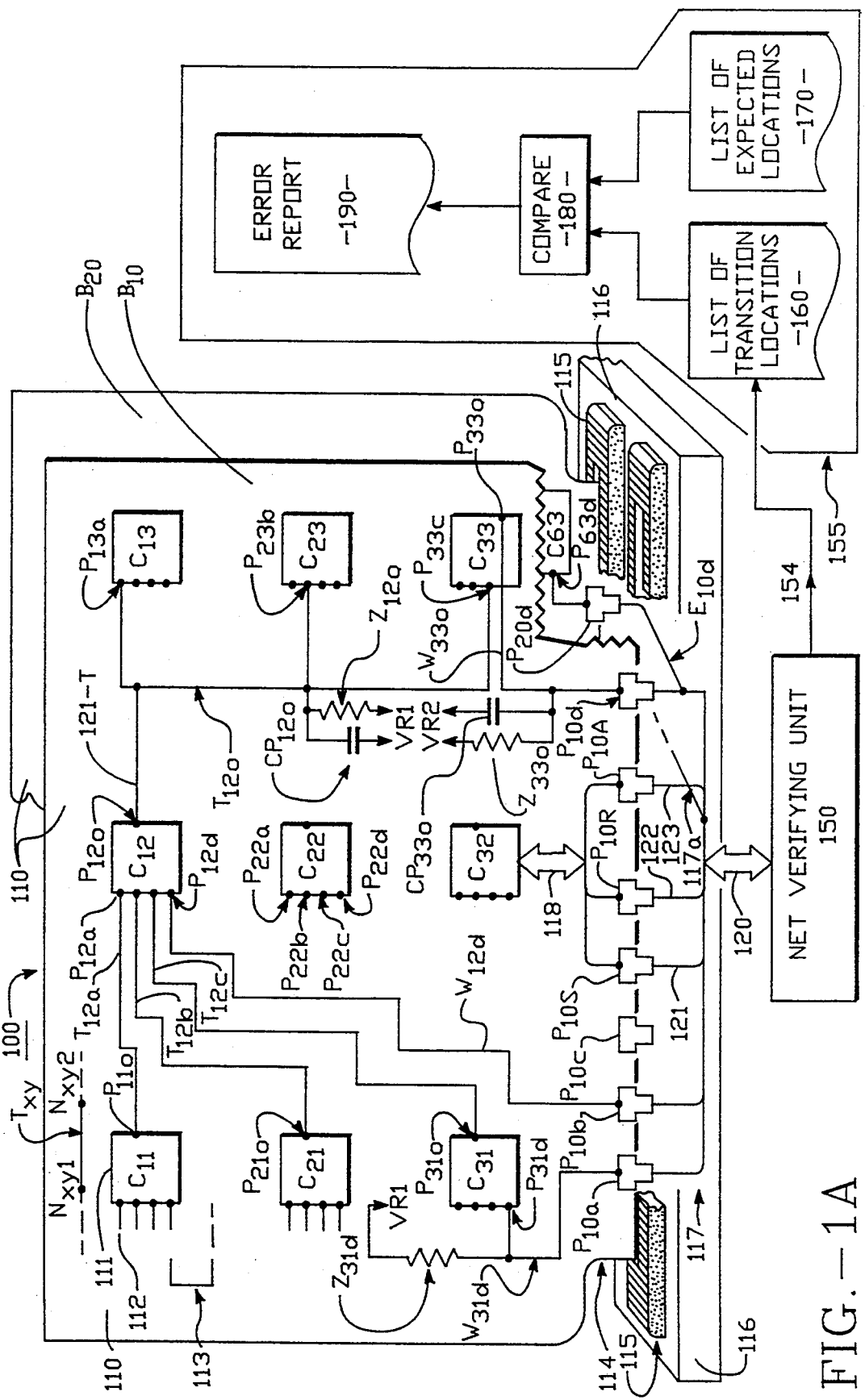
FIG. 1 shows a multi-board testing system in accordance with the invention.
FIG. 1B shows a previously known memory organization.
FIG. 1C shows a memory organization in accordance with the invention.
FIGS. 1D and 1E are timing diagrams of stimulus and response signals used by the invention.
FIG. 1F is a block diagram showing various ways to capture response levels and determine whether a transition has occurred at a response capture point.

Referring to FIG. 1A, a first auto-testable system 100 in accordance with the invention is shown. Network verification can take place in an automated, contactless manner within this system 100 to verify the on-board interconnect structures of individual boards belonging to the system and/or to verify the off-board interconnect structure of plural boards which are mounted into a supporting frame.

The system 100 comprises one or more printed circuit boards 110 (two shown) to which a plurality of integrated circuit (IC) chips 111 are fixedly mounted. It will be seen that the invention does not require removal of the chips 111 during network verification, and moreover, net verification can occur in situ in one part of a system while a second part is concurrently running in a non-test, normal mode.

Each IC chip 111 can be individually packaged or it can be encapsulated with other similar chips in a multi-chip carrier. A plurality of interface pins 112 are provided on each IC chip (or carrier) 111 for connecting internal circuits of the chips (or carrier) 111 to external circuits. A typical VLSI (Very Large Scale Integration) chip can have as many as 200 or more package interface pins.

Each printed circuit board 110 includes either all or parts of a system interconnect network 113. The on-board parts of the system interconnect network 113 can include printed circuit traces and/or multi-wire cables which are mass produced and used for interconnecting the pins 112 of the IC chips 111 to one another and to other system components (e.g., to impedance $Z_{31d}$, the other end of which connects to reference voltage level VR1). The on-board parts of the interconnect 113 may also include "rework" wires, jumper wires and/or trace cuts which are manually added/made after the board is mass produced. The interconnect structure may additionally include manually activated configuration switches provided on each board (not shown).

Each printed circuit board 110 includes a plurality of board interface terminals 114 which are provided for coupling the on-board parts of the interconnect network 113 to off-board components.

Board terminals 114 typically mate with a corresponding board connector 115. Each board connector 115 can be part of a discrete cable or part of a motherboard or frame 116 which supports and/or interconnects a plurality of printed circuit boards (e.g., boards, $B_{10}$ and $B_{20}$). A frame bus 117 is included in the frame structure 116 and used to interconnect spaced apart boards 110 as indicated by frame bus extension 117a or discrete off-board wire $E_{10d}$.

As seen at the bottom of FIG. 1A, the board terminals 114 of each printed circuit board 110 are connected to a net verifying unit (NVU) 150 by way of a test bus 120. The test bus 120 connects to the board interface terminals 114 either through individual board connectors 115 or through the frame bus 117. The net verifying unit (NVU) 150 and signals carried over the test bus 120 will be described in more detail later.

For the sake of simplified referencing, each wire, printed circuit board trace, or other portion in a conductive net of the interconnect network 113 which is located exclusively on one board will be referenced by the symbol "T" (for Trace) and this symbol will be followed by further subscripts as found, for example in $T_{12a}$, to further identify an individual on-board net where necessary. Each portion of an interconnect net which is located exclusively off-board ("E"xternally of the boards 110) will be referenced by the symbol "E". Each portion of a net which couples an on-board component to an off-board component will be referenced by the symbol "W". To remember all three types of nets, think of "nETWork."

Each integrated circuit chip of each printed circuit board 110 will be similarly referenced by the symbol "C", followed by further identifying subscripts.

Each pin of each integrated circuit chip or each terminal of each printed circuit board will be likewise referenced by the symbol "P". The symbol "B" is used to identify individual ones of the printed circuit boards 110. The symbol "Z" is used to represent line-conditioning components such as resistors that are coupled to the interconnect network 113 for line pull-up, pull-down or impedance matching functions. The symbol "CP" refers to parasitic or other capacitances. Nodes are represented by the symbol "N".

Each net, which is composed of one or more of portions $T_{xy}$ or $E_{xy}$ and $W_{xy}$ (x and y are arbitrary identifiers here), is defined to include at least two points or nodes, a first drive point ($N_{xy1}$) which may be used for injecting a test signal into the net and a second response-developing point ($N_{xy2}$) which may be used for detecting receipt of the injected test signal. (Note: in some instances, a drive point also serves as a response-developing point.)

The front one, $B_{10}$, of the illustrated boards, $B_{10}$ and $B_{20}$, is shown to be populated by a plurality of integrated circuit chips $C_{11}$, $C_{12}$, $C_{13}$, ... $C_{33}$. The lower right corner of board $B_{10}$ is broken away to expose one chip $C_{63}$ of the plural chips (not shown) populating the rearward, second board $B_{20}$.

Each integrated circuit chip $C_{xy}$ ("x" and "y" are arbitrary identifiers here) has a number of signal input pins which are respectively labeled according to their chip number, xy, as $P_{xya}$, $P_{xyb}$, $P_{xyc}$, $P_{xyd}$, and at least one signal output terminal which is similarly labeled as $P_{xyo}$. This labelling format is chosen for simplifying explanations presented herein. It does not, however, preclude any pin labelled either $P_{xya}$ or $P_{xyo}$ from being bidirectional and serving as both an input and output for its respective chip.

Individual terminals 114 of the printed circuit boards 110 are referenced similarly according to their board number. Board $B_{10}$ for example is shown to have respective pins $P_{10a}$, $P_{10b}$, $P_{10c}$, $P_{10d}$, etc. The pins (terminals) of the second board $B_{20}$, although not all shown, will be referenced as $P_{20a}$, $P_{20b}$, $P_{20c}$, $P_{20d}$, etc.

Each exclusively-on-board net, $T_{xy}$, or off-board net section, $E_{xy}$, or cross-over net section, $W_{xy}$, is identified (in general) by a number corresponding to the number of at least one pin, $P_{xy}$, connected to that net. Thus, net $T_{12a}$ is an on-board conductor which connects pin $P_{12a}$ to pin $P_{11o}$. Net $T_{12b}$ connects pin $P_{12b}$ to pin $P_{21o}$, and so on. Boundary-crossing net section $W_{31d}$ connects board terminal $P_{10a}$ to interconnect terminal $P_{31d}$ of chip $C_{31}$ as shown. Net section $W_{33o}$ couples chip pin $P_{33o}$ to board terminal $P_{10d}$. Off-board net section $E_{10d}$ connects the same board interface terminal $P_{10d}$ to board interface terminal $P_{20d}$ of the next board $B_{20}$.

A network verification method will now be described by focusing on chip $C_{12}$, which is located at the top middle of board $B_{10}$. Its associated nets, $T_{12a}$, $T_{12b}$, $T_{12c}$, $W_{12d}$ and $T_{12o}$, respectively connect chip input pins $P_{12a}$, $P_{12b}$, $P_{12c}$, $P_{12d}$ and chip output pin $P_{12o}$ to other parts of the system 100. Net $T_{12o}$ is supposed to connect output pin $P_{12o}$ to chip pins, $P_{13a}$, $P_{23b}$ and $P_{33c}$, plus line-terminator $Z_{12o}$. Net $T_{12o}$ is shown to be characterized by a parasitic capacitance $CP_{12o}$ which is to be discharged by line terminator $Z_{12o}$. (Both connect to a first reference voltage level, VR1.) Net $W_{33o}$ is similarly shown to have a parasitic capacitance $CP_{33o}$ and line terminator $Z_{33o}$. (Both connect to a second reference voltage level, VR2.)

Assume that all parts of net $T_{12o}$ are to be verified. Suppose further that verification is to be performed in a contactless manner by electronically probing points on board $B_{10}$. Stimulus and response signals are respectively transmitted over the test bus 120 and through board terminals $P_{10S}$ and $P_{10R}$ to perform such probing. The verification cannot rely on other nets such as, $T_{12a}$, $T_{12b}$, $T_{12c}$ or $W_{12d}$, for conducting stimulus and response signals if these other nets have not yet been verified.

It is possible, however, to verify the nets of a scan testing bus 118 provided on each board by using a variety of known scan testing techniques. In one embodiment of the invention it is further possible to detect shorts between lines of scan test bus 118 and other lines, as will become apparent below.

Test patterns are transmitted over each bus 118 to load scan latches in some or all chips of the boards. While a connection of the scan bus 118 is shown to only chip $C_{32}$, it is to be understood that scan bus 118 couples to scan circuitry within all or most chips on each board either directly or indirectly (e.g., through a scan distribution chip, which might be chip $C_{32}$).

Moreover, although test bus 120 is shown to be separate from scan bus 118, it is to be understood that NVU 150 could couple to the components of board $B_{10}$ directly through scan bus 118, in which case buses 118 and 120 merge to become one and the same.

After bus 118 is verified, it is used to carry signals to and through chip $C_{12}$ (connection not shown) and to drive pin $P_{12o}$ from within chip $C_{12}$ to a desired first signal level. Bus 118 is concurrently or thereafter used to detect the levels present on at least one, but preferably as many as possible of all scannable IC pins of each board $B_{10}$ under test. The scannable set should include at least one of pins, $P_{12o}$, $P_{13a}$, $P_{23b}$ and $P_{33c}$, with the levels of these pins being respectively coupled to scannable response-capturing points within their corresponding IC chips, $C_{12}$, $C_{13}$, $C_{23}$ and $C_{33}$.

If the intervening portions of the on-board net $T_{12o}$, between pins $P_{12o}$, $P_{13a}$, $P_{23b}$, $P_{33c}$, are intact, the levels on pins, $P_{12o}$, $P_{13a}$, $P_{23b}$ and $P_{33c}$ should be same as that of the test signal originally injected into the net $T_{12o}$ through net driving pin, $P_{12o}$. If there is a short circuit between net $T_{12o}$ and some other net, the levels on pins $P_{12o}$–$P_{33c}$ may be other than the levels injected into net $T_{12o}$ by way of pin $P_{12o}$, and/or unexpected levels may appear on the pins which belong to the other net.

To test portions of the board-boundary cross-over net section, $W_{33o}$, or the corresponding off-board net section, $E_{10d}$, a further net-driving point $P_{33o}$ located in chip $C_{33}$ is driven by injecting a stimulus signal into chip $C_{33}$, relaying it through chip $C_{33}$ to pin $P_{33o}$, and scanning out a responsive signal from a response-capturing point located within chip $C_{63}$ where the response-capturing point is coupled to pin $P_{63d}$. Network verification questions such as: (1) whether continuity exists between pin $P_{33o}$ and pin $P_{63d}$, (2) whether the net formed by sections $W_{33o}$ and $E_{10d}$ is subject to a stuck-at fault, and (3) whether the net is subject to excessive capacitance or inductance, are answered by generating a high level at pin $P_{33o}$ and then a rapid transition to a low level at pin $P_{33o}$, and detecting the development of appropriate and timely response levels at pin $P_{63d}$.

Each board 110 includes a scan bus such as bus 118. The scan bus 118 couples a dedicated subgroup of the board interface terminals, such as pins $P_{10S}$, $P_{10R}$ and $P_{10A}$, to most or all the chips 111 of the board. The net verification unit (NVU) 150 connects to these pins either directly by way of test bus 120 (when boards are tested individually) or indirectly through frame bus 117 (when boards are tested while positioned on frame 116). A portion or all of NVU 150 can reside on the very board being tested (e.g. $B_{10}$), it does not have to be located off-board.

Pin $P_{10S}$ injects a stimulus signal 121 supplied from NVU 150 into board $B_{10}$. Pin $P_{10R}$ returns a response signal 122 from board $B_{10}$ to the NVU 150 to indicate a response of the board $B_{10}$ to the stimulus signal. Pin $P_{10A}$ (shown to right of pin $P_{10R}$) carries address signals 123, generated by the NVU 150, to board-level scan-input routing circuits (not shown) of board $B_{10}$ and to chip-internal scan-input routing circuits (not shown) of the IC chips on board $B_{10}$. The board-level scan-input routing circuits route the injected stimulus signal 121 from board pin $P_{10S}$ to one or more addressed chips (e.g. $C_{12}$) of the board. Chip-internal circuits (not-yet shown) then route the stimulus signal through the chip (e.g. $C_{12}$) to one or more net driving points (e.g. $P_{12o}$) which are further selected by the address signals 123.

Other chip-internal circuits (for example within $C_{23}$) route developed response signals 122 from an addressed one or more potential response-developing point or points (e.g. $P_{23b}$), through the chip (e.g. $C_{23}$), and back through board-level scan circuits to the response-returning board pin or pins $P_{10R}$ of each board.

If desired, stimulus and address signals could be serially shifted into a board together over a common board terminal or in parallel over a plurality of board pins. Similarly, serial and/or parallel boundary crossing techniques may be used for carrying stimulus, response and address signals into/out-of each IC chip.

As a further alternative, the respective input, output and addressing functions of pins $P_{10S}$, $P_{10R}$, and $P_{10A}$, can be replaced by the use of a so-called "mode pin" ($P_M$, not shown), a "scan-clock pin" ($P_K$, not shown), and a "combined scan-data/address pin" ($P_{SDA}$, not shown). Scan-data input/output and scan-data routing is performed by applying appropriate signal combinations to the $P_M$ and $P_{SDA}$ pins (not shown) in conjunction with the application of scan-clock signals to the $P_K$ pin (not shown). When the $P_K$ pin is inactive (no scan clocks are being delivered), pin $P_{SDA}$ may be used to carry an externally-supplied stimulus signal (test levels) to net injection points that have been pre-selected by scan data/address signals earlier loaded while scan clocks were active.

Additionally, certain scan address values can be dedicated such that their assertion works to both route and define a test signal simultaneously. (See Edwards, et al.

"Scannable System With Addressable Scan Reset Groups," Serial No. 07/670,289.)

Each potential response-developing point (e.g., $P_{13a}$, $P_{23b}$, $P_{33c}$; even $P_{12o}$ could be considered such a point until development of the injected stimulus level is verified thereat) has an associated scan-address, (X,Y) and an associated voltage level, V. (Note: the scan address can be of more than two dimensions, e.g., X,Y,Z.)

A first problem is how to best deliver a test signal for injection into a specified node of the interconnect network and how to best relay levels developed at what could be response-developing points of the network back to a point where they may be observed, analyzed and recorded. An ancillary problem is deciding what result data should or should not be recorded for analysis purposes.

Referring to FIG. 1B (prior art) a conventional method is shown for modeling an interconnect network as an array of what could be response-developing points. A not-yet-verified interconnect network is visualized as a tangle of conductors which correctly or incorrectly couple or do not couple each stimulus injecting node of the network to one or more other nodes. These other nodes are hereafter referred to as "potential response developing points" or PRDP's for short. It is not known until after the time a stimulus level is injected into one point in the not-yet-verified network whether and where in the network responsive levels will appear. Hence, all points in the network which might develop responsive levels, in response to the stimulus, are referred to as "potential response developing points" (PRDP's). (They are also later referred to as "response capture points".)

It is observed here that, in cases where information is not provided for excluding some nodes of the network as not being PRDP's, all nodes of the network have to be considered PRDP's, including the node into which the stimulus is first injected. (The network driving node might be unintentionally shorted to ground, in which case, an attempt to inject another voltage or a current signal into the network will not produce the expected response even at the network driving node.)

A matrix of memory cells 101 is formed with each memory cell 102 being addressable according to an X' address and a Y' address. Each memory cell is associated with a unique PRDP. A data item 103 representing either a first voltage level $V_1$ (denoted as "1") or a second voltage level $V_2$ (denoted as "0") is stored in each memory cell 102. A stored data item is represented generically in FIG. 1B at 103 as "V".

The conventional test/analysis method is based on first defining what level is to be expected at each PRDP for a given stimulus condition and recording these expectations in a first version of matrix 101. This first version of matrix 101 which contains the expected levels is referred to as the expectation list 270 (or 270* in a later described section 255* of FIG. 2). After a stimulus level is applied to a net driving point and the network settles into a steady state, the conventional test/analysis method seeks to detect the static voltage level, V, developed at each potential response-developing point (PRDP). The developed level is recorded. After developed levels are recorded in a second version 260 of matrix 101 for a block or all the PRDP's of the network, a comparison is made between each recorded value in second list 260 and the corresponding pre-recorded, expected value of first list 270. This comparison determines whether each pre-recorded item of information in expectation list 270 is relevant for purposes of network verification or not. Basically, information about an expected level at a PRDP becomes relevant when a difference is found between the expected level and the detected level.

This conventional approach is disadvantageous in situations where the network under test has a large number of potential response-developing points (PRDP's). By way of example, there can be as many as 10,000 or more module interface terminals on the printed circuit board of a mainframe computer. After a stimulus level is applied in the conventional method, the state of each PRDP has to be observed and compared against its corresponding pre-recorded expected value in order to detect undesired shorts or opens.

This means that the expected values for all 10,000 or more PRDP's have to be predetermined and stored in a corresponding 10,000 or more individual memory cells 102 of memory array 101 in order to produce list 270. As the conventional test/analysis method proceeds, each of the cells which define expectations list 270 have to be individually addressed and at least one data bit ("0" or "1") has to be read out from each such cell to represent the expected voltage level V at each PRDP, for each given stimulus condition.

Generally speaking, a bulk of the predetermined and recorded values for the expected "V" levels at each PRDP (list 270) will be of no significance to the outcome of the network verifying test. This is so because their corresponding PRDP's (potential response-developing points) are not coupled to the stimulus injection point and thus do not develop responsive levels. Time is wasted in determining the expected but not-significant values, "V", of all PRDP's, in recording them (to form list 270) and in later fetching them out of memory 101, only to discover in subsequent analysis that most of them are not of any significance to the results of the network verifying test.

Figure 2:
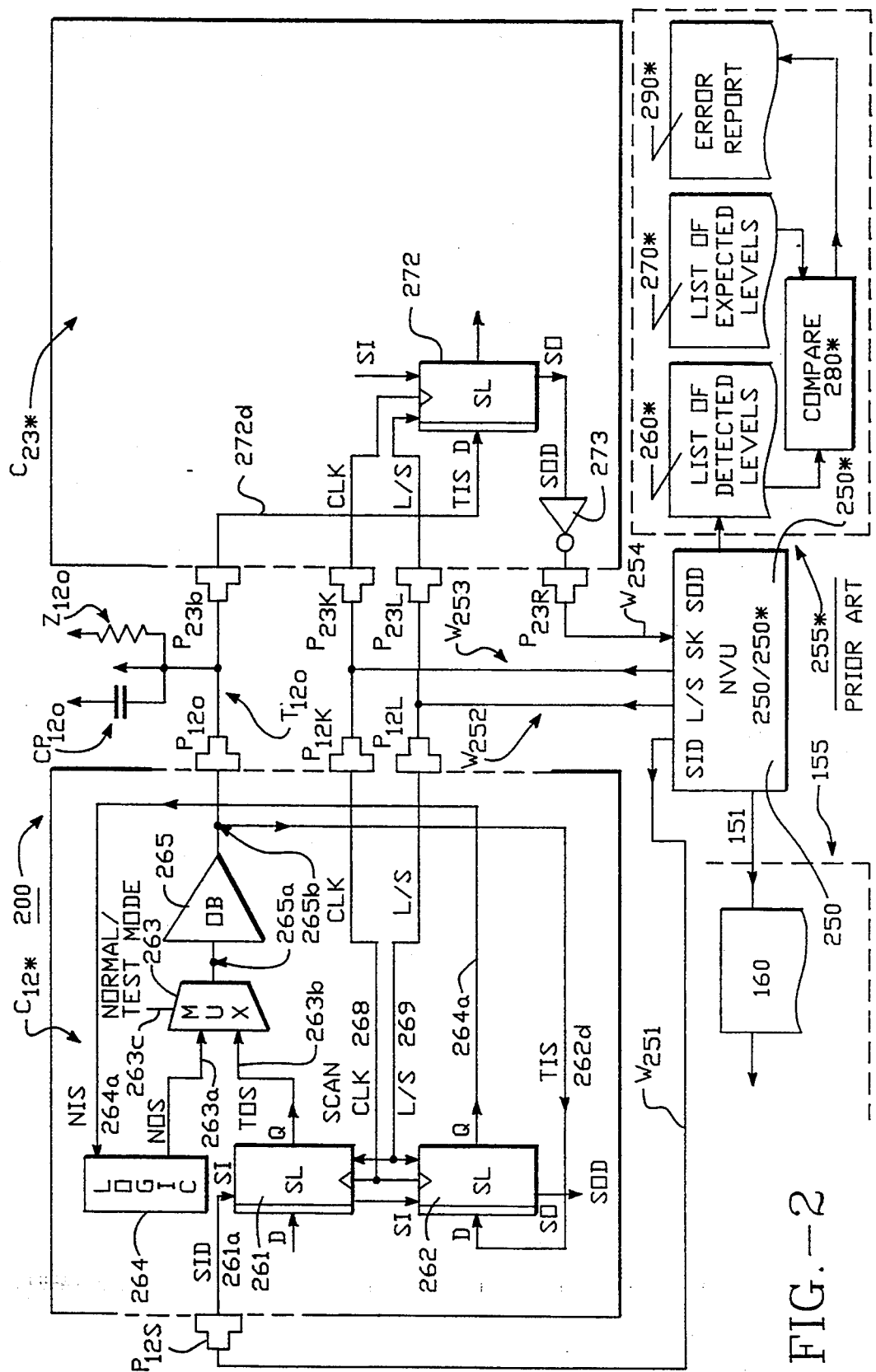
FIG. 2 shows a boundary scan architecture which is modified to implement a network verification method of the invention.

Referring to the bottom right corner of FIG. 2, a previous apparatus 255* for carrying out such a record-expected-values first and determine-significance-afterwards process is shown to highlight the problem. A list 260* of data items which represent either over time, or all at once, detected levels V of the entire interconnect network is compared against another list 270* of data items which represent, all at once, the expected levels for all the nodes of the same network. Comparing means 280* fetches data from lists 260* and 270* to perform the comparison. Significant test results are then stored in a further error-report list 290*. Another list (not shown) is used for correlating the memory addresses X'Y' of list 260* to physical addresses XY of the respective potential response-developing points where faults are believed to exist.

Comparing means 280* can be a central processing unit (CPU) which performs the comparison by addressing a first memory cell 103 in the first list 260 and fetching its stored data item "V", addressing a corresponding memory cell in the second list 270* to fetch its stored data item and comparing the fetched data items. If they do not match, an entry is made in the error report file 290* indicating the address within the first list 260* for which a mismatch was detected. The X',Y' address of each memory cell 102 as recorded in error report 290* is later converted into a physical node address X,Y to locate the node for which an error is suspected.

Since the list of expected levels 270* has to cover all or nearly all the scannable pins $P_{xy}$ on printed circuit board $B_{10}$ (FIG. 1), the comparing unit 280* must spend time comparing each data item in this long list of expected levels 270* against a corresponding data item in the sometimes equally long list 260* of detected levels. This has to be done separately for each stimulus condition. Large amounts of computer memory space may be disadvantageously consumed by lists 260* and 270* (particularly by list 270*). Aside from these disadvantages, error report 290* might fail to identify either the existence or the location of various interconnect faults such as missing or miswired line terminators, ($Z_{12o}$, for example). Moreover, if shorts exist between a plurality of parallel running or crisscrossing lines, error report 290* will fail to isolate the specific net or nets associated with each short.

Referring to FIG. 1C, an alternate and preferred approach will be described. One or a series of test pulses are injected into the net-under-test from a selected injection point to determine whether or not one or more responsive transitions occur at each PRDP. Each possible response-developing point (PRDP) is interrogated within a predetermined time span after each edge (transition) of the test pulses is introduced at the selected injection point. If a transition is detected within the predetermined time span at the addressed response-developing point (it is now an "RDP" rather than a PRDP because, by definition, it is no longer merely "potential"), then the scan address of the response-developing point (RDP) is recorded in a YES list, 106. If no transition is detected at a PRDP, then the network verification process does not record any corresponding data. Rather, the network verification process skips forward to address a next potential response-developing point and/or a next test signal injection point and repeats the test.

Preferably, the test increments through all potential response-developing points (PRDP's) associated with one test signal injecting environment before skipping forward to detect transitions developed by a next stimulus injecting environment. A stimulus injecting environment can consist of just one network node acting as the stimulus injection point or a plurality of nodes simultaneously acting as stimulus injection points. Testing is preferably completed around one stimulus environment at a time so that addresses of response-developing points (the RDP's where transitions are observed) can be conveniently grouped in list 106 according to their respective stimulus environments. Each group of detected transitions is logically linked to its corresponding stimulus environment. Then, when it is determined that a fault exists (because of a mismatch between items in lists 160 and 170 of FIG. 1A), it is relatively easy to also determine what the associated stimulus environment was and what other transitions were detected within that environment.

A hypothetical NO list (ghost list) 107 is illustrated in FIG. 1C to show what conceptually happens to location data which is not recorded in the YES list 106; it is discarded. Time is not wasted recording such nonsignificant data and memory space is not wasted for storing such nonsignificant data. Also, there is no need for predicting what response level or sequence of levels is expected for each PRDP.

Most of the potential response-developing points which are interrogated during net verification have nothing to do with the net-under-test. Only a few potential response-developing points will be correctly or incorrectly coupled to the net-under-test. Thus, as the test proceeds in an orderly manner by addressing each potentially response-developing point (PRDP) in sequence, $X_1Y_1$, $X_2Y_2$, $X_3,Y_3$, $X_4Y_4$, etc.; no transitions will be detected and the data items will be filtered out by ignoring their corresponding signals (mentally dropping them into the discarded hypothetical NO list 107).

Eventually, a response-developing point (RDP) which indeed is coupled to the stimulus injection point will be addressed, (response-developing point $X_6Y_6$ for example) and a responsive transition will be observed. Only the scan address $X_6Y_6$ of such an actually coupled point (RDP) is recorded in the YES list 106. Even after all RDP addresses are recorded, the YES list 106 will be relatively short in comparison to the never-formed (hypothetical) NO list 107. (Note: To simplify the conversion between scan address $X_6Y_6$ to a pin number for a variety of different chips, part of scan address $X_6Y_6$ is arranged such that it can be converted to a pin number, regardless of the type of chip involved. A predefined conversion algorithm common to all I/O pins of all chips in system 100 is used.)

Referring back to FIG. 1A, the advantages of the transition-YES/NO record/don't-record method can be explained now in more detail. A data analysis subsystem 155 in accordance with the invention is illustrated at the right side of FIG. 1A. NVU 150 generates a first list 160 of data items (e.g., $X_6Y_6$) which represent the locations where transitions were detected. Comparing unit 180 compares the first list 160 against a second list 170 of data items indicating expected locations. Second list 170 is basically the design net-list for the system under test (stripped of irrelevant data). Note that it is not necessary to predict what response level is expected at each PRDP for each stimulus environment. A list of the points that are supposed to be connected by each net of interconnect network 113 is sufficient.

Comparing unit 180 detects mismatches in the contents of the two lists, 160 and 170. Any data item in first list 160 which does not have a matching data item in the second list 170, or vice versa, is recorded in an error report file 190 together with an indication of where that data item originated, from list 160 or from list 170.

If a data item in error report 190 originates from the first list 160, this indicates a probable short circuit between the net of the stimulus injection node (the driven net) and the corresponding response-developing point, because a transition has been observed at an unexpected node not belonging to the net of the stimulus injection node.

If a data item in error report 190 originates from the second list 170, this indicates a fault. The fault could be an open circuit to the corresponding potential response-developing point and/or a faulty line conditioner or a short to a net whose own signal is not overridden by the stimulus signal (a net which is held at a dominant level). These possibilities arise from the fact that the expected transition at the addressed potential response-developing point has not been observed.

Each of the first and second lists, 160 and 170, has a data structure as basically indicated at 106 in FIG. 1C. While not expressly shown, it is to be understood that the YES addresses of lists 160 and 170 are grouped according to their actual or expected stimulus environments so that a quick association can be made between the addresses ($X_6Y_6$) stored in the lists 160 and 170 the actual/hypothetical test conditions which generated them.

It should be noted that the absolute storage location of a YES list (106) data item in the storage area of analysis unit 155 is not important. Corresponding location values of lists 160 and 170 do not have to be stored in precisely corresponding areas of the unit 155 storage means. What is relevant is whether, for each test configuration (each combination of stimulus and response-developing points), each stored data item in the corresponding group of data items within one of lists 160 and 170 has a matching data item in the other of lists 160 and 170, and, if not, what test configuration (what combination of stimulus point or points and response-developing point or points) is associated with the mismatch. The specific voltage level, V, detected at each potential response-developing point is not important either. The question of relevance is whether a transition has or has not been detected at the addressed potential response-developing point within a predetermined time span, not its polarity.

Because the number of data items in lists 160 and 170 are relatively small in comparison to the number of potential response-developing points (PRDP's) in the entire network under test, comparison can be completed relatively quickly. Comparing unit 180 may be a general purpose computer which is appropriately programmed to find content mismatches in lists 160 and 170 or it may include content-addressing hardware for more quickly comparing the contents of lists 160 and 170.

Referring to the timing diagram of FIG. 1D, it will now be explained how transitory signals are injected into selected injection points of a network under test and how responsive transitions are detected at the same or other points of the network.

At set-up time, $t_0$, scan bus 118 carries first address signals from the NVU 150 to chip $C_{12}$ for selecting a first pin (e.g, pin $P_{12o}$) as a test signal injecting point. Scan bus 118 also carries (at the same time or later) second address signals from the NVU 150 to one or more of chips $C_{11}$, $C_{12}$, $C_{13}$, $C_{21}$, $C_{22}$, etc., for choosing one or more chip-internal points as potential response-developing points. The chip-internal points are designed into each IC chip for observing the states of the pins (e.g., $P_{12a}$, $P_{12o}$, $P_{13a}$, $P_{23b}$, $P_{33c}$) of the chips. The chip-internal response-developing points are chosen such that at least one and preferably all nodes of the interconnect-network under-test which potentially could develop a response will be observed to determine whether each such network node does or does not develop a transition in response to a next-injected test signal.

After set-up time $t_0$, NVU 150 generates a transitory stimulus signal 121-T which is delivered from pin $P_{10S}$ to pin $P_{12o}$ preferably through a clock-independent (asynchronous) path. For the sake of reference, it is assumed here that the waveform 121-T is present at the input side of an inverter (not shown) and the inverter output drives a node of a net within the network under test (NUT). The responsive waveform 122-R, shown in FIG. 1E, is assumed to develop at another node of the network under test (NUT) or even on the node directly driven by the inverter. What we try to convey here is that the occurrence or non-occurrence of a transition rather than the absolute level developed at each PRDP is what is important.

The transitory stimulus signal 121-T of FIG. 1D has a pulse-shaped waveform including a front porch 121a at a first voltage level (L) and a first edge 121b which preferably transitions quickly from the first voltage level (L) to a second voltage level (H) between a first time point, $t_1$, and a second time point, $t_2$. The waveform of transitory stimulus signal 121-T further includes an intermediate porch 121c at the second voltage level (H) and a second edge 121d which preferably transitions quickly from the second voltage level (H) to the first voltage level (L) between a third time point, $t_3$, and a fourth time point, $t_4$. A back porch 121e at first voltage level (L) follows time $t_4$.

The specific timings and levels of the waveform 121-T will vary from case to case depending on the circuit technology being used, the operating frequencies which have been selected, and the transmission line characteristics of each net. For the case where emitter coupled logic (ECL) is employed and the normal mode clock frequency is in the range of approximately 70 MHz to 165 MHz, the duration between $t_1$–$t_2$ or $t_3$–$t_4$ is anticipated to be in the range of approximately one to two nanoseconds for chip-external nets, the amount depending on the type of interconnect technology (e.g., ribbon cable, twisted pair, coaxial, printed circuit board traces near or away form power planes, etc.) used at the board and frame levels.

The $t_1$–$t_c$ and $t_3$–$t_f$ durations are each selected to give the drive circuitry enough time to switch non-faulty nets between the first and second voltage levels (L and H), but short enough to detect missing or faulty line conditioners. Also durations $t_1$–$t_c$ and $t_3$–$t_f$ are selected sufficiently large to charge or discharge the capacitance of at least two, unintentionally shorted nets to respective post-transition levels 121c and 121e. (Where it is reasonably possible that more than two nets can be erroneously shorted together, the durations should be appropriately adjusted.)

The duration between time points $t_2$ and $t_3$ should be sufficiently long relative to system timing tolerances to include a capture time point $t_c$, described below. Preferably, this duration should be no larger than necessary for reliably incorporating capture time $t_c$ between $t_2$ and $t_3$. Any additional time unnecessarily extends the overall time for completing network verification. For existing ECL technologies it has been found that the duration between $t_2$–$t_3$ is preferably in the range of 250 to 500 nanoseconds.

Referring to FIG. 1E, the waveform of a response signal 122-R at the response-developing pin is shown. As already mentioned, a logic inversion function is assumed to have occurred in the stimulus injection path just before injection pin $P_{12o}$. Although such inversion is not necessary, it is shown here to convey the idea that we are scanning for the occurrence of responsive transitions 122b and 122d rather than for specific levels. The network verification test does not have to concern itself with whether the appropriate polarity is present, it merely has to verify that the net under test can be driven to both polarities (H and L) and that responsive transitions occur within a prespecified time ($t_1$–$t_c$ or $t_3$–$t_f$) after the stimulus transitions are introduced.

At time $t_0$, the response-developing point is at some given level 122a. We assume level 122a to be the second (H) level here. Typically, this initial level does not have to be measured (sampled). If it is desirable to measure level 122a, NVU 150 may sample and store this level 122a in a first memory cell (not shown) before time $t_1$ so that it can later definitively determine (at sample capture time $t_c$) that a transition has occurred at the RDP between time point $t_0$ and $t_c$.

A short time after time $t_1$ (FIG. 1D), at time point $t_a$ (FIG. 1E), the waveform 122-R should begin to change in response to the change which occurred in stimulus signal 121-T at time $t_1$. By time $t_b$, the voltage at the response-developing pin should have transitioned to the first level (L). A short, or open or excessive capacitance might prevent this from happening. At capture time $t_c$, (which can be for example, 200 nanoseconds after first time point $t_1$), a signal representing the voltage at the response-developing pin is relayed to and captured by a latch (151) inside NVU 150. (Latch 151, incidentally, can be incorporated in an on-board part of NVU 150.) The capturing step lets the NVU 150 determine what level 122c corresponds to the intermediate porch level 121c of the test signal 121-T before second transition 121d occurs at (or just before) the test signal injection point.

At time $t_d$, the response waveform 122-R should again begin to change in response to the second edge 121d of the stimulus waveform. At time $t_e$, the response edge 122d should be complete and at time $t_f$, a further portion 152 of NVU 150 captures the level 122e of the response signal 122. Portion 152 could be a latch or a direct connection to XOR means 153.

If both the intermediate porch level 122c and the opposing back porch level 122e are observed at respective capture times $t_c$ and $t_f$, a signal is generated by, for example, exclusive-OR means (XOR) 153 or a like difference-detecting means indicating that transition 122d has occurred. The address of the response-developing point is then stored in list 160.

If only one rather than both of opposing levels 122c and 122e is observed at time points $t_c$ and $t_f$ (if output of XOR 153 is zero), a determination is made at time point $t_f$, or shortly thereafter, that a transition (122b or 122d) has not occurred and the address of the potential response-developing point is not stored in list 160.

The advantages of the data analysis subsystem 155 have already been described above. The advantage of having capture times $t_c$ and $t_f$ spaced close to their respective stimulus edges 121b and 121d (e.g., no more than 150–250 nanoseconds apart in one specific ECL-based embodiment of the invention, and more preferably 200 nanoseconds away) is that missing, miswired, or faulty line-conditioners will be detected. If a line-conditioner which discharges line capacitance is missing or faulty, response edges 122b and 122d will fall/rise much more slowly and not cross over threshold before the capture times, $t_c$ and $t_f$.

The advantage of capturing both of responsive levels 122c and 122e one immediately after the next is that the decision to store or not store the address of the observation point in memory 160 can be made immediately after capture time point $t_f$. There is no need to store values representing the levels 122c and 122e which were captured at time points $t_c$ and $t_f$ in addressable memory cells and to later come back, re-address those memory cells, fetch their contents and from this, determine whether a transition had occurred. Also, time is not wasted to twice address each drive point and each potential response-developing point in order to determine if level 122c occurred in response to stimulus level 121c and if level 122e occurred in response to stimulus level 121e.

Referring to FIG. 1F, a number of optional structures for carrying out the above procedure are shown. The interconnect network 113 is generically represented as a bundle of interconnect lines each having resistive and capacitive parameters associated with it. A transitory stimulus signal enters at the left and moves over an address-defined delivery path to a stimulus injection point selected by stimulus-point addressing means 157. The stimulus signal passes though network 113, and appears on one or more PRDP's (labeled as response capture points here). An address-defined return path routes the levels developed at each capture point to transition detector 153 (an XOR means). Address generator 156 defines the response return path. The return path can be either a direct asynchronous path which immediately carries the level at a chosen capture point to latch 151 and (via line 152a) to XOR means 153 or it can be an indirect path (via registers such as 151 and 152b) which carries the levels developed at times $t_c$ and $t_f$ at the chosen capture point to the inputs of XOR means 153 at a later time.

In one embodiment, a first-in-time level present at a chosen capture point is recorded in register 151 at time $t_c$ (register 151 is strobed by strobe signal st$_c$). The level present at the same capture point at later time $t_f$ is carried by line 152a to one input of XOR means 153 while the output of latch 151 is brought to the other input. The output of XOR means 153 then indicates, based on the two sample values it receives, whether a transition took place at the chosen capture point. Register 152c is strobed at that time by strobe signal st$_f$ to record the determination.

In a second embodiment, register 152b is substituted in place of line 152a. Register 152b captures the level present on the chosen capture point at time $t_f$ and the levels captured by registers 151 and 152a are later relayed to XOR means 153 for comparison. In such a case, register 152c is not required for maintaining over time the determination made by XOR means 153. The output of XOR means 153 can travel directly over line 152d to storage means 160. Alternatively, register 152c can be left within the circuit, but in such a case, it should be strobed at a time point after $t_f$.

A first data-input port (D1) of storage means 160 receives the stimulus addresses from generator 157 for storage in means 160. A second data-input port (D2) of storage means 160 receives the response capture addresses from generator 156 for storage in means 160. Capture point addresses are recorded only if the determination carried from XOR means 153 over line 154 to storage means 160 indicates that a transition took place.

As the network verifying test proceeds, increment signals are sent to generators 156 and 157 for respectively choosing different capture points and selecting different stimulus injection points. The transition-detecting circuit (the portion incorporating XOR means 153 and capture-point choosing means 156) may be replicated so that transition detection can occur simultaneously (in parallel) at a plurality of chosen capture points. Similarly, the stimulus injecting circuit may be replicated so that stimulus injection can be routed to more than one injection point at a time where desirable.

A number of different architectures may be employed at the system level 100, and at the level of the boards 110 and within each chip 111 for delivering a transitory test signal 121-T from the NVU 150 to a desired first node (e.g. $P_{12o}$) of a net-under-test (e.g., $T_{12o}$) and for returning the response signal 122-R from a chosen second node (e.g., $P_{13a}$) of the net-under-test to the NVU 150. As already mentioned, the architectures can be generally classified as shift-to-inject/observe or asynchronous-inject/observe.

Referring first to FIG. 2, it will be assumed that each chip $C_{xy}$ includes an LSSD-based type of boundary-scan I/O cell architecture as shown at 200. This architecture falls within the shift-to-inject/observe classification.

Although details of the I/O cell architecture are shown only for I/O pin $P_{12o}$, it is to be understood that this I/O cell architecture repeats at every I/O pin of each chip. Like reference symbols in FIG. 2 are used to indicate corresponding elements in FIG. 1A.

An asterisk (*) is included in the subscript of reference symbols such as, $C_{12*}$ and $C_{23*}$, to serve as a reminder that FIG. 2 shows but one of many possible architectures for the corresponding elements of FIG. 1A. (A second, more preferred, asynchronous inject/observe architecture is shown in FIGS. 3J and 3K. This second architecture will be better appreciated if the shift-to inject/observe architecture of FIG. 2 is considered first.)

Chip $C_{12*}$ is shown with pin $P_{12o}$ coupled to a first end of net $T_{12o}$. A second end of net $T_{12o}$ is supposed to be coupled to pin $P_{23b}$ of chip $C_{23*}$. A third end is supposed to be coupled to impedance $Z_{12o}$. Other connections of net $T_{12o}$ are indicated by arrows, but not shown in detail.

Impedance $Z_{12o}$ is assumed to be of a line terminating resistor which weakly pulls net $T_{12o}$ to the level of reference voltage VR1 (see FIG. 1A). The value of $Z_{12o}$ is selected so as to substantially discharge the parasitic capacitance $CP_{12o}$ of net $T_{12o}$ toward the reference level VR1 within a prespecified time span (e.g., within 1 to 3 nanoseconds if the system clock period is 7 nanoseconds). A typical value for $Z_{12o}$ in ECL circuits is 65 ohms and the VR1 level is usually −2 volts.

Chip $C_{12*}$ is shown to have a scan-clock receiving pin $P_{12K}$ and a stimulus input terminal $P_{12S}$. Chip $C_{23*}$ is similarly shown to have a clock receiving pin $P_{23K}$ and a response output terminal $P_{23R}$. Scan input data (SID) enters chip $C_{12*}$ through pin $P_{12S}$. Scan output data (SOD) leaves chip $C_{23*}$ through pin $P_{23R}$. Pins $P_{12L}$ and $P_{23L}$ receive load/shift signals (L/S) for respectively placing chip-internal scan latches 261, 262, 272 of their respective chips into either a data load mode or a data shift mode. In the data load mode, data presented at parallel input terminals (D) of the scan latches are loaded into storage at the occurrence of a scan clock pulse (SK). Stored data is output through the Q terminal of each scan latch. In the shift mode, stored data is shifted out of a serial output (SO) port of each scan latch to a next succeeding scan latch in the scan chain and new data is shifted in through a serial input (SI) port.

The verifying unit (NVU) of FIG. 2 is alternatively labelled 250* and 250 to respectively designate a previous NVU design (250*) which couples to prior-art analysis structure 255* and a novel NVU design (250) which, in accordance with the invention, cooperates with the above-described data-analysis structure 155 of FIG. 1A.

A first net $W_{251}$ connects an SID output terminal of NVU 250/250* to stimulus input pin $P_{12S}$ for serially shifting scan input data (SID) into the first chip C12*. Shift/load control signals (L/S) are delivered over a second net $W_{252}$ from the NVU 250/250* to corresponding pins $P_{12L}$ and $P_{23L}$ of chips $C_{12*}$, and $C_{23*}$. Scan clock signals (SCANCLK or "SK" for short) are delivered over a third net $W_{253}$ from the net verifying unit 250/250* to respective terminals $P_{12K}$ and $P_{23K}$. A fourth net $W_{254}$ returns scan output data (SOD) in a serially shifted format from response-output pin $P_{23R}$ to the NVU 250/250*. (Sidenote: The standard procedure of labelling nets according to pin numbers is bypassed above to emphasize the connection of these nets to NVU 250.)

The scan input data (SID) entering pin $P_{12S}$ is shifted through a series of clocked scan latches (SL) including first scan latch 261 and second scan latch 262. The Q output terminal of first scan latch (SL) 261 transmits a test output signal (TOS) over a secondary signal line 263b into and through multiplexer 263 when the system is in a test mode. A signal which selects normal-mode or test-mode is supplied to multiplexer control terminal 263c. The test output signal (TOS) is next delivered to the input node 265a of an output buffer (OB) 265. Output buffer 265 has a single input node, 265a, and a single output node, 265b. The output node 265b of output buffer 265 is coupled to chip pin $P_{12o}$ for injecting the test output signal (TOS) to the first end of net $T_{12o}$ when the system is in test mode.

When the system is in a normal mode (F-mode), a normal output signal (NOS) passes from internal logic unit 264 over a primary signal line 263a, through multiplexer 263 to output buffer 265 and from there to pin $P_{12o}$. Although logic unit 264 is drawn small, it will be understood that logic unit 264 occupies a major share of the substrate area of chip $C_{12*}$ and is responsible for processing normal-input signals (NIS) supplied to it during the normal mode.

If pin $P_{12o}$ is a bidirectional I/O pin, one of the normal mode input signals (NIS) can travel from pin $P_{12o}$ over on-chip line 262d, through scan latch (SL) 262 and then over on-chip line 264a to the internal logic unit 264. Test mode input signals (TIS) also travel over on-chip line 262d from pin $P_{12o}$ to the D input of second scan latch 262 for shifting out as scan output data (SOD). On-chip line 268 supplies scan clock signals (SK) to the first and second scan latches 261 and 262, during serial shifting of scan data (SID and SOD). On-chip line 269 supplies the load/shift control signals (L/S). (Note: in JTAG and IEEE 1149.1 implementations all I/O pin levels are captured even if the pins are not output or bidirectional. Also the capture path returns to the sourcing latch 261 not to a separate latch 262.)

Second chip $C_{23*}$ has an I/O cell architecture similar to that of chip $C_{12*}$, but for the sake of illustrative brevity, only the path 272d which carries the corresponding test input signal (TIS) of pin $P_{23b}$ is shown. The voltage level present at pin $P_{23b}$ is latched into a third scan latch 272 at the time a scan clock pulse (SK) is applied to pin $P_{23k}$ and the L/S control signal is in the load mode. The latched level is subsequently shifted out through optional invertor 273 as scan output data (SOD) to the net verifying unit 250/250*.

There are several ways to operate NVU 250/250*. If NVU 250/250* is structured in the non-preferred way (250*), it waits for static levels to develop at each potential response-developing point (PRDP) and then outputs a list of the post-settlement levels 260* detected and captured at all observable nodes. Level capture, observation, and significance determination are made long after test signals switch levels.

If, on the other hand, NVU 250/250* is structured in the preferred way (250), it captures the levels present at each PRDP shortly ($t_c$ and $t_f$) after rising and falling stimulus edges 121b and 121d are injected into the net-under-test, it makes a determination at each second capture time, $t_f$, or shortly thereafter as to whether a responsive transition occurred, and it outputs a list of addresses (160) of only those points where responsive transitions were detected.

NVU 250 can cause the waveforms of FIG. 1D and FIG. 1E to occur within the system under test (SUT) by appropriate operation of the LSSD system. At setup time $t_0$, NVU 250 places the L/S net $W_{252}$ in the "shift" state. A pattern of logic zeroes and a singular logic one ("0001000") is shifted out onto the SID net $W_{251}$ such that, just before time point $t_1$ a static low level (L or logic "0") is stored in scan latch (SL) 261 and output through multiplexer 263 to pin $P_{12o}$. At the same time (just before $t_1$), a static high level (H or logic "1") is waiting at the serial input (SI) of scan latch 261 in preparation for being next shifted into scan latch 261. If another scan latch (SL) rather than the illustrated pin $P_{12S}$ precedes SL 261 in the shift line, that preceding scan latch (not shown) should be a non-I/O latch (as is SL 262) so that the waiting static high level does not appear on some other I/O pin of chip $C_{12*}$.

Alternatively, another layer (not shown) of parallel-/load latches can be inserted between the shift register latches (261,262) and their corresponding pins ($P_{12o}$) to avoid this problem. The JTAG and IEEE 1149.1 architectures include such a design. A parallel-load/transfer register couples to all output (and optionally input) pins of the module and a data-shift register couples in parallel to the parallel-load/transfer register. The data-shift register is used for bringing serially-input data into alignment with desired stages of the parallel-load/transfer register prior to the issuance of a load strobe signal which transfers data in parallel from the shift register to the parallel-load/transfer register.

Referring to FIG. 2, at time point $t_1$, the NVU 250 issues a scan clock pulse (SK) to thereby generate a low level (L) to high level (H) transition at the Q output terminal of first scan latch (SL) 261.

Soon after first time point $t_1$, the NVU 250 switches the state of the L/S net $W_{252}$ to the "load" state. A scan clock pulse (SK) is issued at the capture time $t_c$ to thereby capture the level present at response-developing pin $P_{23b}$ into the third scan latch 272.

Some time after capture time $t_c$, the NVU 250 again switches the L/S net $W_{252}$ to the "shift" state so that the level captured in the third scan latch 272 can be returned to pin $P_{23R}$ over the serial output data line (SOD). This captured level should not be overwritten during its travel along the serial output path to return pin $P_{23R}$. It should be noted that while the level at input pin $P_{23b}$ is being captured into SL 272 other scan latches of chip $C_{23*}$ are simultaneously capturing levels at other pins of $C_{23*}$. When the $P_{23b}$ level is shifted out for capture by the NVU 150, the other pin levels are also shifted out.

Incidentally, the bits which are held in the LSSD shift registers (or the serial-shift registers of the JTAG standard design) at the time ($t_c$ or $t_f$) when data is captured, and which therefore represent the soon-to-be observed levels of all scannable nodes of the interconnect network, shall be referred to as a "scan set."

After the captured level is shifted out of the third scan latch 272, a stream of all logic zeroes plus a singular one ("000...1...000") is shifted into chip $C_{12*}$ with the logic one ("1") residing in first scan latch 261. Either the dual layers of latches design should be followed as suggested by the JTAG standard or the next scan latch (SL 262) which follows SL 261 in the shift line should be a non-output-driving latch (as is SL 262) so that the static high level ("1") residing in SL 261 will not appear on some other net-driving I/O pin of chip $C_{12*}$ in a next-to-be described cycle to produce a "0" to "1" transition there.

A logic low level (L) is presented to the serial input terminal (SI) of the first scan latch 261 at the time of the next scan clock pulse (at time point $t_3$) to generate transition 121d. The switch from "shift" to "load" states is repeated and a further scan clock pulse (SK) is issued at second capture time $t_f$ to capture the level present at potential response-developing pin $P_{23b}$ (and other pins of chip $C_{23*}$). This level is then shifted out to NVU 250 for observation therein.

To test for the presence of line-terminating impedance $Z_{12o}$, the second capture time $t_f$ should be positioned sufficiently close to transition time $t_d$ so that capacitance $CP_{12o}$ does not discharge to the low level (L) before capture time $t_f$ if impedance $Z_{12o}$ is missing.

Of importance, the determination as to whether transition 122d occurred at pin $P_{23b}$ (and all other scannable pins) is made while the net-under-test $T_{12o}$ is still identified. XOR means 153 signals memory 160 to store only the addresses of pins ($P_{23b}$ and/or others) of the interconnect network which exhibited responsive transitions in the time spans, $t_1$ to $t_c$ and $t_3$ to $t_f$. The scan addresses of the pins which exhibited such transitions are stored as a group and linked at that time to the address of the net-under-test $T_{12o}$. It is only after such linkage is made that the identity of the net-under-test is changed in order to verify the integrity of a next net. This automatically identifies the net-under-test as a fault-infected net and the net/line-conditioner to which it is erroneously coupled/not-coupled when a discrepancy is found between lists 160 and 170. It is not necessary to pre-store the expected states of all pins within the interconnect network, for each stimulus condition, and to compare the expected states against detected states, in order to determine if and where a fault lies.

Also, it is to be noted that when XOR means 153 determines which scan addresses are to be stored or not stored in memory 160, the XOR means 153 is in effect compressing the amount of data to be now stored (and later analyzed) from two scan-sets' worth of static levels to an amount which corresponds to only the pins which exhibited responsive transitions. Storage area does not have to be provided for storing more than one or perhaps two scan-sets' worth of noncompressed data. Once a scan-set is obtained for sample time-point $t_c$ (and temporarily stored) and another is obtained for sample time-point $t_f$, the two scan-sets can be processed through the XOR means to extract for more permanent storage, only those items of information which define the response-developing points at which responsive transitions were detected.

An alternate way to generate transitions at pin $P_{12o}$ is to toggle the normal/test mode control terminal 263c of multiplexer 263. At set-up time $t_0$, the scan chain (261, 262) is preloaded so that logic unit 264 outputs a "1" or "0" to multiplexer input line 263a while first scan latch 261 outputs an opposing "0" or "1" to multiplexer input line 263b. This is done only at the I/O cell where the transitory test signal is to be injected, all other I/O cells are set-up so that there is a "0"—"0" pair or "1"—"1" pair at their multiplexer input lines, 263a and 263b. Then, when multiplexer control line 263c is toggled, transitions are generated at I/O pin $P_{12o}$ while the outputs of all other I/O pins remain static.

Certain problems associated with the "boundary scan" I/O structure of FIG. 2 have already been mentioned above, but they can be more clearly explained now. Multiplexer 263 introduces an undesirable delay into the primary output path of the normal output signal (NOS). The presence of scan latches, 261 and 262, and multiplexer 263 in every I/O cell disadvantageously consumes both circuit space and power.

Also, the time between which a test level can be presented at pin $P_{12o}$, passed through net $T_{12o}$ to pin $P_{23b}$, and detected by scan latch 272 is limited by the speed at which a test bit can be serially shifted into first scan latch (SL) 261, by the time it takes to switch the load/shift control line (L/S) from the shift mode to the load mode (or to make comparable state changes in the JTAG or IEEE 1149.1 architectures), and the time it takes for a next clock pulse (SK) to arrive at pin $P_{23K}$ and strobe the third scan latch (SL) 272. This disadvantageously constrains a tester's ability to modify time spans $t_1-t_c$ and $t_3-t_f$. It is not always possible to detect a missing line conditioner such as resistor $Z_{12o}$.

Referring to FIGS. 3A through 3K, a more preferred on-chip architecture for supporting net verification system 300 in accordance with the invention will be described. Like reference symbols are frequently used for elements of FIGS. 3A through 3K which correspond to but are not necessarily the same as those of FIG. 2.

Figure 3A:
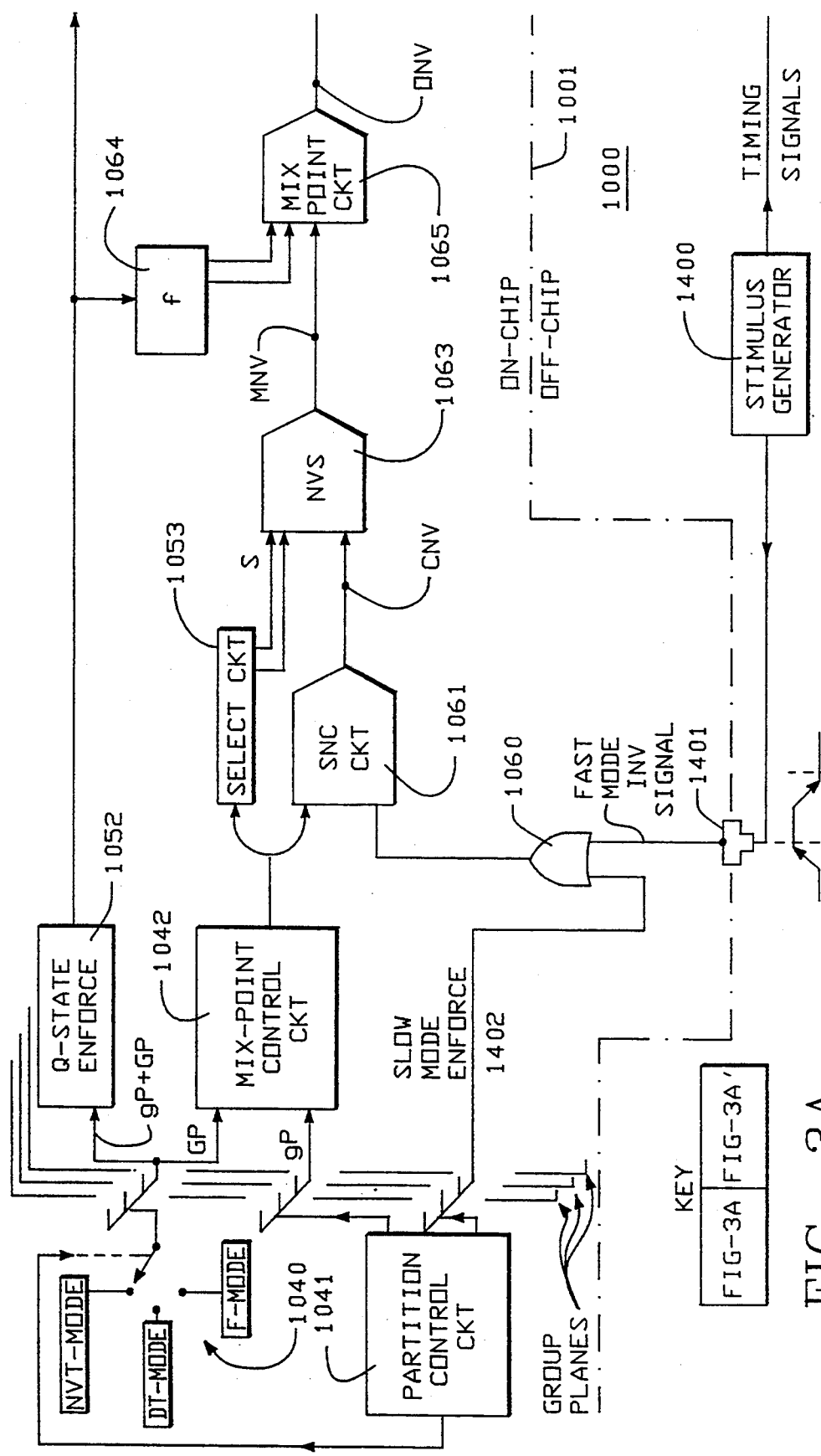
FIGS. 3A and 3A' in combination define a block diagram of a clock-independent architecture for delivering transitory test signals to selected injection points and capturing responses in accordance with the invention.

FIGS. 3A and 3A', in combination, illustrate generally, a net verification architecture 1000 in accordance with the invention.

Components inside of chip boundary 1001 define an on-chip means for routing a test signal generated either externally by an off-chip stimulus generator 1400 or in internally within one part of the chip (1053), through the chip, from the external test-signal receiving pin 1401 (or from internal stimulus generator 1053) to one or more module output terminals (IC pins) 1068, 1069, etc.

Components indicated generally at 1100 constitute observation means for detecting transitions at selectable potential response-developing points. These components can be located on another IC chip and/or within chip boundary 1001.

Although not apparent from the illustration, a bulk of the circuitry within chip boundary 1001 comprises functional circuitry for carrying out non-test functions. Boxes 1064, 1164 and 1264 represent such functional circuitry. With the exception of an input labelled "MNV", units 1065–1067 also represent functional circuitry. Also some or all of box 1052 can serve as functional circuitry. Only a minor fraction (e.g., one third or less) of the area within chip boundary 1001 is available for supporting test functions.

As seen, output buffering circuitry 1067 receives signals either directly from functional circuit 1264 or indirectly (through units 1065 and 1066) from functional units 1164 and 1064.

During a normal, non-test mode (F-mode), output circuit 1067 functionally combines the signals received from units 1066 and 1264; and outputs corresponding functional signals through module terminals 1068 and 1069 to respective interconnect network segments $T_{1068}$ and $W_{1069}$. (The latter are referenced simply as T and W.)

Mode selector means 1040 controls the mode of the on-chip circuitry (within 1001). The normal, non-test mode is denoted as "F-mode." The net verification test mode is denoted as "NVT-mode." And a further test mode, referred to here as the delay test mode, is referenced as "DT-mode."

When mode selector 1040 is switched to the NVT-mode, a Q-state enforcing means 1052 drives respective functional units 1064, 1164 and 1264 such that they deliver non-controlling signals to the inputs of their subsequent circuits, 1065, 1066 and 1067.

When F-mode is active, the Q-state enforcing means 1052 is inactive and functional modules 1064-1067, 1164 and 1264 are allowed to function in accordance with normal-mode specifications.

Unit 1065 is defined here as a functional mix-in circuit because this is the point where a test signal (denoted as MNV) mixes functionally into the signal propagation path of the signals which flow out from functional units 1064, 1164 and 1264.

Unit 1066 is defined here as a propagation circuit because it propagates the output (ONV) of mix-in circuit 1065 onto the input of output buffering circuit 1067. Propagation circuit 1066 is optional within the design. Mix-in circuit 1065 can feed directly into OB 1067. The mix-in function can also be incorporated into OB 1067.

As long as Q-state enforcer 1052 drives the functional outputs (f) of units 1064, 1164 and 1264 to levels which are non-controlling when received at the inputs of respective circuits 1065, 1066 and 1067; the "Mixed-in Net Verification" signal (MNV) output from unit 1063 determines what levels will be presented at module output pins 1068 and 1069.

Unit 1063 is referred to as a "Net Verification Steering" circuit (NVS). NVS circuit 1063 has two basic operating modes: selected and de-selected. Selection signals (S) are provided from selection circuit 1053. The selection signals ($) determine whether NVS circuit 1063 is selected or de-selected. (It will be explained later how selection circuit 1053 can also function as an on-chip stimulus-generating means.)

If the NVT-mode is active and the NVS circuit 1063 is "selected," a control signal (CNV) which is presented to another of its inputs, is transferred in either inverted or non-inverted form to the corresponding output terminals 1068 and 1069, after passing through mix-in circuit 1065, propagation circuit 1066 and OB 1067.

If the NVT-mode is active and the NVS circuit 1063 is "de-selected," one of a dominant or non-dominant "background" signal levels is projected onto module terminals 1068 and 1069, as determined by a designed-in internal structure of NVS circuitry 1063.

This aspect of the invention will be described in more detail when FIGS. 3B through 3I are explained.

The unit 1061 of FIG. 3A which provides the CNV control signal to the NVS unit 1063 is labeled as the "SNC" circuit 1061. This acronym stands for "Selected NVS Control" circuit. The SNC circuit 1061 controls the output of the NVS circuit 1063 when that NVS circuit 1063 is "selected" by selecting circuit 1053. If the NVS circuit 1063 is "de-selected" by selecting circuit 1053, the SNC circuit 1061 does not control the NVS circuit 1063.

SNC circuit 1061 is in turn controlled by mix-point control circuit 1042. The mix-point control circuit 1042 also controls the NVS selection circuit 1053. During F-mode, the mix-point control circuit 1042 forces selection circuit 1053 to place NVS 1063 in the "selected" mode. Simultaneously, mix-point control circuit 1042 forces SNC circuit 1061 to output a CNV signal level which causes the MNV signal level at the input of mix-in point circuit 1065 to be "noncontrolling."

As previously described, the NVS circuit 1063 is designed such that, where possible, it will produce a dominant or nondominant level to appear respectively on its associated W and T nets when the NVS circuit 1063 is NOT selected and NVT-mode is active. Accordingly, during F-mode, each NVS circuit should be placed in the selected mode to avoid interfering with normal mode (F-mode) operations. Once the NVS circuit 1063 is "selected", it responds to the CNV signal, and the CNV signal is then used to place the MNV output of the NVS circuit 1063 in a non-controlling (nc) state during F-mode.

During NVT-mode, the mix-point control circuit 1042 allows the selection circuit 1053 to independently select or not select NVS circuitry 1063. Also, the mix-point control circuit 1042 allows a signal output from OR gate 1060 to control the SNC circuit 1061.

In a so-called fast-path mode (or more accurately, an external stimulus mode), OR gate 1060 transmits an externally supplied stimulus signal (INV) from its input terminal 1401 asynchronously to SNC circuit 1061.

In a so-called slow-path mode (or more accurately, an internal stimulus generating mode), a logic one ("1") is asserted from partition control 1041 onto input terminal 1402 of OR gate 1060. Once this is done, CNV becomes noncontrolling of the NVS circuit 1063 and the output MNV of NVS circuit 1063 is dictated solely by the select signals (S) supplied from selection circuit 1053.

Selection circuit 1053 is controlled by an on-chip scan circuit (not shown). A disadvantage of the slow-path mode is that it takes longer to toggle the output MNV of NVS circuit 1063, since toggling frequency is dependent on the scan input data rate and the scan addressing rate. A countering advantage of the slow-path mode is that an external stimulus generator 1400 is not required to toggle the mix-in signal MNV at the input of mix-in point circuit 1065. Scan-in data (SID) may be applied to selection circuit 1053 by way of the on-chip scan system and testing may be carried out while the interconnect-network under-test is installed within a scannable mainframe computer.

It is to be noted that the fast path input signal (INV) is shown in FIG. 3A entering the chip through a first pin 1401 while scan input data (SID) is shown in FIG. 3A' as entering through a separate pin 1070. When a preferred embodiment is later discussed, it will be seen (in FIG. 3J) that both signals can enter through one pin. An advantage of the second arrangement is reduced pin count. A disadvantage is that net drivers might toggle randomly as scan input data is injected into the chip during NVT-mode.

Partitioning is a further feature of the invention. There are a number of aspects to the concept of partitioning.

Under one aspect a first portion of a system-wide interconnect-network can carry functional signals while a second part of the same interconnect-network is undergoing verification.

Under a second aspect of the partitioning concept, when NVT-mode is in effect, NVS gates are assigned to "groups" and one or more groups are allowed to participate in a verification test while one or more other groups while one or more other groups might be simultaneously disabled from participating in the network verification test. An active "group protect" (gP) signal is applied to the mix-point control circuits of NVS gates not participating in verification. During F-mode, an active "global protect" (GP) signal is further applied to the mix-point control circuits (1042) of all NVS circuits 1063 and this disables the NVT circuitry from interfering with functional operations.

A third aspect of partitioning is that there is a delay-test (DT) group which operates only when all mutually exclusive NVT groups are disabled (their group-protects are active).

The multiple aspects of partitioning are realized by assigning the mix-in circuits 1065 associated with various net-driving nodes of the interconnect-network to separable "groups." One or more groups of net-driving nodes can be serving as stimulus injection points while the net-driving nodes of other non-participating groups (protected groups) simultaneously output functional signals. A disabled or "protected" group is one whose corresponding gP signal is made active. An enabled group is one for whom the corresponding gP signal is inactive. The global protect signal (GP) must be inactive before any NVT group plane (or DT group plane) can become enabled.

Partitioning control circuit 1041 sends group-enable signals to mix-point control circuit 1042 for the purpose of placing some groups in an enabled mode while placing other groups in a disabled mode even though all groups are in NVT-mode. (When DT-mode is active, all mutually-exclusive NVT groups are disabled.) Circuit 1041 also cooperates with mix-point control circuit 1042, and through there with selection circuit 1053, to select groups of NVS circuits (only 1063 shown).

To understand this feature of the invention, FIG. 3A should be pictured as showing a top representative layer of a three-dimensional structure having layers of NVS circuits 1063 stacked one above the next, with each NVS circuit driving its own mix-in point circuit 1065 and subsequent output buffer circuitry 1067.

Partitioning control circuit 1041 extends alongside the multiple planes, and selectively applies active or inactive GP and gP signals to each of the planes. It also selectively applies a slow-mode enforcing signal 1402 to each of the planes. A group plane is said to be in F-mode when both of the protect signals (GP and gP) it receives are active. In such a case, the Q-state enforcer 1052 of the plane is disabled from enforcing Q-state, the selection circuit 1053 of the plane is forced to select its corresponding NVS circuit 1063 and the SNC circuit 1061 generates a control signal CNV which causes the mix-point level MNV to be non-controlling.

When both of the protect signals (GP and gP) received by a group plane are deactivated, the group plane is "enabled". The group plane is then given the ability to generate a controlling level at its MNV point. It is then left up to the plane selection circuit 1053 and the plane SNC circuit 1061 to determine whether the MNV level is controlling or non-controlling.

If the global protect (GP) signal received by a group plane is inactive but the group protect signal (gP) of that group plane is active, the group plane behaves as if it were in F-mode.

Figure 6:
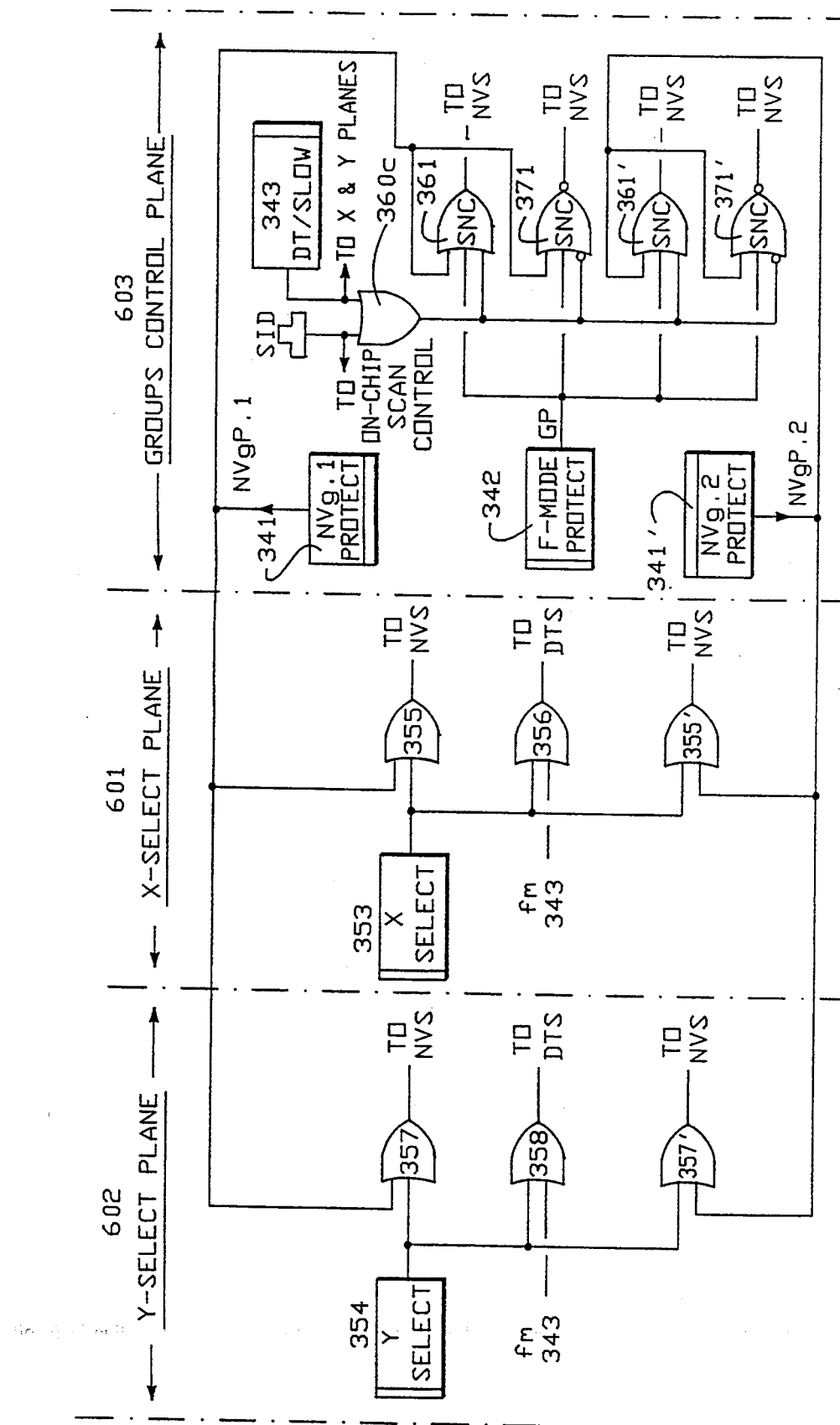
FIG. 6 shows X-select, Y-select and Groups-control planes of a net-verification system having partitionable test groups.

In addition to the network verification planes, FIG. 3A should be pictured as having one or more delay-test (DT) planes which also receive the GP and gP protect signals. Selection circuit 1053 should be pictured as a solid unit which extends through and is shared by all the NVT group planes and also the DT group planes. A specific embodiment for carrying out this feature will be described in more detail when FIG. 6 is considered.

FIGS. 3B–3I illustrate a particular embodiment of architecture 1000. In FIGS. 3B–3I, we limit the internal designed-in structure of NVS circuit 1063 to be either an AND gate or a NAND gate. Mix-in circuit 1065 is depicted as performing either an OR operation or an AND operation on inputs presented to it. Propagation circuit 1066 is shown as a simple feedthrough wire, but it is understood to encompass any serial chain of combinatorial logic. Output buffering circuit 1067 is depicted as performing either an OR or a NOR logic operation on its inputs and translating the result into network compatible voltage/current levels.

The interconnect network signalling of FIGS. 3B–3I is voltage-based. One voltage level represents a logic "1" and another voltage level represents logic "0". An emitter-coupled logic technology (ECL) is employed wherein the logic "1" voltage level is dominant over the voltage level which represents logic "0".

FIGS. 3B–3E illustrate possible combinations where the driven net is an on-board net (T). It should be recalled that one of the results desired for such a case is the development of a non-dominant voltage level (logic "0") at the driven net node when NVT-mode is active and the corresponding mix-in means is "de-selected".

FIGS. 3F–3I illustrate the possible combinations when the driven node is part of an off-board net section (W). It should be recalled that one of the results desired in this situation is the development of a dominant signal level (logic "1" for ECL technology) when NVT-mode is active and the corresponding mix-in means is "de-selected".

Figure 3B:
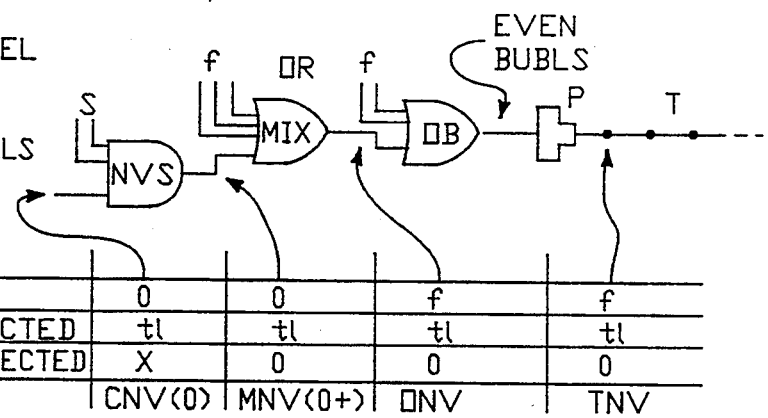
FIGS. 3B–3E are a set of simple schematics for explaining design options in implementing the architecture of FIG. 3A when the driven net is on-board.

Referring specifically to FIG. 3B, this figure shows the case where the mix-in circuit performs the OR operation and there is an even number of inversion bubbles (e.g., 0, 2, 4, 6, . . . ) between mix-in point MNV and the output pin (P). In such a case, the designed-in internal circuitry of NVS unit 1063 is selected to be an AND gate as shown. This is done specifically so that a non-dominant "0" will appear on the output pin (P) when the NVS gate is de-selected and NVT-mode is active. When the AND-type NVS gate of FIG. 3B is de-selected, it outputs a logic "0". The logic "0" flows through the MIX and OB circuits (both are in Q-state) to appear on the output pin (P).

Figure 3C:
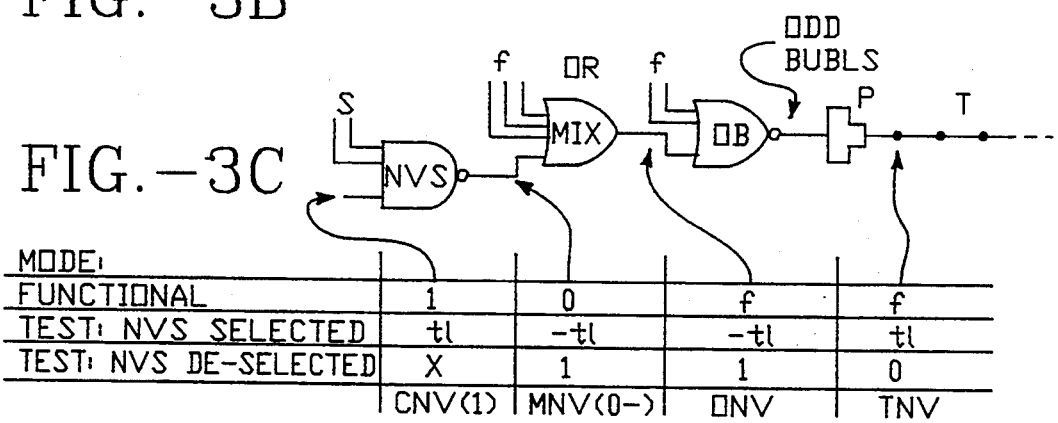

FIG. 3B shows what operational levels are present at various points in the circuit. There are two basic flavors of the CNV signal, CNV[0] and CNV[1]. An example of the CNV[0] flavor is shown in FIG. 3B. An example of the CNV[1] flavor is shown in FIG. 3C. During the functional mode (F-mode), both flavors of control signal, CNV[0] and CNV[1], should be set such that a non-controlling level will appear at the MNV input of the corresponding mix-in circuit. (Every NVS gate is selected during F-mode for reasons to be explained shortly.) When the MNV input is noncontrolling, the output of the mix-in circuit can be considered to be exclusively a function of the functional input signals (f) applied to its other inputs. The output of the output buffer (OB) is then also considered to be exclusively a function of the functional (f) signals applied to itself (OB) and applied to the mix-in circuit.

Since the mix-in circuit of FIG. 3B is the OR type, its MNV input has to be maintained at the non-controlling "0" level during functional mode (F-mode). This can be assured by maintaining CNV[0] at logic "0" when F-mode is active.

During NVT-mode, if the applied selection signals (S) are all ones, the NVS gate is deemed to be selected. The functional signal levels (f) are all noncontrolling at this time. A test level, tl, applied at the CNV input terminal of FIG. 3B therefore propagates through the mix-in gate and the output buffer to appear at output pin (P) for injection into an on-board net (T).

If one of the Selection signals (S) applied to the NVS gate is "0", the NVS gate is deemed to be de-selected. In that case, the level of the CNV signal is irrelevant (X), and a non-dominant 0 level (ECL technology is assumed here) appears at the output pin (P) for injection into the on-board net segment (T). Note again that the NVS gate of FIG. 3B was selected to be an AND gate specifically for this reason, so that a non-dominant (nd) level will develop at the on-board net driving point (P) when NVT-mode is active and the NVS gate is de-selected.

There are four basic flavors of mix-in signals which could develop at the MNV point. These are designated in FIGS. 3B–3I as: MNV[0,+], MNV[0,−], MNV[1,+] and MNV[1,−]. The bracketed 0 or 1 indicates the level developed at the MNV point during F-mode. The bracketed plus (+) or minus (−) symbol indicates the phase of the tl signal developed at the MNV point (+tl or −tl) during NVT-mode when the NVS gate is selected.

In FIG. 3C, the functional circuitry (MIX and OB) interpose an odd number of inversion bubbles (1, 3, 5, etc.) between the MNV point and the output pin (P). In this case, the designed-in internal circuitry of NVS unit 1063 is selected to be a NAND gate as shown. This is done specifically so that a non-dominant "0" will appear on the output pin (P) when the NVS gate is de-selected and NVT-mode is active. Test level tl still appears on output pin P when the NVS gate is selected and NVT-mode is active. Functional levels (f) will appear on the output pin (P) when F-mode is active if CNV[1] is maintained at logic "1" and the NVS gate is "selected".

Figure 3D:
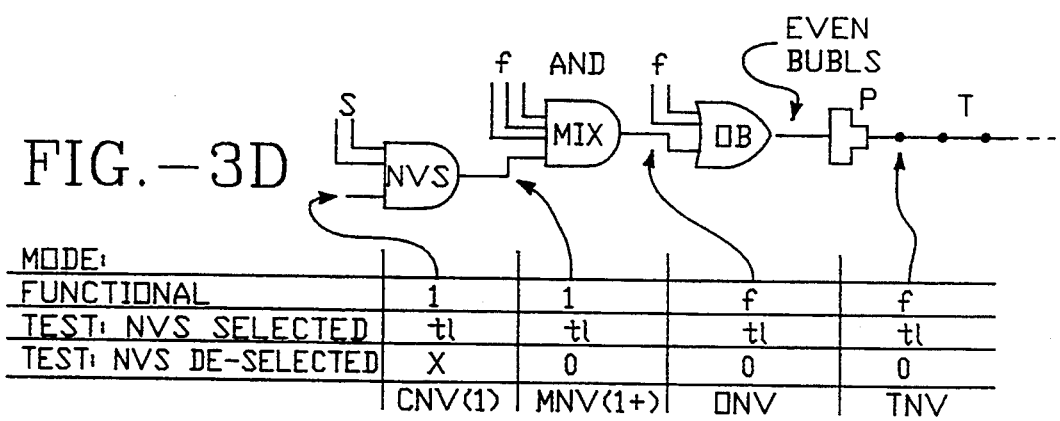

FIG. 3D shows the case where the mix-in unit 1065 performs the AND operation on its inputs and there is an even number (0, 2, 4, . . . ) of bubbles between the MNV point and the output pin P. The internal circuitry of the NVS unit 1063 is then chosen to be an AND gate.

Figure 3E:
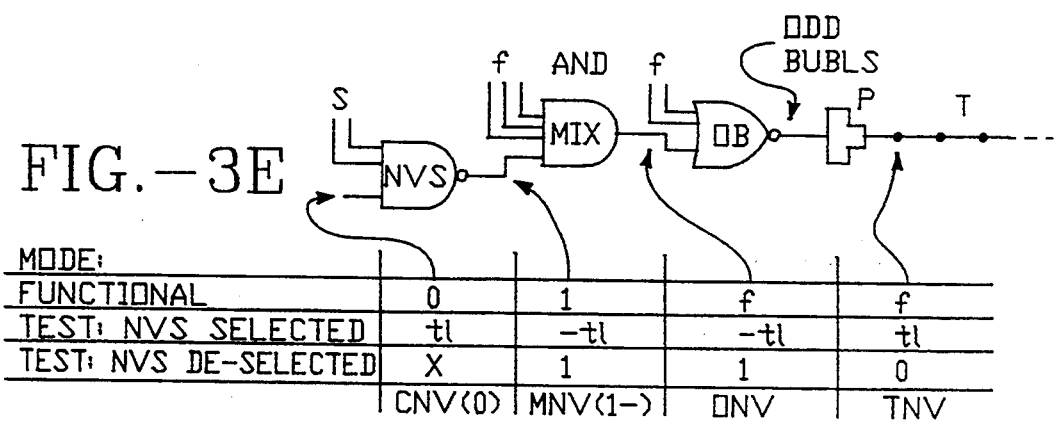

FIG. 3E shows the case where the mix-in circuitry again performs the AND function on its inputs but there is an odd number (1, 3, 5, . . . ) of inversion bubbles between the MNV point and the output pin. In this case, the NVS circuitry is chosen to be a NAND gate as shown. A desired test signal level tl appears on output pin P when the NVS gate is selected during test mode even though inverted versions of it (−tl) appear at the MNV and ONV points. A non-dominant 0 appears on the output pin P when the same NVS gate is de-selected in NVT-mode.

FIGS. 3F through 3I show the corresponding selections for the case where the output pin (P) drives an off-board net section (W) and it is desirable to output a dominant logic one ("1") level onto that net during NVT-mode, if the corresponding NVS gate is de-selected.

As seen, a positive version of the test level (+tl) is applied at the CNV point, but a negative phased test signal (−tl) is correspondingly produced at the output pin (P) in FIGS. 3F–3I.

To summarize FIGS. 3B to 3I, the internal circuit of NVS unit 1063 is designed primarily so that a dominant or nondominant level develops at the output pin (depending on the type of net section it drives, T or W) when the NVS circuit 1063 is de-selected in test mode. The CNV and select (S) signals are operated such that a noncontrolling level develops at the mix-in point (MNV) during F-mode. As a consequence of this design, a positive or negative version of an applied test level (tl) develops at the output pin (P) when the NVS circuit 1063 is selected in test mode.

Referring to FIGS. 3B–3E, there is one feature of the invention which should be examined in more detail. This feature deals with preventing an undesirable mix-in of a controlling net-verification signal with functional signals during the non-test functional mode (F-mode).

Referring more specifically to FIG. 3C, note that when the F-mode is in effect, all inputs to the NVS gate must be at logic one ("1") in order to assert a non-controlling level ("0") at mix-in point MNV. This means that during F-mode, all NVS circuits which participate in a type of circuit depicted by FIG. 3C (odd-bubbles and an OR-type mix-in) must be "selected." The selection signals (S) to these NVS gates must be all set high ("1").

The same is true for functional output circuits which conform to the type depicted in FIG. 3D (even-bubbles-/AND-type mix-in). The NVS gate must be "selected" in order to assert a non-controlling logic one ("1") at the MNV input of the AND-type mix-in gate.

To simplify system-wide design rules, all NVS gates are required to be in the "selected" mode during the F-mode, even though this is not necessary for the circuits of FIGS. 3B and 3E. (Note that the NVS gates also must be selected in the circuits of FIGS. 3F and 3I in order to maintain a non-controlling level at the mix-in point MNV during F-mode.)

In accordance with this general requirement, when the circuitry of FIGS. 3B–3I is employed, mix-point control circuit 1042 (FIG. 3A) is designed to force selection circuitry 1053 to "select" all NVS circuits 1063 during the nontest F-mode.

Incidentally, the system wide design rules for including net verification test capabilities at the chip level, as set forth by FIGS. 3B–3I, can be implemented either manually or incorporated into a computerized gate-defining system which defines functional circuits and automatically inserts the ancillary net verification circuits at the same time according to the rules set forth by FIGS. 3B–3I.

Now that it has been shown how a variety of different signal levels can be selectively asserted on each of module output pins 1068 or 1069, where the selectable signals include either a functional signal (f) developed by functional circuits within the IC chip or a test level signal (tl, which signal could be a transitory test signal) delivered from a test signal generator, or a dominant/-non-dominant level ("1" is considered dominant in ECL circuits, "0" is considered dominant in TTL circuits), it is appropriate to consider what happens after a test signal (tl) is injected into one or more nodes of an interconnect-network under-test.

Referring to the right side of FIG. 3A', the response or non-response of the interconnect-network to the injected stimulus level will develop/not develop at other nodes or even the same node into which the mixed-in stimulus signal (MNV) was injected.

Switching means 1100 responds to control signals from scan control unit 1300 to address a specific potential response-developing point (which could be the same as the stimulus injection point) and to deliver the signal level present at the addressed node to transition detection means 1150.

In the fast-path mode, stimulus generating unit 1400 sends timing signals to transition detection means 1150 for defining capture time points $t_c$ and $t_f$, as already described for FIG. 1E. During slow-path mode, the scan control unit 1300, will itself determine the timing of a transitory test signal. It should then supply corresponding timing signals to transition detecting means 1150.

In both fast-path and slow-path modes, scan control unit 1300 transmits signals representing the addresses of one or more "selected" stimulus nodes (those output pins whose corresponding NVS gates 1063 are selected) and of the addressed potential response-developing nodes (as addressed through switching means 1100) to transition-address storing unit 1160. When a responsive transition is detected by detecting means 1150, the detecting means 1150 instructs storage unit 1160 to store the response-developing point address supplied to it by scan control unit 1300.

Preferably, an asynchronous transmission path is provided from the potential response-developing nodes (PRDP's) of the interconnect network under test (NUT) through switching means 1100 directly to transition detecting means 1150 so that minimal time is consumed in capturing responsive levels at time points $t_c$ and $t_f$ (FIG. 1E), for determining whether a responsive transition has occurred at an addressed potential response-developing point (PRDP), for storing the observation address in memory unit 1160 when a transition has occurred, and for indexing to a next potential response-developing point and/or a next stimulus injection point.

With these general concepts now at hand, a more specific embodiment of the invention will be examined.

Referring to FIGS. 3J and 3K combined (see key in FIG. 3K), the internal architecture of an integrated circuit chip $C_{12}$ in accordance with the invention is illustrated. Reference symbols similar to those used in FIGS. 2 and 3A, 3A' are used here to facilitate the explanation.

The mix-in circuitry and output buffering circuitry are one and the same in FIGS. 3J,K. Expanded output buffer (EOB) 365 performs a logic OR/NOR operation on functional signals supplied over its primary input terminals 365$a$, 365$b$ and on the zero-minus flavored signal MNV(0−) supplied to its secondary input terminal 365$c$.

A non-inverting output of EOB 365 supplies the resultant OR output signal to off-board net segment $W_{12o}$. An inverting output of EOB 365 supplies a corresponding NOR function output signal to on-board net $T_{12o}$.

Figure 3F:
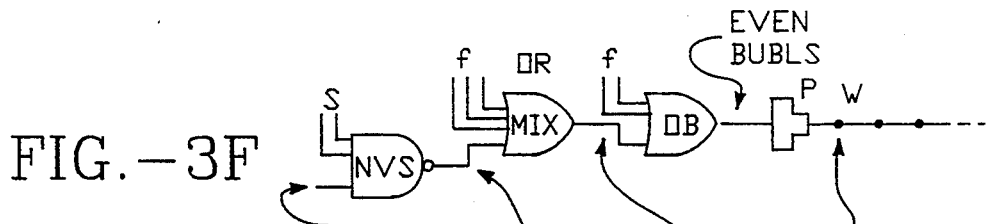
FIGS. 3F–3I are a set of simple schematics for explaining design options in implementing the architecture of FIG. 3A when the driven net goes off-board.
Figure 3G:
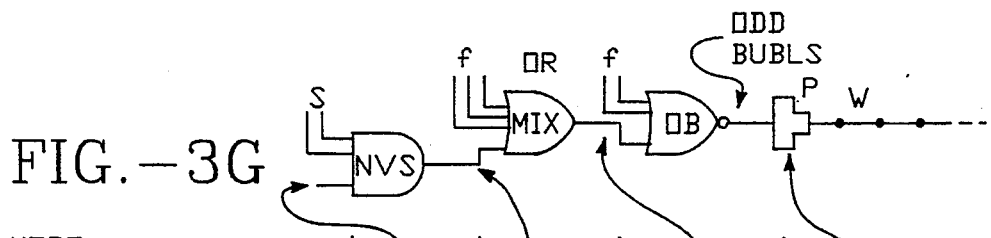
Figure 3H:
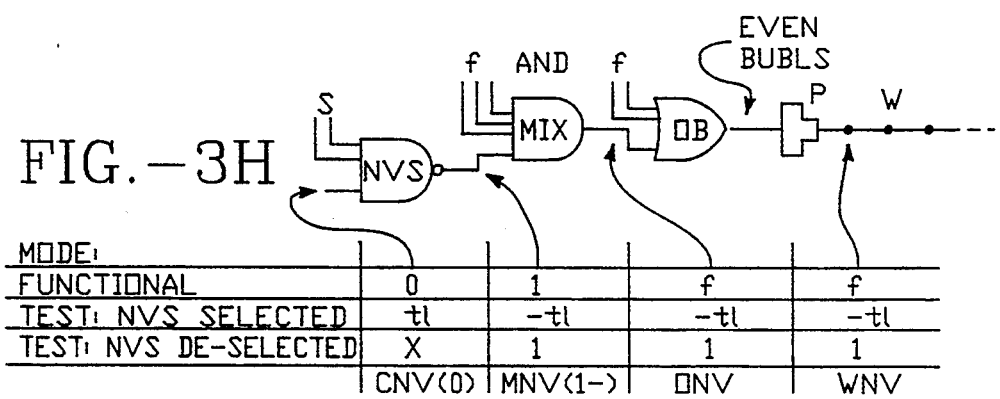
Figure 3I:
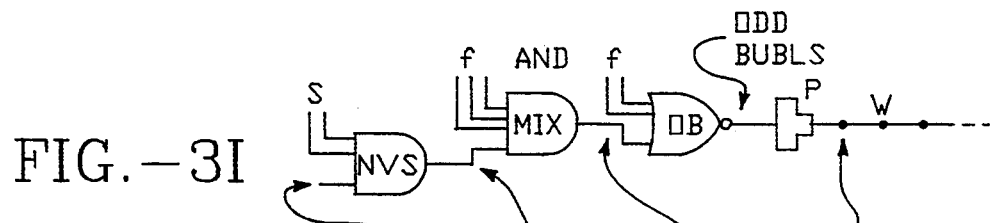
Figure 3K:
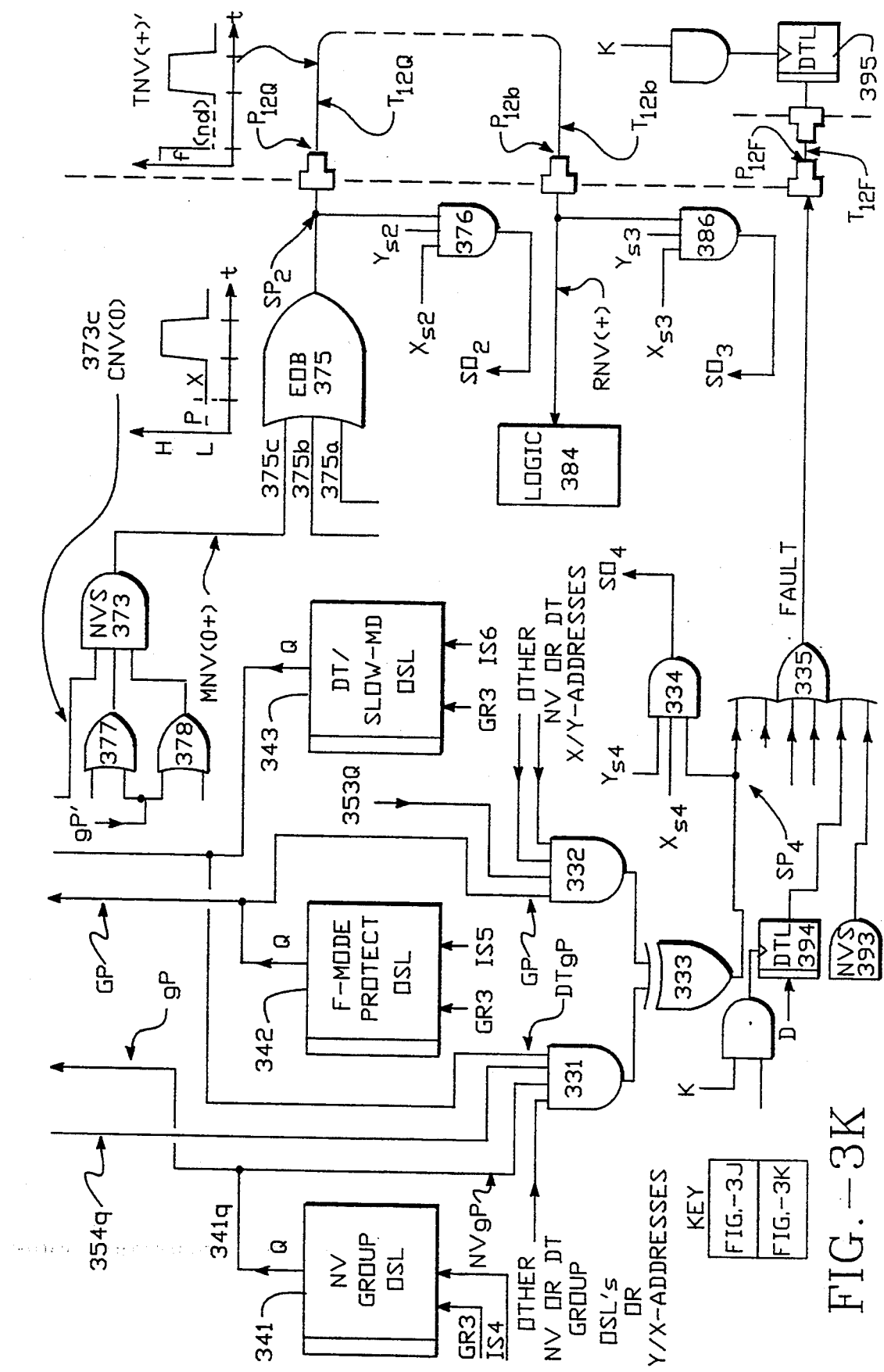

This design conforms with already-described FIGS. 3C and 3F. The mix-in function is OR-type and there is one inversion bubble between the MNV point 365$c$ and the pin $P_{12o}$ driving on-board net segment $T_{12o}$. There are no inversion bubbles between the MNV point 365$c$ and the pin driving off-board net segment $W_{12o}$. The designed-in choice for NVS gate 363 is therefore NAND for controlling both the off-board and on-board net driving points. The control signal CNV[1] applied to input terminal 363$c$ of the NVS gate 363 is accordingly one-flavored.

The waveforms which develop at the MNV (0−) point 365$c$ and the CNV[1] point 363$c$ are shown adjacent to their reference symbols in FIG. 3J. During F-mode, the CNV[1] signal is maintained at a "protective" high level (P=H=logic "1") and NVS gate 363 is selected. This produces a non-controlling (nc) low level at MNV point 365$c$. During NVT-mode, if the NVS gate 363 is "de-selected", the level of the CNV[1] signal is a don't care ("X") and a background-defining level (B=H) is produced at MNV point 365c to create a non-dominant (nd) level at the injection point of on-board net $T_{12o}$ and a dominant level (d) at the injection point of off-board net segment $W_{12o}$. When NVT-mode is active and NVS gate 363 is "selected", then a test level, tl, which develops at CNV point 363c propagates asynchronously through NVS gate 363 and EOB 365 to develop at net-driving point $P_{12o}$. A negative-phased version (−tl) develops at the chip pin driving off-board net segment $W_{12o}$.

Expanded output buffer (EOB) 375 of FIG. 3K performs a logic OR operation on functional signals supplied to its input terminals 375a, 375b and the MNV(0+) signal supplied to its input terminal 375c. Pin $P_{12Q}$, which is driven by EOB 375 connects to an on-board net segment $T_{12Q}$, and accordingly, the designed-in choice for NVS gate 373 is AND. NVS gate 373 receives a zero-flavored CNV[0] signal at its terminal 373c. This conforms with the design of FIG. 3B. The waveform for the CNV[0] signal is shown in FIG. 3K. During F-mode, the protective level, P, is logic zero. Input 375c becomes non-controlling and functional levels (f) appear on pin $P_{12Q}$.

As seen in FIG. 3J, the CNV[1] signal is developed from the output 361o of an OR-type SNC gate 361. Contrastingly, the CNV[0] signal is developed from the output 371o of a NOR-type SNC gate 371. Both OR gate 361 and NOR gate 371 are driven by a common injection control signal INV(+) output from OR gate 360c. Injection signal INV(+) is applied to a non-inverting input 361c of SNC gate 361 and simultaneously to an inverting input 371c of SNC gate 371. When a so-called "slow mode" line is raised high (this line is alternatively known as the delay-test group-protect, DTgP, line), the injection signal INV(+) is forced high and both flavors of the control signal, CNV[0] and CNV[1], are forced high. Thus, when "slow-mode" is active, the control inputs 373c and 363c, of respective NVS gates 373 and 363 are at the non-controlling logic one levels. In such a case, the corresponding MNV levels are under the exclusive controls of a soon-to-be described select circuit of which latches 353 and 354 form a part.

A Q-state enforcing portion of FIGS. 3J, K, will now be described. Logic unit 364 replaces the logic unit 264 which was earlier presented in FIG. 2. Logic unit 364 includes at least one scan-driven terminal 364b, which when driven to an appropriate level by scan latch 352, causes logic unit 364 to drive a primary input terminal 365a of the OR-type output buffer 365 to a non-controlling (nc) level, in this case, the logic zero ("0") level. "Non-controlling" means here that the signal input into the gate is not absolutely determinative of the gate output level. A logic "1" at another gate input terminal (e.g. 365c) of EOB 365 would be controlling. Logic unit 364 is said to be in a Quiescent state (Q-state) when it is forced to output a non-controlling level to EOB 365. It will be assumed here that a logic "1" on scan-driven terminal 364b places logic unit 364 in the Q-state.

In a similar vein, the output of AND gate 367 maintains a non-controlling ("0") level at another primary input 365b of the output buffer 365 when Q-state is in force. AND gate 367 is part of a so-called "flow-through path" by which off-chip signals move from pin $P_{12a}$ through the chip $C_{12}$ to output buffer 365 and subsequent nets $T_{12o}$ and $W_{12o}$.

There are two mutually non-exclusive ways of maintaining gate 367 in the Q-state. First, a controlling "0" level can be applied to input terminal 367b of AND gate 367 from scan latch 352 when Q-state is active. A clock-suppressing AND gate 351 blocks system clock pulses (K) from reaching scan latch 352 and changing its outputs while Q-state is in force. Q-enforcing gate 349 outputs a low KZ signal to an input of gate 351 during Q-state. Q-enforcing gate 349 is an OR gate whose output (KZ) can go low only when both of a group-protect signal (gP) and a global-protect signal (GP) applied to its inputs are low. The gP signal is output from latch 341 (FIG. 3K) and the GP signal is output from latch 342. If Q-state is to be enforced over latch 352, logic unit 364 and AND gate 367, both of the GP and gP signals have to be low and scan latch 352 has to be set. After clocks (K) are suppressed, a logic one ("1") is scanned into SL 352 by way of scan gate 350.

A second way of enforcing Q-state over gate 367 is to directly connect the output of Q-state enforcing gate 349 directly to input 367c of AND gate 367. A controlling "0" level on input 367c produces a non-controlling "0" level on input 365b of the EOB and simultaneously it blocks flow-through signals from passing through input terminal 367a to other parts of the chip $C_{12}$.

As will be seen later, a controlling level (a logic high level) is not permitted to develop at the secondary input terminal 365c of the OR-type EOB 365 if NVS gate 363 is selected and an active global-protection signal GP is asserted at terminal 361b of the corresponding Selected-NVS Control gate (SNC) 361 or an active group-protect signal gP is asserted at terminal 361a of SNC gate 361. During F-mode, both protection signals, GP and gP, are asserted thus providing double protection against interference with functional operations from the net verification circuitry.

The output, CNV(1) of SNC gate 361 is relevant only when its corresponding NVS gate 363 is selected. If NVS 363 is deselected, the value of signal CNV(1) is noncontrolling. This is why OR gate 361 is referred to as the "Selected-NVS Control gate".

When NVT-mode is active (GP and gP are both low) but slow-mode is not active (the Q output of latch 343 is low) an externally-generated net-verify test signal INV[+]can be injected into chip $C_{12}$ from SID pin $P_{12S}$. The injected test signal propagates asynchronously from SID pin $P_{12S}$ to net-drive pin $P_{12o}$ by successively passing through an on-chip scan control unit (SCU) 360, the SNC gate 361, the NVS gate 363 and EOB 365.

AND gate 360a, shown within the SCU 360, represents combinatorial logic for routing the externally-generated INV[+]signal from SID pin $P_{12S}$ to SNC gates 361 and 371 in accordance with scan address data (SAD) provided through pin $P_{12A}$. SNC gate 361 has to be in an "unprotected" mode (the gP signal applied to its input 361a and the GP signal applied to its input 361b, both have to be inactive) and NVS gate 363 has to be in a "selected" mode if a net-driving signal TNV[+]having a "dominant" test pulse is to be injected into the corresponding on-board net, $T_{12o}$. If NVS gate 363 is not "selected" and NVT-mode is active, a nondominant output level (nd) appears on output pin $P_{12o}$. If SNC gate 361 is "protected" (by the assertion of the group-protect signal gP by itself or by the assertion of both the gP and global-protect GP signals), a noncontrolling input level (nc) appears on secondary input terminal 365c of the EOB 365 and the externally-generated test signal is blocked from reaching pin $P_{12o}$ by way of secondary input terminal 365c.

Of importance, it is to be noted that the pulse-shaped portion of test signal INV[+]travels through a purely combinatorial network (360a, 360c, 361,363,365) as it moves from scan-in pin $P_{12S}$ to net-driving pin $P_{12o}$. System clock signals do not have to be supplied over a system clock line (K) to move the test signal waveform from pin $P_{12S}$ to pin $P_{12o}$.

It was stated that a "nondominant" output level (nd) appears on output pin $P_{12o}$ if gate 363 is not "selected,". A nondominant level (nd) is defined here as one which is overpowered by a dominant level of a given technology when both are applied to a same net. In open-collector TTL logic, a strongly-sunk logic low (0 volts) is considered dominant over a weakly pulled-up logic high ("0"). In ECL technology on the other hand, a strongly-sourced logic "1" is considered dominant. These are just examples. The dominant versus nondominant designation can vary from case to case, and in some technologies a dominant versus nondominant distinction may not even exist. If the distinction does not exist, then the level developed on each pin when its NVS gate is de-selected is simply referred to as the "background" level.

The circuits of FIGS. 3J and 3K are constructed with ECL technology and thus a logic one ("H" or "1") is considered dominant for this case.

NVS gate 363 is depicted as an AND gate with two non-inverting input terminals 363a, 363b coupled to "selecting" circuitry positioned to its left and a further non-inverting input terminal 363c which is coupled by a vertically-snaking line to the output 361o of SNC gate 361. This illustrative configuration helps to distinguish the functions performed by the CNV[1] signal and the functions performed by NVS gate selecting signals, $VS_1$ and $VS_2$.

First input terminal 363a of the NVS gate receives the first verify select signal $VS_1$ from OR gate 355. Second input terminal 363b receives the second verify select signal $VS_2$ from OR gate 357. OR gates 355 and 357 are respectively driven by the Q output terminals of operating state latches (OSL's) 353 and 354.

OSL's 353 and 354 will be respectively referred to as X and Y NVDT select latches for reasons explained later. The on-chip scan control unit (SCU) 360 controls the state of these X and Y select latches, 353 and 354, by way of group reset (GR) and/or individual latch set (IS) operations. (A further description of OSL's and the SCU will be provided later on.)

When both of OR gates 355 and 357 output logic "1's", NVS gate 363 is said to be "selected" or "fully armed." When it is so armed, NVS gate 363 steers an inverted version of the CNV[1] signal that it receives on its input terminal 363c to the secondary input terminal 365c of the test-signal mix-in gate, 365. When either of OR gates 355 and 357 outputs a logic "1", NVS gate 363 is de-selected.

De-selection is used during NVT-mode to place a "background" level on some or most nodes of the interconnect network under test (NUT).

As will be recalled, the single-point toggle/multiple-point observe test method (STMO) is preferentially employed at the board level. All nets of the NUT are initially held at the nondominant (nd) background level and then a dominant test pulse is injected at a chosen stimulus point. Contrastingly, the Walking Non-Dominant Level test (WNDL) is preferentially employed at a higher level of modularity such as at the frame level. In the WNDL test, all the nets of the NUT are initially held at the dominant (d) level and then a non-dominant (nd) level is developed at a chosen one of the nets. Because chip $C_{12}$ employs a scan set/reset architecture as disclosed in the above-cited copending U.S. patent application Ser. No. 07/670,289 (entitled "SCANNABLE SYSTEM WITH ADDRESSABLE SCAN RESET GROUPS"), it turns out that the fastest way to switch most nets to one or the other of the non-dominant or dominant background levels (nd or d) is by using a global or group reset to "de-select" the corresponding NVS gate. De-selection of an NVS gate which drives an on-board net (T) automatically places the non-dominant (nd) background level on the driven pin during NVT-mode. De-selection of an NVS gate which controls a node on an off-board net segment (W) automatically places a dominant (d) background level on the control pin during NVT-mode. The quickest way to then reverse the nd or d state of a desired one or a few nodes is to issue individual set signals to the corresponding operating state latches (OSL's) which control the selection of the respective individual NVS gates.

By way of example, assume that on-board net $T_{12o}$ is participating in a STMO test while off-board net segment $W_{12o}$ is not. A global reset is applied to the board. The global reset activates group reset lines GR1, GR2, and GR3. A short assertion of these group resets brings the global protect (GP) and group protect (gP) signals low, and it also de-selects all the NVS gates by resetting select OSL's such as 353 and 354. A first individual set signal IS1 is then applied to scan latch 352 by way of latch-setting AND gate 350. Scan-address lines $X_{S1}$ and $Y_{S1}$ are raised high while further line $SET_Z$ is also raised briefly. This sets latch 352 and places logic unit 364 and AND gate 367 in the Q-state.

Assume next, that pin $P_{12o}$ is chosen as the pin which is to receive an externally-generated stimulus signal from SID pin $P_{12S}$. A second individual select signal IS2 is applied to select OSL 353 and a third individual select signal IS3 is applied to select OSL 354 (through other scan gates, not shown but similar to 350). NVS gate 363 is then "armed" or selected to steer the applied test signal to stimulus-injecting point $P_{12o}$.

Figure 5:
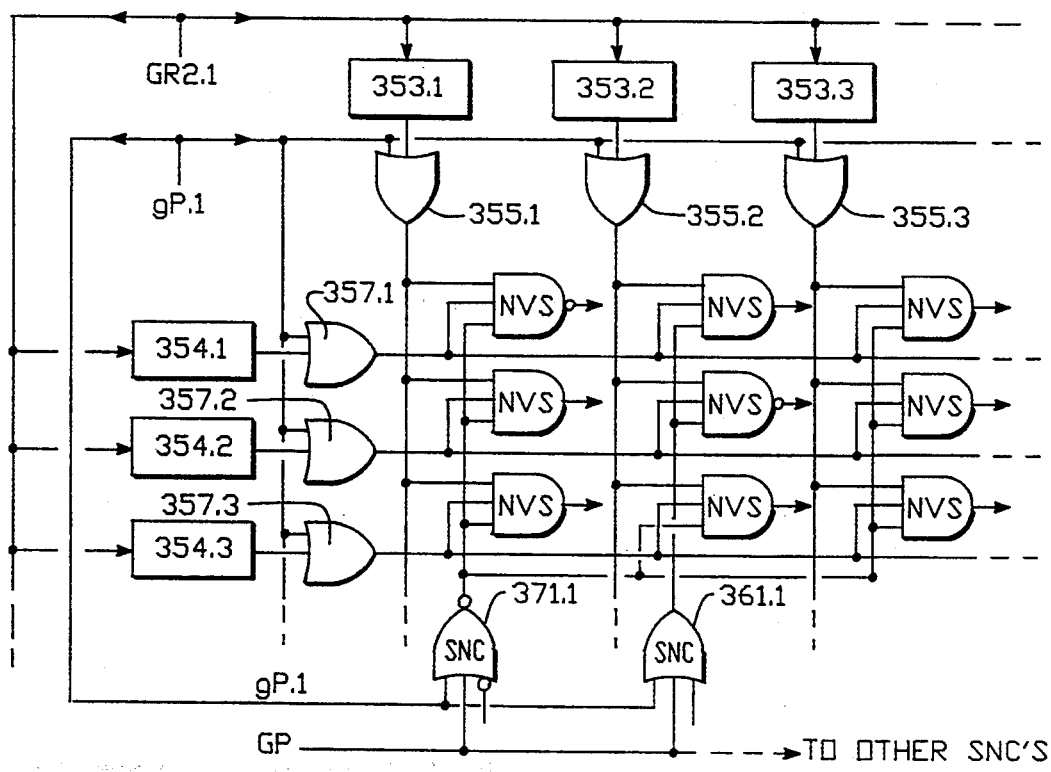
FIG. 5 is a schematic of plural NVS gates for explaining how groups of mix-in points can be "selected" for test-signal injection while others are not so selected.

The operation is better understood by briefly referring to FIG. 5. Here, an array of X-select OSL's, 353.1, 353.2, 353.3, etc., and Y-selecting OSL's 354.1, 354.2, 354.3, etc., are shown. A group reset GR2.1 simultaneously resets all the select OSL's. Individual set signals (not shown) are then applied to individual select OSL's to select individual NVS gates.

Incidentally, it should be understood that in some cases, it may be advantageous to reverse the OSL set/reset operation by employing group sets and individual resets rather than group resets (GR's) and individual sets (IS's). The use of one or the other or a combination of both depends on the type of network verifying tests that are expected to be most commonly employed (STMO versus MTMO versus WNDL) on various types of nets (e.g., on-board versus off-board).

Returning to FIG. 3J, OR gates 355 and 357 provide two mutually non-exclusive ways for selecting NVS gate 363. The first way, as already mentioned, is to individually set latches 353 and 354 by way of individual-set signals IS2 and IS3. A logic "1" on the Q output of latch 353 passes through OR gate 355 to raise input terminal 363a to logic "1". A logic "1" on the Q output of latch 354 passes through OR gate 357 to similarly raise input terminal 363b of NVS gate 363.

The other way to select NVS gate 363 is to raise the group-protect (gP) line. This line connects to the inputs of both OR gates 355 and 357. When F-mode is active, it is advantageous to simultaneously use both methods for selecting all NVS gates 363, 373, 393, etc., (NVS gate 393 will be discussed later). The reason, as already explained (see FIGS. 3C and 3D), is that NVS gates which receive the CNV[1] flavored control signal have to be selected in order to allow the CNV signal to establish a non-controlling MNV level at the mix-in point. By using both methods for selecting the NVS gates, a fault-tolerant method is provided for assuring that a non-controlling MNV level will be maintained at the mix-in point. If one of the NVS gates selecting mechanisms fails, the other mechanism will continue to maintain a non-controlling level at the mix-in point.

There are typically many net-verify steering gates on a chip (such as NVS gates 363, 373 and 393 of FIGS. 3J, 3K) and more than one of these can be "deselected" or "selected" at a time. (See FIG. 5.) When a "group" of NVS gates are simultaneously disarmed (deselected) by resetting one of their respective X and Y select OSL's (e.g. 353 and 354) and by resetting their respective group-protecting OSL (e.g., 341) while NVT-mode is active, more than one of the on-board or off-board nets driven by chip C12 will be simultaneously driven to a respective nondominant (nd) or dominant (d) background level. When a "group" of NVS gates are simultaneously armed (selected) by setting all of their respective X and Y select OSL's (e.g. 353 and 354), while both the corresponding group-protect signal (gP) and the global protect signal (GP) are low, more than one of the on-board or off-board nets driven by chip C12 will be simultaneously driven to a test level, tl, as dictated by their corresponding control signal, CNV[1] or CNV[0].

Referring to FIG. 3K, latch 341 is an operating state latch (OSL) which can be individually set by an individual set signal (IS4) supplied from the on-chip SCU 360 or reset by a group reset signal (GR3) also supplied from SCU 360. OSL 341 can also be set by a global reset signal (GRG, not shown) also supplied from SCU 360. When the global reset (GRG) is activated, all the group reset signals GR1, GR2, GR3, are activated. It is to be noted that group-reset signal GR2 (FIG. 3J) may be activated independently of group reset signal GR3 and vice versa. Group-reset signal GR2 is used for establishing various select patterns among select latches 353 and 354. Group-reset GR3 is used for establishing various patterns among mode-controlling latches 341, 342 and 343.

When latch 341 is set, it places all net-verify steering gates (such as NVS 363) and mix-in circuits (such as EOB 365) belonging to its group in the "protected" state. The "protected" state means that the corresponding group-protect (gP) signal is raised to logic "1" and as a consequence, the Q-state enforcing gate 349 is automatically de-activated, all NVS gates belonging to the group are automatically "selected", all corresponding SNC gates which output a CNV[1] flavored control signal are forced to output a logic "1", and all corresponding SNC gates (e.g., gate 371) which output a CNV[0] flavored control signal are forced to output a logic "0" level.

Latch 342 is another OSL which can be individually set by an individual set signal (IS5) and reset by the group reset signal (GR3). Its function is similar to that of the group-protect OSL 341 with the exceptions that: (a) its output signal, GP, extends to a plurality or all groups rather than to a specific group, and (b) its output signal, GP, does not extend to the inputs of semi-arming OR gates such as 355 and 357, and accordingly, the setting of the global protect OSL 342 does not automatically "select" all NVS gates. If desired, the global-protect (GP) line could be extended to the inputs of all semi-arming gates (e.g., 355 and 357) so that assertion of global-protect (GP) automatically selects all NVS gates. This would consume additional space on the chip $C_{12}$, however, and it was thought to be excessive because double-fold protection is already provided in F-mode by setting all the select latches (353, 354) and setting all the group-protect latches (e.g., 341 and 343).

When F-mode is active, the global-protect signal (GP) and all group-protect signals (gP, gP', DTgP) are supposed to be raised to logic "1". This can be quickly done by asserting group-reset signal GR3 and then individually setting latches 341, 342 and 343.

While FIG. 3J shows the case where a positive phase INV(+) signal is applied through SID pin $P_{12S}$ to generate a positive phase TNV(+) test signal on on-board nets; it may be desirable for certain circuit designs (e.g. ECL gates) to use a negative logic where a negative phase INV(−) signal is instead applied to the SID pin to produce the same end result. In some technologies, the use of a negative-phase eliminates the need for an additional level of gates and thus speeds the delivery of the test signal from SID pin $P_{12S}$ to the stimulus injection point (e.g., pin $P_{12O}$).

The fault-tolerant nature of the design has been alluded to several times, but it will be reemphasized here. When F-mode is active, the network verification circuitry should not interfere in any way with ongoing functional operations. When F-mode is in force, all NVS gates selecting latches (e.g., 353–354) and all protect latches (341–343) have to be set. If one of latches 353, 354 or 341–343 becomes reset during F-mode, either erroneously because of a software error, or because of noise (e.g. by an alpha particle), this alone is not sufficient to activate the Q-state enforcer 349 or to deselect one of the NVS gates or to override the double-fold protection (gP and GP) applied to the SNC gates. (The exception would be if the GR3 group-reset line were activated unintentionally by software or by noise. It is a rather unlikely condition, but if troublesome, individual reset controls rather than a common group reset GR3 may be supplied to latches 341–343.)

In summary, the circuit has a certain degree of noise immunity because at least two independent controls have to be actuated to let a controlling level through to secondary input terminal 355c of EOB 365. A controlling level cannot appear on secondary terminal 365c unless the global protect (GP) is down, the group select (gP) is down and NVS gate 363 is selected. Q-state cannot be enforced over logic unit 364 unless GP and gP both go low and scan latch 352 is further set.

Latches 353, 354, 341–343 have been described above as "operating state latches" or OSL's. This deserves further explanation. There are two basic types of scan-controllable latches shown in FIGS. 3J and 3K; clocked and non-clocked (clock-sensitive and clock-insensitive). Both types of latches are under control of the on-chip scan control unit (SCU) 360.

An example of the clocked first type of scan-controllable latch is scan latch 352. The state of this scan latch (SL) 352 may be individually set by an individual setting signal IS1 issued from SCU 360 by way of latch setting gate 350. $X_{S1}$ and $Y_{S1}$ are scan addressing signals which address AND gate 350. $SET_Z$ is a control signal supplied from SCU 360.

The state of scan latch (SL) 352 may be reset to a logic "zero" by either a global or a group reset signal GR1 also issued by SCU 360. Clock signals (K) are suppressed from reaching a clock-receiving terminal of scan latch (SL) 352 by a clock suppress signal (KZ) which is further generated by an OSL (not shown) within SCU 360. AND gate 351 is shown supplying suppressible clock pulses to clocked scan latch 352. An efficient method for suppressing clock pulses is disclosed in the above-cited U.S. patent application Ser. No. 07/672,951. An efficient method for generating global and group resets is disclosed in the above-cited U.S. patent application Ser. No. 07/670,289. Both disclosures are incorporated herein by reference. The details of these disclosures will not be reproduced here.

An example of a non-clocked second type of scan-controllable latch is OSL 353. An operating scan latch (OSL) is a type of scan latch which can be addressed by the on-chip scan control unit (SCU) 360 to be individually set (IS2) or reset globally with all other latches of chip $C_{12}$ or reset as part of a smaller group of latches (GR2). But unlike clocked scan latches, an OSL does not switch states in response to system clock pulses (K). It is clock-insensitive and thus it is preferentially used by the scan control unit 360 to "configure" other parts of the IC chip $C_{12}$ into operating modes or "configurations" which do not change in response to system clock pulses.

In FIG. 3J, the "selecting" OSL's 353 and 354 serve dual purposes. It turns out that the net verification test is mutually exclusive of another kind of test referred to as the "delay test". The delay test (DT) uses an addressing function to route test pulses through selectable circuits (not shown) on the chip $C_{12}$ for measuring the delay characteristics of the chip or external circuit (e.g., nets) coupled to the chip. Each chip can have different delay characterization even though the chip is pulled from a batch of similar chips. (Chip delays can vary as a function of numerous production process variables.) The delay test is used to measure the unique delay characteristics of each chip. To do so, the delay test employs a pulse fencing function to selectively fence off various sections of the chip for receiving or not receiving test pulses, as well as an addressing function.

As seen above, the net-verify test also utilizes an addressing function for steering a net-verify pulse-carrying signal INV(+) to one or more injection points and a fencing function (protecting function) for selectively fencing off various NVS gates from steering the corresponding control signal CNV to respective stimulus points. When chip $C_{12}$ is in a net-verify mode, OSL's 353 and 354 serve as address generating latches for the net verify test. When chip $C_{12}$ is in a delay-test mode, the same OSL's 353 and 354 serve as control latches for the delay test circuitry (DT). OR gates 356 and 358 couple the outputs of OSL's 353 and 354 to the DT circuitry (not shown). OSL 343 serves as a group-protect latch for simultaneously arming gates 356 and 358. Just as all NVS gates have to be "selected" during F-mode to avoid interference with functional circuit operations, there is a corresponding delay-test circuit (not shown) whose portions all have to be "selected" in order to prevent them from interfering with other operations on integrated circuit chip $C_{12}$. When delay-test (DT) is active, both the global-protect (GP) signal and the delay-test group-protect (DTgP) signal must be low while all net verification group-protect signals (NVgP) are held high. This blocks the net verification "groups" from interfering with delay test while at the same time allowing delay-test to proceed. When F-mode is in force, all group-protect signals (NVgP and DTgP) should be held high, the global protect signal (GP) should be held high and all NVS gate selecting lines or DT circuit selecting lines should be held high. A circuit (331–333) which is designed to verify this condition during F-mode will be described shortly.

At least two different techniques can be employed for addressing (selecting) individual NVS gates. In one technique, semi-arming gates 355 and 357 drive orthogonally disposed address lines, as shown in FIG. 5. The address lines cross with one another to define an addressing gridwork. NVS gates (e.g., 363) are positioned at crosspoints of the gridwork and each is coupled to the locally crossing address lines. In such a case, one set of OSL's (354) addresses rows and another set of OSL's (353) addresses columns as shown in FIG. 5.

Alternatively, addressing may be carried out in a less structured manner. A combinatorial addressing method may be used instead of the X-Y grid method. The setting of any unique combination of two addressing OSL's individually arms a given NVS gate (363) in such a technique. The address space of the combinatorial method is inherently larger than that of the gridwork method, but it is also more difficult to implement and thus less preferred in most cases.

When each chip, e.g. $C_{12}$, is first powered up, a master reset command is given. The on-chip scan control unit 360 of each chip (e.g. $C_{12}$) issues a global reset to all its OSL's. The Q noninverted output signals of address latches 353 and 354 and global/group-protecting latches 341–343 are thus driven to logic zero ("0"). All NVS gates are thus automatically de-selected, all group-protect and the global-protect lines are brought low, and as a consequence, the background non-dominant (nd) levels develop at all pins which drive on-board nets (T) and the background dominant (d) levels develop on all pins which drive off-board net segments (W). Pairs of individual addressing OSL's must be individually set after the power-up/global-reset to "select" individual NVS gates.

Note that latch 343 serves dual purposes. If it is set while F-mode is active, it prevents delay-test circuitry from interfering with functional operations. If it is set while NVT-mode is active, it places the net verification circuitry in "slow-mode". In slow-mode, the control signals (both CNV[1] and CNV[0]) are made non-controlling of their respective NVS gates. The NVS selecting latches (e.g., 353 and 354) can then be used to establish desired levels on the outputs of respective NVS gates.

For system reliability reasons, it is advantageous to know when noise or another fault within the system resets one of the global/group-protecting OSL's 341–343 or one of the NVS selecting OSL's 353–354 while F-mode is active.

It may also be useful to know when a fault sets or resets only one of the X and Y individual addressing OSL's 353 and 354 while either NVT-mode or DT-mode is active. Normally the X and Y addressing OSL's are flipped in pairs during these non-functional modes. For every set one of the X-addressing OSL's there should be a counterbalancingly set Y-addressing OSL.

Also, when either NVT-mode or DT-mode is active, the global protect (GP) is dropped and, in counterbalance, at least one of the group-protect lines (gP) is also dropped.

During non-test mode all X and Y select latches (353, 354) should be set.

Respective AND gates 331 and 332 deliver their outputs to opposed sides of exclusive-OR gate (XOR) 333. AND gate 331 collects the Y-addressing signals output from individual Y-addressing latches such as OSL 354. AND gate 332 collects the opposing X-addressing signals output from individual X-addressing latches such as OSL 353. Each XY pair has to be both high (H) while F-mode is in force. If not, XOR gate 333 outputs an error signal. AND gate 333 also collects the global protect signal GP output from latch 342. AND gate 331 collects the group-select signals NVgS and DTgS from OSL's 341 and 343. When the global protect falls (GP="0"), at least one of the NV and DT group protects should be down to simultaneously enable activation of one of the NV or DT test circuits. When the global protect signal GP rises (in F-mode), all group-protects and all X/Y select lines should also be at logic high (H) because, as earlier explained, according to the adopted system-wide rule, all NVS gates have to be "selected" when the system is in F-mode and all group-protects (gP) plus the global protect (GP) have to be high when the system is in F-mode. If a group-protect signal, gP, goes low but the global protect GP is high, an error condition is flagged out by XOR 333.

Error signals are sent out to an error-report collecting OR gate 335. OR gate 335 collects error reporting signals from many fault signalling parts of chip $C_{12}$ and sends out a collective error-reporting signal to pin $P_{12F}$. Scan gate 334 is addressed by scan address lines $X_{s4}$ and $Y_{s4}$ when the SCU 360 wishes to determine if the origin of a fault signal is at scan point $SP_4$.

The net, $T_{12F}$, which carries the fault report from OR gate 335 to other chips can itself be tested during network verification. This is done by recognizing that OR gate 335 can function as a mix-in point for NVS gate 393. The output of XOR gate 333 is non-controlling during NVT-mode because GP and at least one of the gP signals is low during NVT-mode. Q-state is enforced over delay-test latch (DTL) 394 and then NVS gate 393 can inject test levels into net $T_{12F}$.

Net $T_{12F}$ can also be tested for its delay characteristics during DT-mode. Again, the output of XOR gate 333 is non-controlling because GP and DTgP are both low during DT-mode. NVS gate 393 outputs a non-controlling logic "0" to OR gate 335 because the corresponding NVgP signal for the group of NVS gate 393 is set high during DT-mode. To test the delay characteristics of net $T_{12F}$, a first level is loaded into delay test latch (DTL) 394 and the same level is loaded into another DTL 395 which is coupled to another end of net $T_{12F}$. An opposing level is presented to the D-input of DTL 394. Two closely-spaced clock pulses are applied to both delay test latches, 394 and 395. The first clock pulse causes the output of DTL 394 to transition. The second clock pulse causes DTL 395 to capture the response developed at the other end of net $T_{12F}$. Excessive delay is indicated by the failure of DTL 395 to capture the switched level.

Aside from showing how a test level is generated at a stimulus injecting node of a network under test (NUT), FIGS. 3J, 3K also show how the level at a potential response-developing point (PRDP) is relayed asynchronously through a local chip back through the scan system for analysis. It will be assumed here that net $T_{12Q}$ is shorted to net $T_{12b}$. When a transitory test signal is injected by way of NVS gate 373 and EOB 375 into network stimulus point $P_{12Q}$, a responsive transitory signal RNV(+) develops on pin $P_{12b}$. The state of this pin is observed by raising scan address lines $X_{s3}$ and $Y_{s3}$ to logic one ("1"), thus activating AND gate 386. The signal level present at pin $P_{12b}$ then moves through scan point detecting gate 386 as scan output term $SO_3$ and this term is collected by OR gate 360b of the scan control unit 360 to be output as scan output data (SOD) on return pin $P_{12R}$.

Note that a further scan point detecting gate 376 has one of its inputs coupled to net-driving pin $P_{12Q}$. The output of this AND gate 376 is returned to OR gate 360b as scan out signal $SO_2$. The $X_{S2}$ and $Y_{S2}$ lines are raised high at the time it is desired to capture a level present at pin $P_{12Q}$. Similarly, the $X_{S3}$ and $Y_{S3}$ lines are raised high at times when it is desired to capture levels present on response-developing pin $P_{12b}$. Note that AND gate 366 (FIG. 3J) similarly returns the level present at scan point $SP_1$ to gate 360b as scan-out signal $SO_1$. $SP_{10}$ is a further scan point whose scan-out gate is not shown.

Of importance, it should be noted that the original transitory test signal INV(+) moves through a clock-independent (purely combinatorial) path as it is routed from scan input pin $P_{12S}$ to a desired net drive-point (e.g., $P_{12Q}$) and the return signal also moves through a clock independent path as it is routed from a desired response-developing point (e.g. pin $P_{12b}$) to the scan-output pin $P_{12R}$ of chip $C_{12}$.

The net-under-test can therefore be a system clock line just as easily as another signal-carrying line. This is so because testing is not dependent on having clock signals delivered over the system clock line to clock registers as the test signal moves through chips $C_{12}$ and $C_{23}$.

Also, the waveform of the injected test signal TNV(+) can be controlled at the chip input pin, $P_{12S}$, it is not dependent on the waveform of system clock pulses. The return signal RNV(+) can be captured at a time point relatively soon after the test signal TNV(+) is injected into pin $P_{12S}$. The only delays imposed on an externally-generated test signal INV(+) as it passes through the net-under test and returns through the same or a similar chip to an external analysis unit, are by the SCU steering circuit 360a, slow-mode enforcing gate 360c, SNC 371, NVS gate 373, EOB gate 375, scan gate 386 and scan collecting circuit 360b (represented as an OR gate). Because the test signal is functionally mixed-in at, for example, EOB 375, there is no time-delay penalty imposed on the flow path of normal-mode signals as they move from a primary input line, such as 375a, to their corresponding output pin $P_{12Q}$.

Referring to FIG. 3J, one of the weak points in the above-described network verification system is that it depends on scan address (SAD) and scan input/output data (SID, SOD) signals transmitted over corresponding scan nets $T_{12A}$, $T_{12S}$ and $T_{12R}$ for proper operation. If one of the scan lines ($T_{12A}$–$T_{12R}$) is shorted to a functional line (e.g., $T_{12o}$), the results of network verification may be completely erroneous. There is however, a way of proving that such functional-net to scan-net shorting does not exist.

The verification method comprises the steps of driving all function-nets to dominant levels and then testing for address-uniqueness among scan-addressable latches.

More specifically, the system is put into NVT-mode with GP and all NV group-protects dropped low. All NVS gates belonging to off-board (W) nets are deselected. This automatically places the background dominant level on all the off-board functional nets.

Next, scan latches such as SL 352 are individually addressed, set and then reset. All scannable points (e.g., $SP_1$, $SP_{10}$, $SP_2$, etc.) are checked to verify that only the one-addressed scan latch set and reset. This is repeated for all uniquely-addressable scan latches and scan points. If there is a short between a dominant off-board (W) net and one of scan-nets $T_{12A}$–$T_{12R}$, the uniqueness test should fail at some point where address or data signals are overridden by the dominant W-net to which one of the scan-nets is shorted.

If the address uniqueness test fails during this first phase, the number of dominant W-nets is cut in half and the test is repeated. Binary bisection is used to determine which half the shorted W-net belongs in. That subset is divided in half again and the test repeated to further isolate the location of the shorted W-net.

Assuming that no shorts are found between the off-board (W) nets and the scan lines ($T_{12A}$–$T_{12R}$), all on-board (T) nets are next driven to the dominant level. This is done by activating slow-mode (OSL 343 is set). In slow mode, both flavors of the NVS control signals (CNV[1] and CNV[0]) and driven to a non-controlling logic "1". The output of each NVS gate is then determined exclusively by the select signals $VS_1$ and $VS_2$ applied to its select inputs. A computer program may be used to determine what pattern of selects and de-selects is necessary for producing dominant levels, one at a time or simultaneously, at all of the on-board (T) nets. For the technology illustrated by FIGS. 3B–3E, dominant levels are automatically produced on all T-nets simply by going into slow-mode and selecting all NVS gates. The test level, tl, applied at the CNV point is logic "1" and the same phase of test level (which happens to be dominant) appears on the driven pin (P) when the corresponding NVS gate is selected.

The scan-address uniqueness test is then repeated again while the on-board functional nets are held dominant, and if an error is detected, binary bisection is used to isolate the on-board functional net which is shorted to one of the scan nets.

Figure 4:
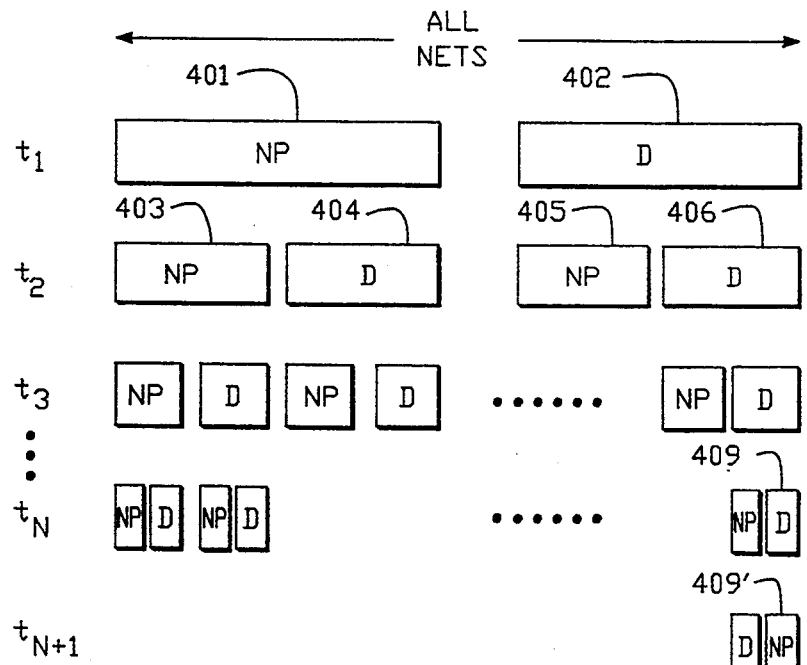
FIG. 4 illustrates a set bifurcation technique which may be implemented with the disclosed architecture of FIGS. 3J–3K.

A similar kind of binary bisection is preferentially used for implementing the Walking Non-Dominant Level test (WNDL). FIG. 4 illustrates the progression of applying test signals to all nets within all or a portion of the interconnect network that is being tested using the WNDL test method. At first time $t_1$, the set of all nets is bifurcated into a first subset 401 which will receive non-dominant pulses (NP) and a second subset 402 which will be held at the dominant level (D). Testing is then carried out by scanning response-developing points on the NP subset 401 to see if any of the pulses are overridden by a short from a dominant net in subset 402. At second time $t_2$, the first subset of nets 401 is bifurcated into a first sub-subset 403 which will receive non-dominant pulses (NP) and a second sub-subset 404 which will be held at the dominant level (D). Second subset 402 is at the same time bifurcated into a third sub-subset 405 which will receive non-dominant pulses (NP) and a fourth sub-subset 406 which will be held at the dominant level (D). Testing is then carried out by scanning response-developing points on the NP sub-subsets 403 and 405 to see if any of the pulses on those nets are overridden by a short from a dominant net in sub-subset 404 and 406.

The bifurcate and test method repeats until time $t_N$, when all nets except an end net 409, have received nondominant pulses (NP). At time $t_{N+1}$, the designation is reversed so that end net 409 also receives a nondominant pulse so that stuck-at faults and shorts between end-net 409 and one of the dominant lines will be detected.

FIG. 5 shows the network verification circuitry from a different viewpoint to better explain how NVS gate selection, group protection and global protection operate. Boxes 353.1, 353.2, 353.3, etc., represent X-select OSL's. Boxes 354.1, 354.2, 354.3, etc., represent Y-select OSL's. A group reset signal GR2.1 may be applied to all these select-OSL's to reset them simultaneously. Then, individual set signals (not shown) are applied to each of the select-OSL's to establish unique selection patterns. All the NVS gates illustrated in FIG. 5 belong to a single "group". Group protect signal gP.1 is therefore applied to all their respective semi-arming OR gates 355.1, 355.2, 355.3, etc., and 357.1, 357.2, 357.3, etc. The gP.1 group-protect signal is further applied to all their respective SNC gates 371.1 and 361.1. Note that a group can have both flavors of SNC gates and both AND and NAND types of NVS gates. The global protect signal (GP) is applied to the SNC gates of the illustrated group and to the SNC gates of further non-illustrated groups.

FIG. 6 shows yet another view of the invention. The select circuits can be viewed as belonging to respective X-select and Y-select planes, 601 and 602. Each dimension-select plane (601, 602) includes one or more select latches (353, 354) whose output extends to corresponding OR gates 355, 356, 355', 357, 358, 357' as shown. These OR gates 355–357' have outputs coupled to respective NVS gates or corresponding delay-test selection circuits as shown.

The third plane 603 is referred to as the "groups control plane". Plane 603 contains the group protect latches (e.g., 341 and 341'), the F-mode protecting latch 342 and the SNC gates. The slow-mode enforcing latch 343 is coupled by way of OR gate 360c to the inputs of all SNC gates 361–371'. SNC gates 361 and 371 belong to the group plane of group protect signal NVgP.1. SNC gates 361' and 371' belong to the group plane of group-protect signal NVgP.2. The delay-test protect output of latch 343 couples to OR gates 358 and 356 in the Y-select and X-select planes, 602 and 601.

An externally-generated test level is injected into the chip by way of the SID pin. It propagates asynchronously to OR gate 360c and from there through the SNC gates to the respective NVS gates (not shown). The SID pin also receives scan-control signals (which are active when scan-clock pulses, not shown, are present). These scan-control signals are used for establishing various select/de-select patterns among the X-select and Y-select operating state latches.

The above disclosure is to be taken as illustrative of the invention, not as limiting its scope or spirit. Numerous modifications and variations will become apparent to those skilled in the art after studying the above disclosure.

By way of example, the principles of the invention can be applied to the verification of optical interconnect networks as well as electrical networks. The invention is not limited to digital computers, it can be applied in all digital systems where network verification can be advantageously incorporated into functional modules.

Given the above disclosure of general concepts and specific embodiments, the scope of protection sought is to be defined by the following claims.

What is claimed is:

1. A network verification method carried out in a system having a plurality of nodes and interconnect nets, where each net is supposed to interconnect a predefined subset of the system nodes, said method comprising the steps of:
   (a) selecting a net to be tested;
   (b) injecting a transitory stimulus signal having at least a rising edge or falling edge into a first node which is supposed to be connected to the selected net;
   (c) detecting within a predetermined time span after said injecting step (b) whether responsive transitions occur at other nodes of the system; and
   (d) generating a first list of addresses identifying the nodes where responsive transitions are detected.

2. The network verification method of claim 1 further comprising the steps of:
   (e) comparing the first list of addresses against a second list of expected addresses, the second list identifying all nodes other than the first node which are supposed to be connected to the selected net; and
   (f) generating a third, missing-data list which identifies data items in the first list that are not included in the second list and data items in the second list that are not included in the first list.

3. The network verification method of claim 2 wherein said missing-data list further indicates for each data item included in one but not the other of the first and second lists, which of the first and second lists that data item is missing from.

4. The network verification method of claim 3 further comprising the steps of:
   (g) flagging each node whose address is included in the second list but is missing from the first list as a node which is erroneously disconnected from the selected net; and
   (h) flagging each node whose address is included in the first list but is missing from the second list as a node which is erroneously connected to the selected net.

5. The network verification method of claim 1 wherein:
   the system is supposed to include one or more line-conditioning means, each
   line-conditioning means being provided for conditioning signals carried on an associated net;
   one or more of said interconnect nets are each supposed to be coupled to an associated line-conditioning means; and
   the predetermined time span of step (c) is selected such that responsive transitions will not be detected at expected nodes of the selected net if the selected net is supposed to be but is not coupled to a corresponding line-conditioning means.

6. The network verification method of claim 5 wherein one or more of the line-conditioning means includes a line-terminating resistor.

7. The network verification method of claim 5 wherein:
   the predetermined time span of step (c) is selected such that, if the selected net is erroneously shorted to another net, responsive transitions will be detected at nodes interconnected by the other net.

8. The network verification method of claim 5 wherein:
   the predetermined time span for detecting each responsive transition in step (c) is within a range of 100 to 300 microseconds after a causal rising or falling edge is injected at step (b).

9. The network verification method of claim 8 wherein the predetermined time span is approximately 200 microseconds after a casual rising or falling edge is injected at step (b).

10. The network verification method of claim 1 wherein:
    said system includes a plurality of modules interconnected to one another by the interconnect nets;
    each module has a plurality of interface terminals for coupling internal nodes of the module to the interconnect nets;
    said system further includes a scan bus for scanning the internal nodes of each of the modules;
    each module includes internal scanning means, coupled to the system scan bus, for addressing one or more of its internal nodes at a time in accordance with address signals supplied over the scan bus, for driving each addressed internal node towards a desired signal level in accordance with stimulus signals supplied over the scan bus and for detecting a signal level present at each addressed internal node and returning the detected level to the system scan bus; and wherein
    the network verification method further includes the steps of:
    (a.1) at an initial time point, $t_0$, addressing a first internal node which is coupled to a first interface terminal of a selected module and driving the first internal node towards a first signal level by way of signals transmitted over the system scan bus, the first internal node being the first node of step (a);
    (b.1) after initial time point, $t_0$, driving the first internal node towards a second signal level by way of signals transmitted over the system scan bus, thereby generating one of the rising or falling edges of step (b) at a first time point, $t_1$;
    (c.1) addressing a second internal node of either the same or a different module, the second internal node being coupled to a second interface terminal;
    (c.2) detecting the level present at the second internal node at a capture time point, $t_c$, the capture time point, $t_c$, being within said predetermined time span;
    (c.3) returning the level detected at the second internal node at capture time point, $t_c$, to the system scan bus;
    (c.4) determining from the returned level whether a transition responsive to the edge generated at step (b.1) has occurred at the second internal node;
    (c.5) after capture time point, $t_c$, driving the first internal node towards the first signal level by way of signals transmitted over the system scan bus; and
    (c.6) repeating steps (b.1) through (c.5) while addressing a different second internal node in each pass until the levels present at all interface terminals of the system which could be correctly or erroneously connected to first interface terminal have been returned by step (c.3).

11. The network verification method of claim 10 further comprising the step of continuously addressing the second internal node between steps (c.1) and (c.5) and between steps (c.5) and (c.6) so as to carry out the additional steps of:

(c.5.1) detecting a level present at the continually addressed second internal node at a second capture time point, $t_f$, the second capture time point, $t_f$, being within a second predetermined time span after the first internal node is driven towards the first signal level in step (c.5);

(c.5.2) returning the level detected at the second interface terminal at the second capture time point, $t_f$, to the system scan bus; and (c.5.3) determining from the level returned at step (c.5.2) whether a transition responsive to the edge generated at step (c.5) has occurred at the second internal node.

12. The network verification method of claim 11 further comprising the steps of: asynchronously returning each of the first and second detected levels from the second interface terminal to the second internal node and from there to the scan bus.

13. The network verification method of claim 10 further comprising the steps of:
asynchronously transmitting the transitory stimulus signal from the scan bus to the first interface terminal; and
asynchronously returning each of the first and second detected levels from the second interface terminal to the second internal node and from there to the scan bus.

14. The network verification method of claim 13 wherein the step of asynchronously transmitting the transitory stimulus signal includes the steps of:
providing mixing means in each module, each mixing means having one or more primary input terminals for receiving F-mode signals from internal nodes of the module, a secondary input terminal for receiving the transitory stimulus signal and an output node, coupled to an interface terminal of the module, for outputting an output signal which is a function of the signals received at the primary and secondary input terminals of the mixing means;
applying the transitory stimulus signal to the secondary input terminal of the mixing means; and
simultaneously maintaining nontest signals, which are applied to the primary input terminals of the mixing means, at function noncontrolling levels so that the output signal of the mixing means is essentially equivalent to the transitory stimulus signal.

15. The network verification method of claim 14 wherein the mixing means performs an additive or subtractive function on the signals presented to its primary and secondary input terminals and said maintaining step maintains the nontest signals at a zero level.

16. The network verification method of claim 14 wherein the mixing means performs a multiplying function on the signals presented to its primary and secondary input terminals and said maintaining step maintains the nontest signals at a unity level.

17. The network verification method of claim 10 wherein said modules are integrated circuit packages mounted to a printed circuit board and at least one of the interconnect nets is a printed circuit board trace.

18. The network verification method of claim 10 wherein said modules are printed circuit boards mounted in a frame and at least one of the interconnect nets is part of an inter-board bus.

19. A network verification method carried out in a system having a plurality of interconnect nets and comprising the steps of:

(a) selecting a net to be tested within the system;
(b) driving at least half of the non-selected nets of the system toward a first level of signal magnitude;
(c) injecting a transitory stimulus signal having a waveform which includes a second signal magnitude level and at least a rising edge or a falling edge of a predefined slope into a first node of the selected net;
(d) detecting within a predetermined time span after a rising or falling edge of the transitory stimulus signal, the occurrence of responsive transitions at other nodes of the system;
(e) generating a list of addresses identifying the nodes where the responsive transitions are detected;
(f) comparing the generated list of addresses with a list of expected addresses; and
(g) flagging out missing or extra addresses in the generated list.

20. The method of claim 19 wherein the system includes a plurality of boards; wherein some of the interconnect nets are confined to a single board while other interconnect nets extend off-board and where in the step (c) of injecting a transitory stimulus signal having a waveform which includes a second signal magnitude level, said second signal magnitude level is dominant over the first signal magnitude level if the net selected for testing is one confined to a single board.

21. The method of claim 19 wherein the system includes a plurality of boards; wherein some of the interconnect nets are confined to a single board while other interconnect nets extend off-board and where in the step (c) of injecting a transitory stimulus signal having a waveform which includes a second signal magnitude level, said second signal magnitude level is not dominant over the first signal magnitude level if the net selected for testing is one which extends off-board.

22. The method of claim 19 where in the step (c) of injecting a transitory stimulus signal having a waveform which includes at least a rising edge or a falling edge, said waveform includes both edges.

23. The method of claim 19 where in the step (d) of detecting within a predetermined time span, the occurrence of responsive transitions, said detection tests for the occurrence of both rising and falling edges at the other nodes of the system.

24. The method of claim 19 wherein the system includes one or more line-conditioners which are supposed to be coupled to a corresponding one or more of the interconnect nets and where in the step (d) of detecting within a predetermined time span, the occurrence of responsive transitions, said predetermined time span is set sufficiently short to detect mis-wired or missing line-conditioners, but sufficiently long to detect shorts to other nets.

25. A network verification method carried out in a system-under-test (SUT) having a plurality of interconnect nets and comprising the steps of:

(a') selecting two or more nets within the SUT for simultaneously receiving a slow-toggled, pulse-shaped test signal whose waveform includes both a first level of signal magnitude and a second level of signal magnitude, said selecting step defining a set of selected and non-selected nets;

(b') driving most or all non-selected nets of the SUT toward the second level of signal magnitude and latching them weakly to this second level;

(c') injecting the slow-toggled test signal simultaneously into all the selected nets through drive points of those selected nets;

(d') scanning other nodes of the selected nets to detect within a predetermined time span, the occurrence of responsive transitions at those other nodes of the selected nets;

(e') scanning the nodes of the non-selected nets which were driven toward the second signal magnitude level in step (b') to assure that these non-selected nets have not switched to the first level of signal magnitude;

(f') generating a list of addresses identifying the nodes where the responsive transitions are detected;

(g') comparing the generated list with a list of expected addresses;

(h') flagging out missing or extra locations in the generated list;

(i') changing the set of selected and non-selected nets; and (j') repeating steps (a') through (i') until every net of the SUT has been both a selected and non-selected net.

26. A network verification method according to claim 25 wherein said step (i') includes using binary bisection to change the sets of selected and non-selected nets.

27. A network verification method according to claim 25 wherein within said step (a'), the selected nets represent approximately half the nets of the SUT.

28. A network verification method according to claim 25 wherein within said step (b'), the second level of signal magnitude is non-dominant relative to the first signal magnitude level.

29. A network verifying structure for verifying that proper interconnections are made in a system-under-test (SUT) having plurality of interconnect nets, the structure comprising:

(a) mode control means for selectively placing said system under test either in a net-verification mode or a functional mode;

(b) test signal injecting means for selecting as a signal injection point, a first node of a net to be tested and for injecting a transitory test signal into the selected first node when net-verification mode is active;

(c) response-detect means for interrogating all other nodes of the system under test to detect the occurrence of responsive transitory signals at the other nodes; and (d) address generating means for generating address signals identifying the nodes at which responsive transitory signals were detected.

* * * * *